(12) United States Patent
Kihara et al.

(10) Patent No.: US 12,446,725 B2
(45) Date of Patent: Oct. 21, 2025

(54) APPARATUS, METHOD AND PROGRAM

(71) Applicant: DAITO GIKEN, INC., Tokyo (JP)

(72) Inventors: Kaishun Kihara, Tokyo (JP); Atsushi Terasawa, Tokyo (JP)

(73) Assignee: DAITO ENTERTAINMENT, INC., Tokyo (JP)

( * ) Notice: Subject to any disclaimer, the term of this patent is extended or adjusted under 35 U.S.C. 154(b) by 1108 days.

(21) Appl. No.: 17/262,920

(22) PCT Filed: Aug. 2, 2019

(86) PCT No.: PCT/JP2019/030543
§ 371 (c)(1),
(2) Date: Jan. 25, 2021

(87) PCT Pub. No.: WO2020/031905
PCT Pub. Date: Feb. 13, 2020

(65) Prior Publication Data
US 2021/0235921 A1    Aug. 5, 2021

(30) Foreign Application Priority Data

Aug. 7, 2018 (JP) .................. 2018-148563

(51) Int. Cl.
*A47J 31/52* (2006.01)
*A23F 5/26* (2006.01)
*A47J 31/00* (2006.01)

(52) U.S. Cl.
CPC .............. *A47J 31/52* (2013.01); *A23F 5/262* (2013.01); *A47J 31/002* (2013.01)

(58) Field of Classification Search
CPC ........ A47J 31/52; A47J 31/002; A47J 31/521; A23F 5/262; G07F 13/065
See application file for complete search history.

(56) References Cited

U.S. PATENT DOCUMENTS

| 2008/0201241 A1 | 8/2008 | Pecoraro |
| 2012/0156343 A1 | 6/2012 | Studor et al. |
| 2016/0055599 A1 | 2/2016 | Lly et al. |
| (Continued) | | |

FOREIGN PATENT DOCUMENTS

| CN | 107316388 A | 11/2017 |
| CN | 107369254 A | 11/2017 |
| (Continued) | | |

OTHER PUBLICATIONS

Feb. 9, 2021 International Preliminary Report on Patentability issued in International Patent Application No. PCT/JP2019/030543.
(Continued)

*Primary Examiner* — Edward F Landrum
*Assistant Examiner* — Kuangyue Chen
(74) *Attorney, Agent, or Firm* — Oliff PLC

(57) ABSTRACT

An apparatus that allows a user to be provided with a beverage to grasp the taste of the user, including display means for displaying a range of selectable levels of a property relating to a taste of a beverage, receiving means for receiving a selection of a level of the property from the range made by a user, and obtaining means for obtaining beverage information corresponding to the received level of the property.

3 Claims, 55 Drawing Sheets

(56) References Cited

U.S. PATENT DOCUMENTS

2017/0119195 A1  5/2017  Al-Shaibani et al.
2018/0000188 A1  1/2018  Dua et al.

FOREIGN PATENT DOCUMENTS

| JP | H04-278697 A | | 10/1992 |
|---|---|---|---|
| JP | H05-81544 A | | 4/1993 |
| JP | 2003-024703 A | | 1/2003 |
| JP | 2003-532942 A | | 11/2003 |
| JP | 2004-305130 A | | 11/2004 |
| JP | 2004355052 A | * | 12/2004 |
| JP | 2013-66697 A | | 4/2013 |
| JP | 2014-219155 A | | 11/2014 |
| JP | 2018-28820 A | | 2/2018 |
| JP | 2018-94076 A | | 6/2018 |
| TW | M420784 U1 | | 1/2012 |
| WO | 01/12041 A2 | | 2/2001 |
| WO | 2015/095877 A2 | | 6/2015 |

OTHER PUBLICATIONS

Sep. 1, 10, 2019 International Search Report issued in International Patent Application No. PCT/JP2019/030543.
Feb. 2, 2023 Taiwanese Office Action issued in Taiwanese Patent Application No. 108127708.
Aug. 5, 2021 Search Report issued in European Patent Application 19846171.7.

* cited by examiner

Fig. 9
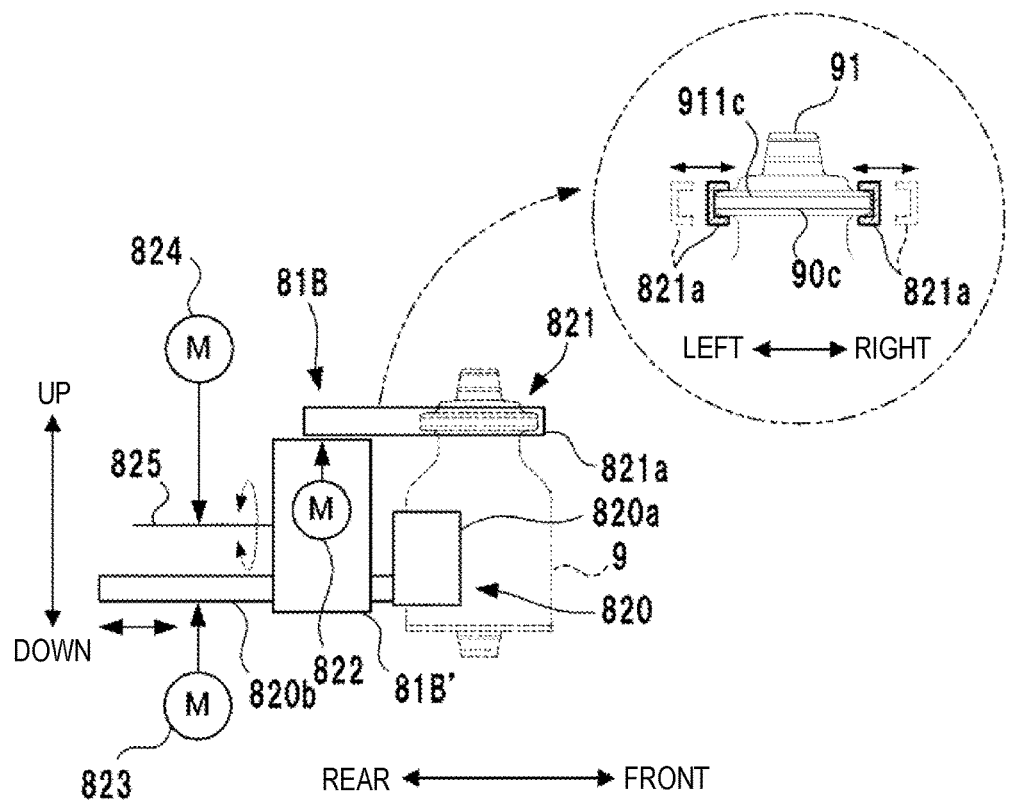
ST1
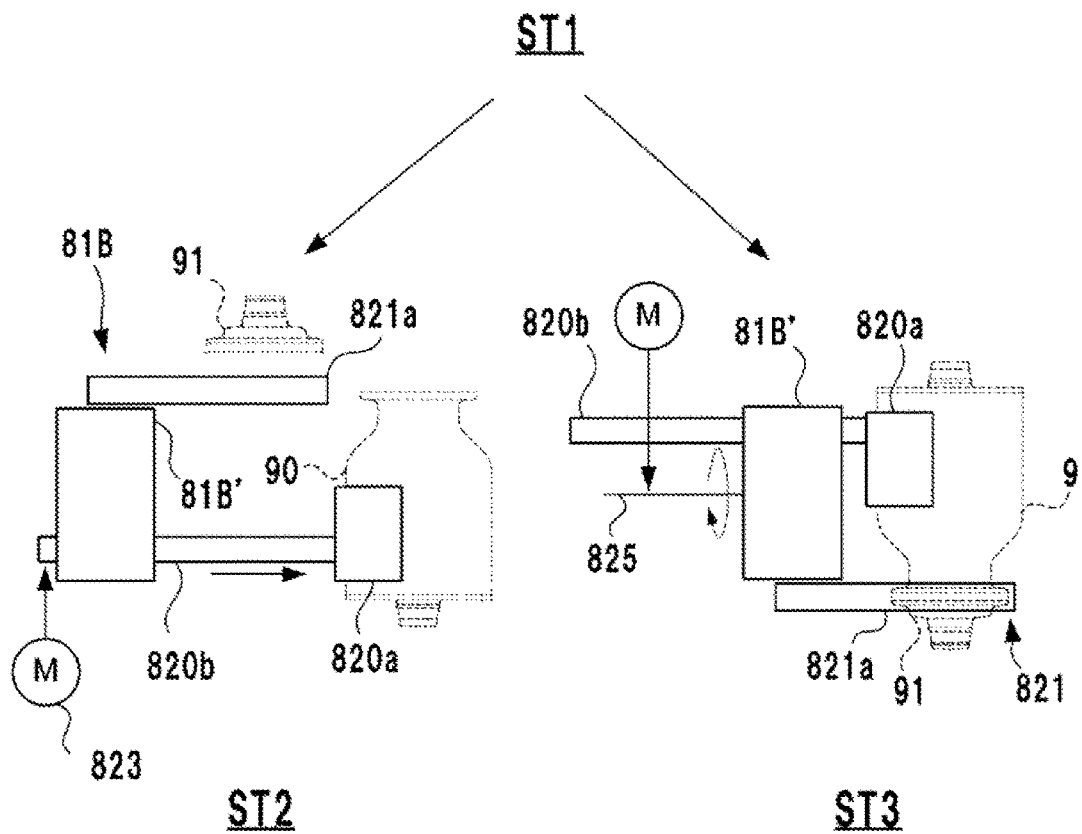
ST2                                    ST3

| USER INFOR-MATION | DATA-AND-TIME INFOR-MATION | INGREDIENT INFORMATION ||| PREPARATION PROFILE ID | MACHINE INFOR-MATION | RATING | COMMENT |
| | | BEANS 4113 | PRODUCING AREA 4114 | DEGREE OF ROASTING 4115 | | | | |
|---|---|---|---|---|---|---|---|---|
| 1 | 8/25 | A | COL | DARK ROAST | 40 | ... | ... | ... |
| 1 | 8/10 | A | COL | DARK ROAST | 20 | ... | ... | ... |
| 1 | 7/29 | A | GTM | MEDIUM ROAST | 10 | ... | ... | ... |
| 1 | 7/28 | B | ETH | LIGHT ROAST | 3 | ... | ... | ... |
| 2 | 7/27 | ... | ... | ... | ...... | ... | ... | ... |
| 2 | 7/29 | ... | ... | ... | ...... | ... | ... | ... |
| ... | ... | ... | ... | ... | ...... | ... | ... | ... |

(B) 4120

| PREPARATION PROFILE ID 4121 | AMOUNT OF BEANS 4122 | GRIND SIZE 4123 | AMOUNT OF HOT WATER FOR STEAMING 4124 | STEAMING TIME 4125 | AMOUNT OF HOT WATER FOR EXTRACTION 4126 | EXTRACTION PRESSURE 4127 | EXTRACTION TIME 4128 | ... |
|---|---|---|---|---|---|---|---|---|
| 1 | 11 | 5 | 25 | 25 | 160 | 2 | 40 | ... |
| 2 | ... | ... | ... | ... | ... | ... | ... | ... |
| 3 | ... | ... | ... | ... | ... | ... | ... | ... |
| ... | ... | ... | ... | ... | ... | ... | ... | ... |

(C) 4130

| INGREDIENT INFORMATION ||| PREPARATION PROFILE ID 4134 | INGREDIENT INFORMATION 4140 |||| PRIORITY 4138 | PRICE 4139 |
| BEANS 4131 | PRODUCING AREA 4132 | DEGREE OF ROASTING 4133 | | BITTERNESS 4135 | SWEETNESS 4136 | SOUR TASTE 4137 | ... | | |
|---|---|---|---|---|---|---|---|---|---|
| A | COL | DARK ROAST | 1 | 30 | 20 | 22 | ... | 5 | 550 |
| A | COL | DARK ROAST | 5 | ... | ... | ... | ... | 4 | 600 |
| A | GTM | MEDIUM ROAST | 22 | ... | ... | ... | ... | 1 | 750 |
| B | ETH | LIGHT ROAST | 3 | ... | ... | ... | ... | 4 | 550 |
| ... | ... | ... | ...... | ... | ... | ... | ... | ... | ... |

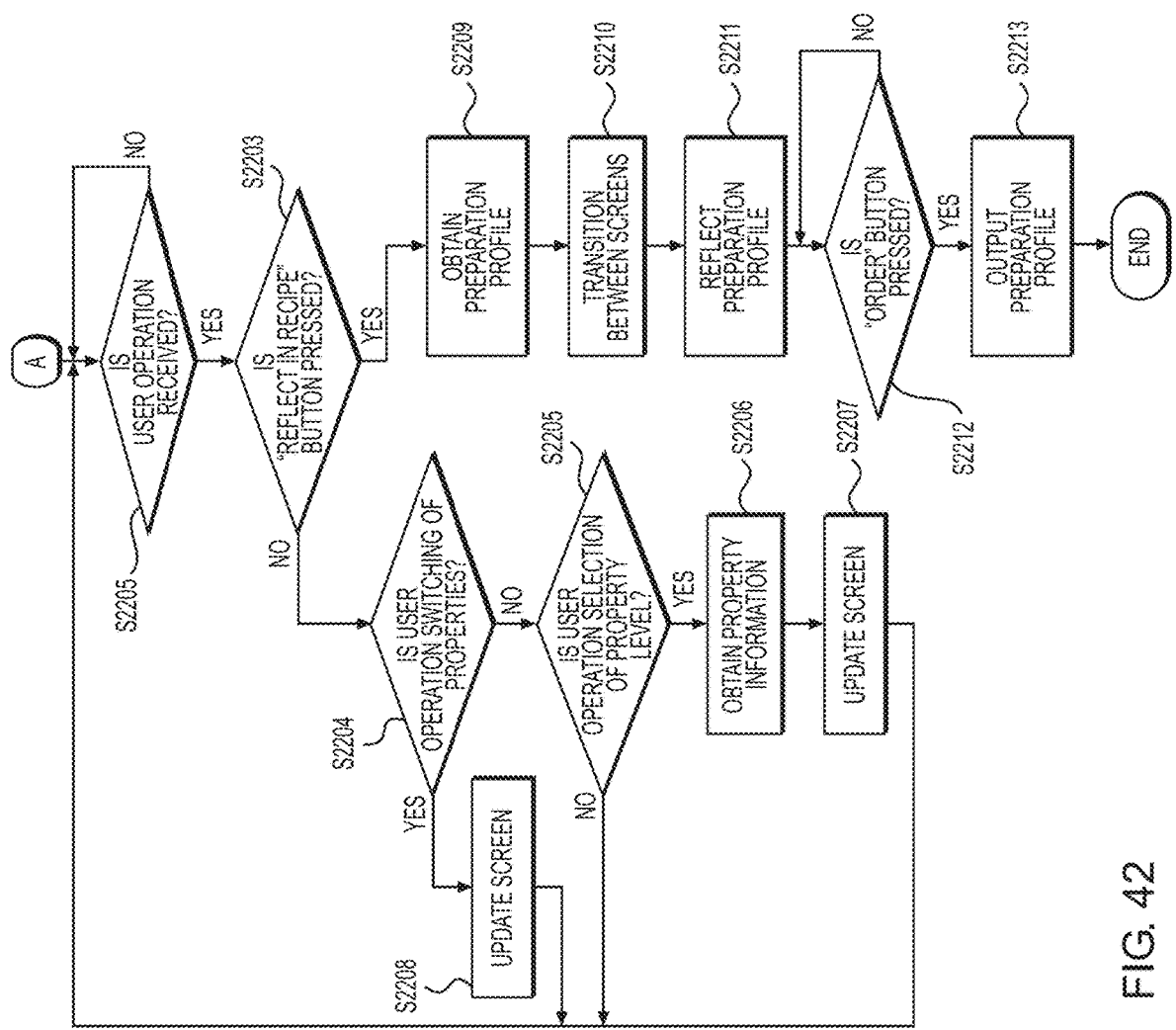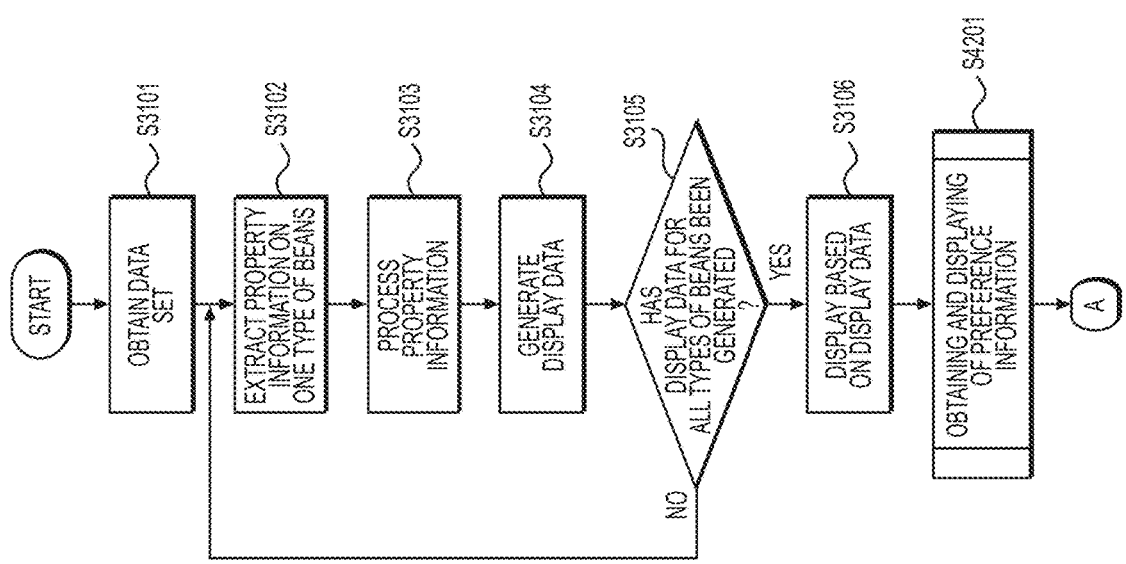
FIG. 42

APPARATUS, METHOD AND PROGRAM

TECHNICAL FIELD

The present invention relates to an apparatus, a method and a program.

BACKGROUND ART

There have been proposed beverage making apparatuses that produce a coffee beverage or the like (Patent Literatures 1 to 4, for example).

CITATION LIST

Patent Literature

Patent Literature 1

Japanese Patent Laid-Open No. 05081544

Patent Literature 2

Japanese Patent Laid-Open No. 2003-024703

Patent Literature 3

Japanese Patent Laid-Open No. 2013-66697

Patent Literature 4

Japanese Translation of PCT International Application Publication No. 2003-532942

SUMMARY OF INVENTION

Technical Problem

Some kinds of beverages (such as coffee) of which many people have their own favorite tastes have many evaluation factors, such as flavor and aroma. In addition, the characteristics of the beverage can vary with the beverage making method used in the beverage making apparatus. Therefore, it is not always easy for the user who is to be provided with a beverage to select a beverage to the taste of the user.

In view of such problems with prior art, an object of the present is to provide an apparatus that allows a user who is to be provided with a beverage to easily select at least any of a kind of beverage, an ingredient of beverage and a beverage making process based on a desired property relating to the beverage.

Solution to Problem

To attain the object described above, an apparatus according to the present invention includes display means for displaying a range of selectable levels of a property relating to a taste of a beverage, receiving means for receiving a selection of a level of the property from the range made by a user, and obtaining means for obtaining beverage information corresponding to the received level of the property.

Advantageous Effects of Invention

According to the present invention, an apparatus can be provided which allows a user who is to be provided with a beverage to easily select at least any of a kind of beverage, an ingredient of beverage and a beverage making process based on a desired property relating to the beverage.

BRIEF DESCRIPTION OF THE DRAWINGS

FIG. 9 is a schematic diagram showing a middle unit.

FIG. 41 includes diagrams showing an example of data retained in a database 1309 of a server 1201.

FIG. 42 is a flow diagram showing an example of a process of displaying a setting screen according to a sixth embodiment.

DESCRIPTION OF EMBODIMENTS

Embodiments of the present invention will be described with reference to the drawings.

1. Overview of Beverage Making Apparatus

Figure 1:
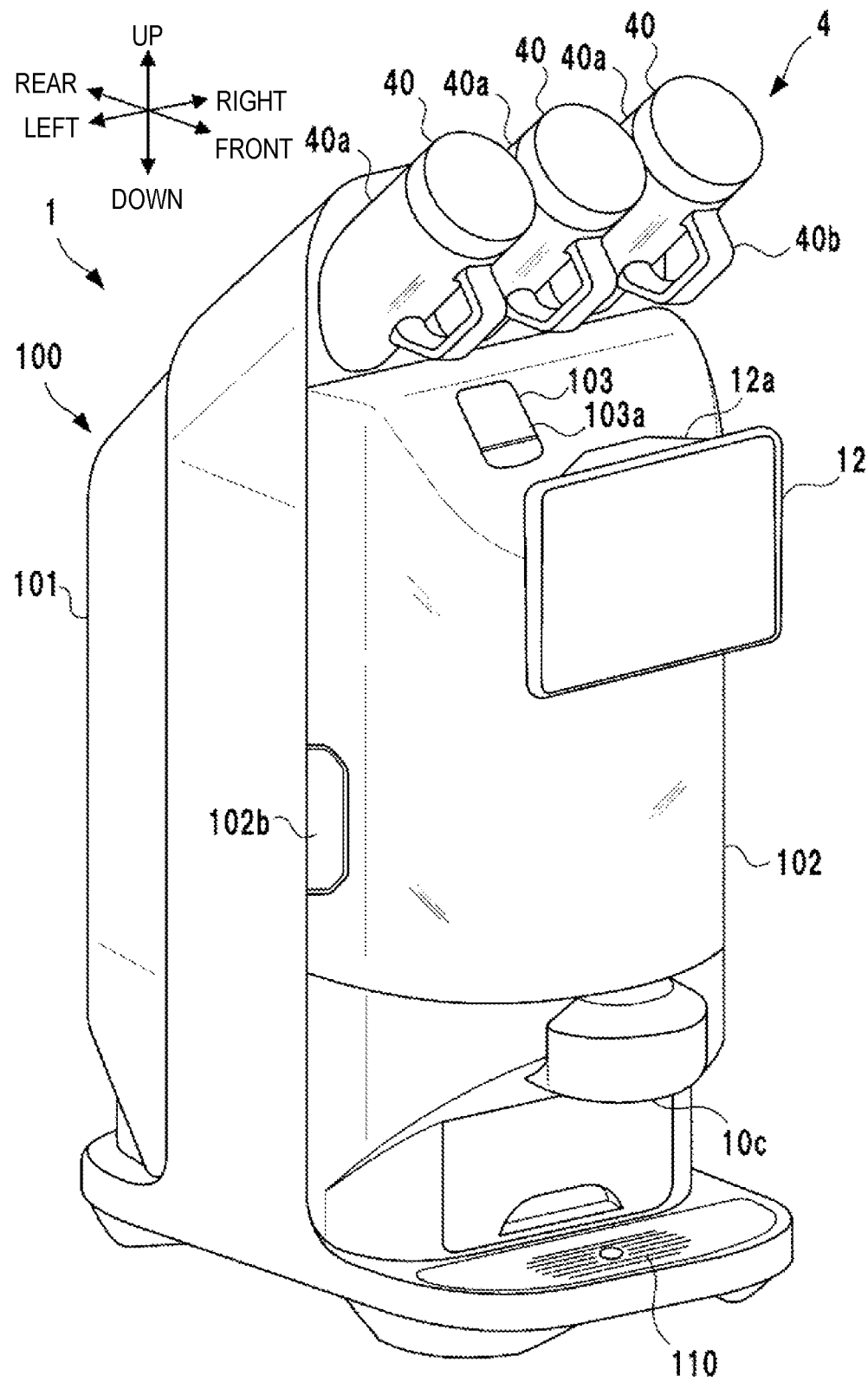
FIG. 1 is a diagram showing an appearance of a beverage making apparatus.

FIG. 1 shows an appearance of a beverage making apparatus 1. The beverage making apparatus 1 according to an embodiment is an apparatus that automatically produces a coffee beverage from roasted coffee beans and a liquid (water in this example). The apparatus can produce a cup of coffee beverage in one production operation. Roasted coffee beans as an ingredient can be stored in a canister 40. The beverage making apparatus 1 has a cup mount 110 provided in a lower part thereof, and the produced coffee beverage is poured into a cup from a pouring part 10c.

The beverage making apparatus 1 includes a housing 100 that forms an outer casing of the apparatus 1 and encloses an internal mechanism of the apparatus 1. The housing 100 is generally divided into a main body part 101 and a cover part 102 that forms a part of the front face and a part of the side faces of the beverage making apparatus 1. The cover part 102 is provided with an information display device 12. In this embodiment, the information display device 12 is a touch-panel display, and can display various types of information and receive inputs from an administrator of the apparatus or a consumer of the beverage. The information display device 12 is attached to the cover part 102 by a movement mechanism 12a, which allows the information display device 12 to move in the up-down direction within a certain range.

The cover part 102 is further provided with a bean inlet 103 and a door 103a that opens and closes the bean inlet 103. The opening and closing door 103 can be opened to input a different type of roasted coffee beans than the roasted coffee beans stored in the canister 40. In this way, a special cup of beverage can be provided to the beverage consumer.

In this embodiment, the cover part 102 is made of a material having a transparency, such as acrylic or glass, and forms a transparent cover the whole of which is transparent. Therefore, the internal mechanism covered by the cover part 102 is visible from outside. In this embodiment, a part of a production part that produces the coffee beverage is visible through the cover part 102. In this embodiment, the whole of the main body part 101 is nontransparent, the mechanism in the main body part 101 is difficult to see from outside.

Figure 2:
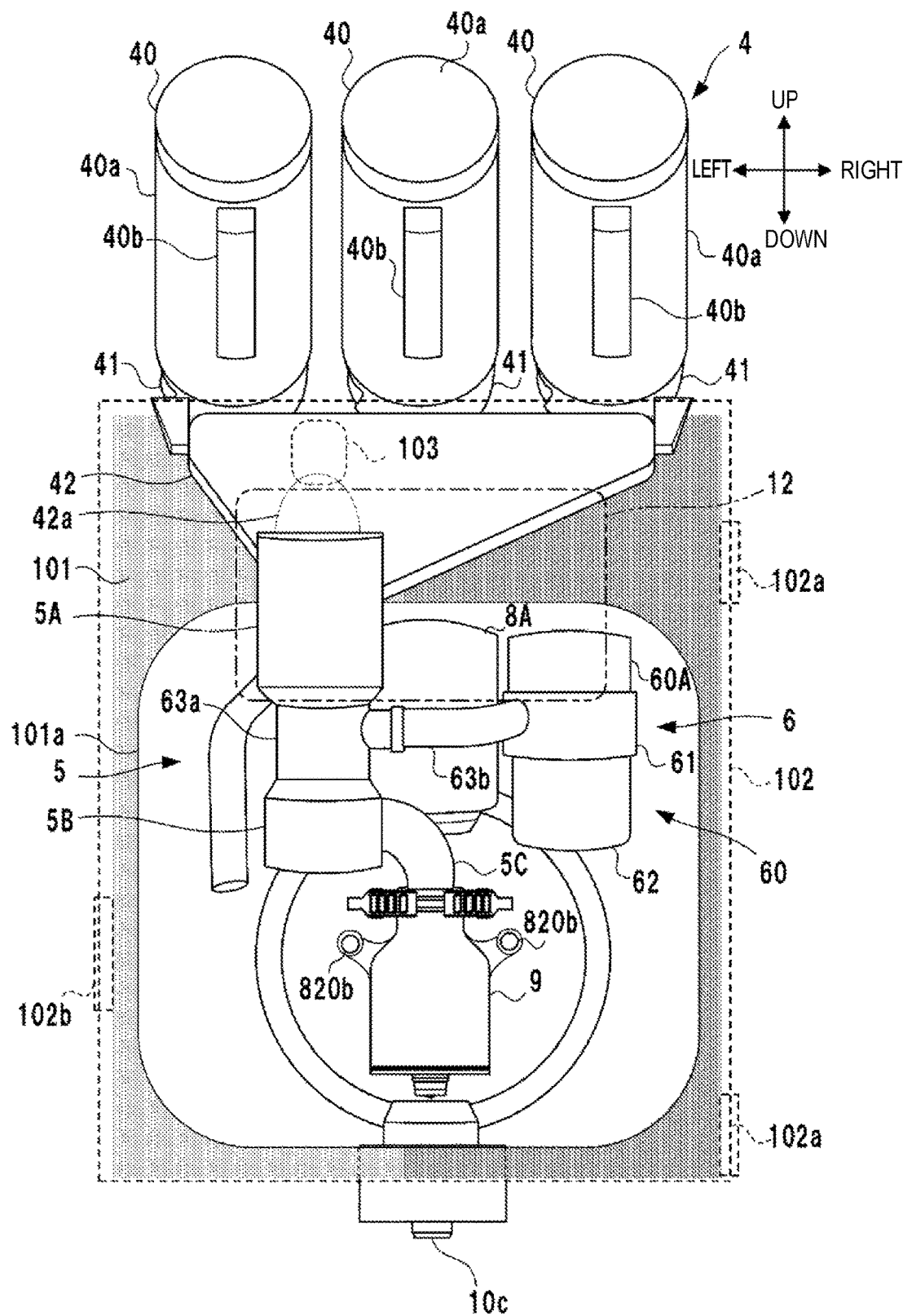
FIG. 2 is a partial front view of the beverage making apparatus in FIG. 1.

FIG. 2 is a partial front view of the beverage making apparatus 1, which shows a part of the production part that can be seen by a user from the front of the beverage making apparatus 1. The cover part 102 and the information display device 12 are shown by imaginary lines.

On the front of the beverage making apparatus 1, the housing 100 has a double-layer structure formed by the main body part 101 and the cover part 102 on the outer side (front side) thereof. A part of the mechanism of the production part is arranged between the main body part 101 and the cover part 12 in the front-rear direction, and is visible to the user through the cover part 102.

In this embodiment, the part of the mechanism of the production part that is visible to the user through the cover part 102 includes a gathering and conveying part 42, grinders 5A and 5B, a separating device 6, and an extraction vessel 9 described later, for example. In the front of the main body part 101, a rectangular recess part 101a, which is recessed toward the rear of the main body part 101, is formed, and the extraction vessel 9 and the like are positioned toward the rear in the recess part 101a.

Since these components are visible from outside through the cover part 102, the administrator can easily perform inspections and operational checks. In addition, the consumer can enjoy seeing the process of producing the coffee beverage.

The cover part 102 is attached to the main body part 101 via a hinge 102a at the right edge thereof so that the cover part 102 can be horizontally opened and closed. The cover part 102 has, at the left edge thereof, an engaging part 102b for maintaining the main body part 101 closed with the cover part 102. The engaging part 102b is a combination of a magnet and a piece of iron, for example. The administrator can open the cover part 102 to perform an inspection or the like of the part of the production part inside the cover part 102 described above.

In this embodiment, the cover part 102 has been described as being horizontally opened. However, the cover part 102 may be of a vertical opening type or a sliding type. The cover part 102 may be unable to be opened.

Figure 3:
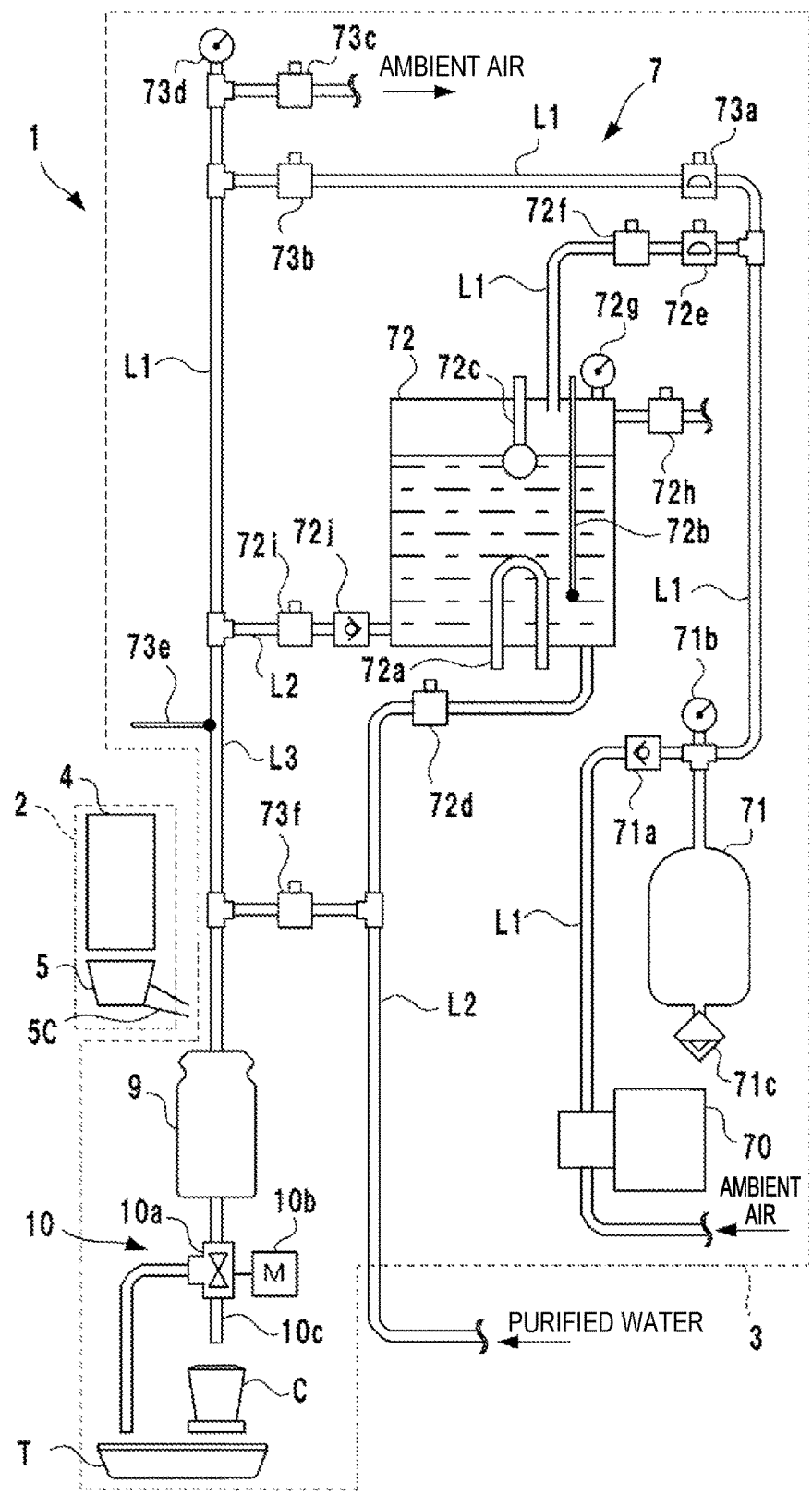
FIG. 3 is a schematic diagram for illustrating a function of the beverage making apparatus in FIG. 1.

FIG. 3 is a schematic diagram for illustrating a function of the beverage making apparatus 1. The beverage making apparatus 1 includes a bean processing device 2 and an extraction device 3 as the coffee beverage production part.

The bean processing device 2 produces ground beans from roasted coffee beans. The extraction device 3 extracts coffee liquid from the ground beans supplied from the bean processing device 2. The extraction device 3 includes a fluid supply unit 7, a drive unit 8 described later, the extraction vessel 9, and a switch unit 10. The ground beans supplied from the bean processing device 2 are input to the extraction vessel 9. The fluid supply unit 7 inputs hot water to the extraction vessel 9. In the extraction vessel 9, coffee liquid is extracted from the ground beans. Hot water containing the extracted coffee liquid is delivered into a cup C as a coffee beverage via the switch unit 10.

2. Fluid Supply Unit and Switch Unit

Configurations of the fluid supply unit 7 and the switch unit 10 will be described with reference to FIG. 3. First, the fluid supply unit 7 will be described. The fluid supply unit 7 supplies hot water to the extraction vessel 9 and controls the air pressure in the extraction vessel 9, for example. In this specification, any numeric value of the air pressure means an absolute pressure unless otherwise specified, and a gauge pressure means a pressure provided that the atmospheric pressure is 0 atmosphere. The term "atmospheric pressure" means the air pressure of the surroundings of the extraction vessel 9 or the air pressure around the beverage making apparatus. For example, when the beverage making apparatus is located at sea level, the atmospheric pressure is the standard atmosphere (1013.25 hPa) at sea level of International Standard Atmosphere (ISA) defined in 1976 by International Civil Aviation Organization (ICAO).

The fluid supply unit 7 includes systems of piping L1 to L3. The piping L1 is piping in which air flows, and the piping L2 is piping in which water flows. The piping L3 is piping in which both air and water can flow.

The fluid supply unit 7 includes a compressor 70 as a pressure source. The compressor 70 compresses and delivers air. The compressor 70 is driven by a drive source, such as a motor (not shown). The compressed air delivered from the compressor 70 is supplied to a reserve tank (accumulator) 71 via a check valve 71a. The air pressure in the reserve tank 71 is monitored by a pressure sensor 71b, and the compressor 70 is driven so as to keep the air pressure in the reserve tank 71 at a predetermined air pressure (7 atmospheres (a gauge pressure of 6 atmospheres) in this embodiment). The reserve tank 71 includes a drain 71c for drainage, through which water resulting from the compression of air can be discharged.

A water tank 72 stores hot water (water) used as an ingredient of the coffee beverage. The water tank 72 is provided with a heater 72a that heats the water in the water tank 72 and a temperature sensor 72b that measures the temperature of the water. The heater 72a maintains the temperature of the stored hot water at a predetermined temperature (120° C. in this embodiment) based on the result of detection by the temperature sensor 72b. For example, the heater 72a is turned on when the temperature of the hot water decreases to 118° C. and turned off when the temperature of the hot water increases to 120° C.

The water tank 72 is also provided with a water level sensor 72c. The water level sensor 72c detects the water level of the hot water in the water tank 72. When the water level sensor 72c detects that the water level is lower than a predetermined water level, water is supplied to the water tank 72. In this embodiment, tap water is supplied via a water purifier (not shown). The piping L2 from the water purifier is provided with a solenoid valve 72d at a midpoint. When the water level sensor 72c detects a drop of the water level, the solenoid valve 72d is opened to supply water, and when a predetermined water level is reached, the solenoid valve 72d is closed to stop the supply of water. In this way, the hot water in the water tank 72 is kept at a certain water level. Water supply to the water tank 72 may be performed each time hot water is discharged to produce a cup of coffee beverage.

The water tank 72 is also provided with a pressure sensor 72g. The pressure sensor 72g detects the air pressure in the water tank 72. The air pressure in the reserve tank 71 is supplied to the water tank 72 via a relief valve 72e and a solenoid valve 72f. The relief valve 72e decreases the air pressure supplied from the reserve tank 71 to a predetermined air pressure. In this embodiment, the relief valve 72e decreases the air pressure to 3 atmospheres (a gauge pressure of 2 atmospheres). The solenoid valve 72f switches between allowing and not allowing the air pressure regulated by the relief valve 72e to be supplied to the water tank 72. The solenoid valve 72f is controlled to be opened and closed to maintain the air pressure in the water tank 72 at 3 atmospheres except when tap water is supplied to the water tank 72. When supplying tap water to the water tank 72, the air pressure in the water tank 72 is reduced with a solenoid valve 72h to a pressure (a pressure lower than 2.5 atmospheres, for example) lower than the water pressure of the tap water so that the water tank 72 is smoothly replenished with the tap water under the water pressure of the tap water. The solenoid valve 72h switches between opening and not opening the water tank 72 to the ambient air, and opens the water tank to the ambient air when reducing the air pressure in the water tank 72. The solenoid valve 72h opens the water tank 72 to the ambient air to maintain the interior of the water tank 72 at 3 atmospheres not only when tap water is supplied to the water tank 72 but also when the air pressure in the water tank 72 is higher than 3 atmospheres.

The hot water in the water tank 72 is supplied to the extraction vessel 9 via a check valve 72j, a solenoid valve 72i and the piping L3. The hot water is supplied to the extraction vessel 9 when the solenoid valve 72i is opened, and the supply of the hot water is stopped when the solenoid valve 72i is closed. The amount of the hot water supplied to the extraction vessel 9 can be controlled by adjusting the open time of the solenoid valve 72i. However, the amount of the supplied hot water may be measured to control the opening and closing of the solenoid valve 72i. The piping L3 is provided with a temperature sensor 73e that measures the temperature of hot water, and the temperature of the hot water supplied to the extraction vessel 9 is monitored.

The air pressure in the reserve tank 71 is supplied to the extraction vessel 9 via a relief valve 73a and a solenoid valve 73b. The relief valve 73a reduces the air pressure supplied from the reserve tank 71 to a predetermined air pressure. In this embodiment, the relief valve 73a reduces the air pressure to 5 atmospheres (a gauge pressure of 4 atmospheres). The solenoid valve 73b switches between allowing and not allowing the air pressure regulated by the relief valve 73a to be supplied to the extraction vessel 9. The air pressure in the extraction vessel 9 is detected by a pressure sensor 73d. When pressurizing the extraction vessel 9, the solenoid valve 73b is opened based on the detection result from the pressure sensor 73d to pressurize the extraction vessel 9 to a predetermined air pressure (up to 5 atmospheres (a gauge pressure of 4 atmospheres) in this embodiment). The air pressure in the extraction vessel 9 can be reduced with a solenoid valve 73c. The solenoid valve 73c switches between opening and closing the extraction vessel 9 to the ambient air, and opens the extraction vessel 9 to the ambient air when an abnormal pressure occurs in the extraction vessel 9 (such as when the pressure in the extraction vessel 9 is higher than 5 atmospheres).

Each time the production of a cup of coffee beverage ends, in this embodiment, the interior of the extraction vessel 9 is cleaned with tap water. When performing the cleaning, the solenoid valve 73f is opened to supply tap water to the extraction vessel 9.

Next, the switch unit 10 will be described. The switch unit 10 is a unit that switches the destination of the liquid delivered from the extraction vessel 9 between the pouring part 10c and a waste tank T. The switch unit 10 includes a switch valve 10a and a motor 10b that drives the switch valve 10a. When delivering the coffee beverage from the extraction vessel 9, the switch valve 10a switches the flow channel to the pouring part 10c. Then, the coffee beverage is poured into the cup C from the pouring part 10c. When discharging the waste liquid (tap water) used for the cleaning and the residue (ground beans), the switch valve 10a switches the flow channel to the waste tank T. In this embodiment, the switch valve 10a is a 3-port ball valve. Since the residue passes through the switch valve 10a during the cleaning, the switch valve 10a is preferably a ball valve. The motor 10b rotates a rotating shaft of the ball valve to switch the flow channel.

3. Bean Processing Device

With reference to FIGS. 1 and 2, the bean processing device 2 will be described. The bean processing device 2 includes a storage device 4 and a griding device 5.

3-1. Storage Device

The storage device 4 includes a plurality of canisters 40 that store roasted coffee beans. In this embodiment, three canisters 40 are provided. The canister 40 includes a cylindrical main body 40a that stores roasted coffee beans and a handle 40b provided on the main body 40a. The canister 40 is configured to be removable from the beverage making apparatus 1.

Each canister 40 may store a different type of roasted coffee beans so that the type of roasted coffee beans used to produce a coffee beverage can be selected by an input operation on the information display device 12. The different types of roasted coffee beans may be different breeds of roasted coffee beans, for example. The different types of roasted coffee beans may be the same breed of coffee beans roasted to different roasting degree. The different types of roasted coffee beans may be different breeds of coffee beans roasted to different roasting degree. At least any one of the three canisters 40 may store a mixture of a plurality of breeds of roasted coffee beans. In the latter case, the breeds of roasted coffee beans may be roasted to the same roasting degree.

Although a plurality of canisters 40 are provided in this embodiment, only one canister 40 may be provided. When a plurality of canisters 40 are provided, all or some of the plurality of canisters 40 may store the same type of roasted coffee beans.

Each canister 40 is removably mounted on a metering and conveying device 41. The metering and conveying device 41 is an electric screw conveyor, for example, and automatically measures out a predetermined amount of roasted coffee beans stored in the canister 40 and delivers the roasted coffee beans downstream.

Each metering and conveying device 41 discharges the roasted coffee beans to a gathering and conveying part 42 located downstream thereof. The gathering and conveying part 42 is formed by a hollow member and forms a conveyance channel for roasted coffee beans from each conveyor 41 to the griding device 5 (the grinder 5A, in particular). The roasted coffee beans discharged from each metering and conveying device 41 move in the gathering and conveying part 42 under their own weight, and flow down into the griding device 5.

In the gathering and conveying part 42, a guide part 42a is formed at a location corresponding to the bean inlet 103. The guide part 42a forms a channel that guides the roasted coffee beans input to the bean inlet 103 to the griding device 5 (the grinder 5A, in particular). This allows production of a coffee beverage containing not only the roasted coffee beans stored in the canisters 40 but also roasted coffee beans input to the bean inlet 103 as an ingredient.

3-2. Griding Device

Figure 4:
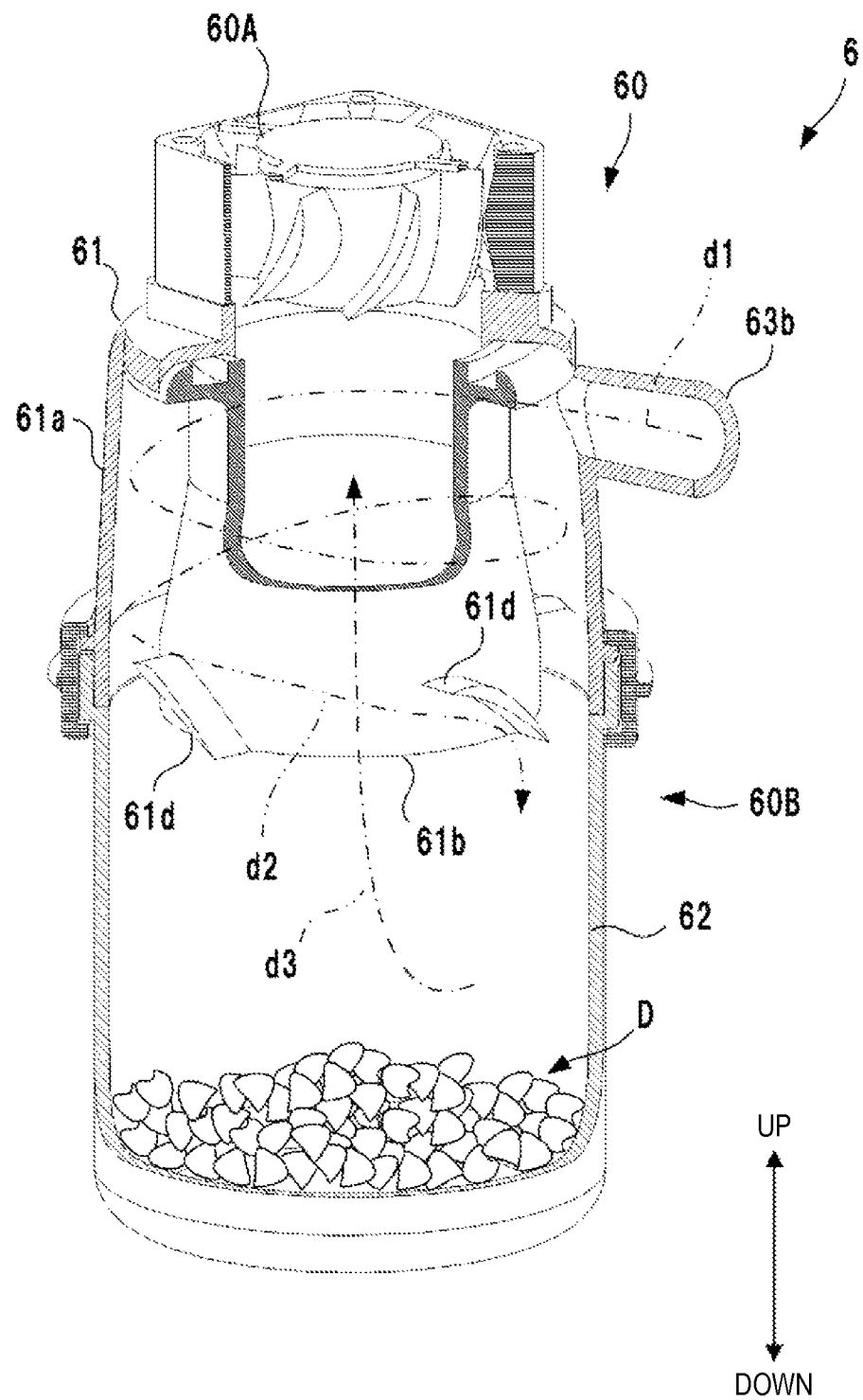
FIG. 4 is a partially cut-away perspective view of a separating device.

With reference to FIGS. 2 and 4, the griding device 5 will be described. FIG. 4 is a partially cut-away perspective view of the separating device 6. The griding device 5 includes the grinders 5A and 5B and the separating device 6. The grinders 5A and 5B are a mechanism that grinds roasted coffee beans supplied from the storage device 4. The roasted coffee beans supplied from the storage device 4 are first ground by the grinder 5A, then further ground into powder by the grinder 5B, and then input to the extraction vessel 9 through a discharge pipe 5C.

The grinders 5A and 5B differ in grind size. The grinder 5A is a grinder for coarse grinding, and the grinder 5B is a grinder for fine grinding. The grinders 5A and 5B are electric grinders, and include a motor as a drive source and a rotary blade or the like driven by the motor. The size (grind size) of the roasted coffee beans ground can be changed by changing the number of revolutions of the rotary blade.

The separating device 6 is a mechanism that separates an unwanted matter from the ground beans. The separating device 6 includes a channel part 63a arranged between the grinder 5A and the grinder 5B. The channel part 63a is a hollow body that forms a separating chamber through which the ground beans falling freely from the grinder 5A. To the channel part 63a, a channel part 63b extending in a direction (the left-right direction in this embodiment) intersecting with the direction (the up-down direction in this embodiment) of passage of the ground beans is connected, and a suction unit 60 is connected to the channel part 63b. The suction unit 60 sucks in the air in the channel part 63a, thereby sucking in light matters, such as chaff or fine powder. In this way, unwanted matters can be separated from the ground beans.

The suction unit 60 is a centrifugal separation mechanism. The suction unit 60 includes a blower unit 60A and a collecting vessel 60B. In this embodiment, the blower unit 60A is a fan motor, and discharges the air in the collecting vessel 60B upward.

The collecting vessel 60B includes an upper part 61 and a lower part 62 that are separably engaged with each other. The lower part 62 has the shape of a cylinder with an open top and a closed bottom, and defines a space for storing unwanted matters. The upper part 61 forms a lid part attached to the opening of the lower part 62. The upper part 61 includes an outer wall 61a having a cylindrical shape, and an exhaust pipe 61b formed coaxially with the outer wall 61a. The blower unit 60A is fixed to the upper part 61 above the exhaust pipe 61b so as to suck in the air in the exhaust pipe 61b. The channel part 63b is connected to the upper part 61. The channel part 63b opens at the side of the exhaust pipe 61b.

When the blower unit 60A is activated, airflows indicated by arrows d1 to d3 in FIG. 4 are caused. By the airflows, air containing unwanted matters is sucked from the channel part 63a into the collecting vessel 60B through the channel part 63b. Since the channel part 63b opens at the side of the exhaust pipe 61b, the air containing unwanted matters swirls round the exhaust pipe 61b. Unwanted matters D fall under their own weight and are collected at a part of the collecting vessel 60B (that is, accumulated on the bottom face of the lower part 62). The air is discharged upward through inside the exhaust pipe 61b.

A plurality of fins 61d are integrally formed on a circumferential face of the exhaust pipe 61b. The plurality of fins 61d are arranged in the circumferential direction of the exhaust pipe 61b. Each fin 61d is inclined with respect to the axial direction of the exhaust pipe 61b. The fins 61 provided in this way promote the swirl of the air containing the unwanted matters D around the exhaust pipe 61b.

In this embodiment, the lower part 62 is made of a transparent material, such as acrylic or glass, and forms a transparent vessel the whole of which is transparent. The lower part 62 is covered with the cover part 102 (FIG. 2). The administrator or the beverage consumer can see the unwanted matters D accumulated in the lower part 62 through the circumferential walls of the cover part 102 and the lower part 62. The administrator can easily determine the timing to clean the lower part 62, and the beverage consumer can feel assured about the quality of the coffee beverage being produced by seeing that unwanted matters D have been cleaned off.

In this embodiment, as described above, the roasted coffee beans supplied from the storage device 4 are first coarsely ground by the grinder 5A, and the separating device 6 separates unwanted matters from the coarsely ground beans while the beans are passing through the channel part 63a. The coarsely ground beans from which unwanted matters have been removed are then finely ground by the grinder 5B. The unwanted matters separated by the separating device 6 mainly include chaff and fine powder. These unwanted matters may ruin the flavor of the coffee beverage, and the quality of the coffee beverage can be improved by removing the chaff and the like from the ground beans.

The roasted coffee beans may be ground by one grinder (that is, in one grinding step). However, if the roasted coffee beans are ground in two steps by the two grinders 5A and 5B, the beans can be more easily ground to a uniform grind size, and the coffee liquid can be more uniformly extracted. While grinding beans, a frictional heat may be generated between the cutter and the beans. The two-step grinding can reduce the frictional heat and prevent deterioration (such as in flavor) of the ground beans.

In addition, since the process begins with the coarse grinding, continues with the separation of unwanted matters and ends with the fine grinding, the difference in weight between the unwanted matters and the ground beans (required matter) can be made large when the unwanted matters such as chaff are separated. Therefore, the efficiency of separation of the unwanted matters can be increased, and the ground beans (required matter) can be prevented from being separated as unwanted matters. In addition, since the step of separation of unwanted matters by means of air suction is performed between the coarse grinding and the fine grinding, the ground beans can be cooled by air and prevented from generating heat.

4. Drive Unit and Extraction Vessel 4-1. Overview

Figure 5:
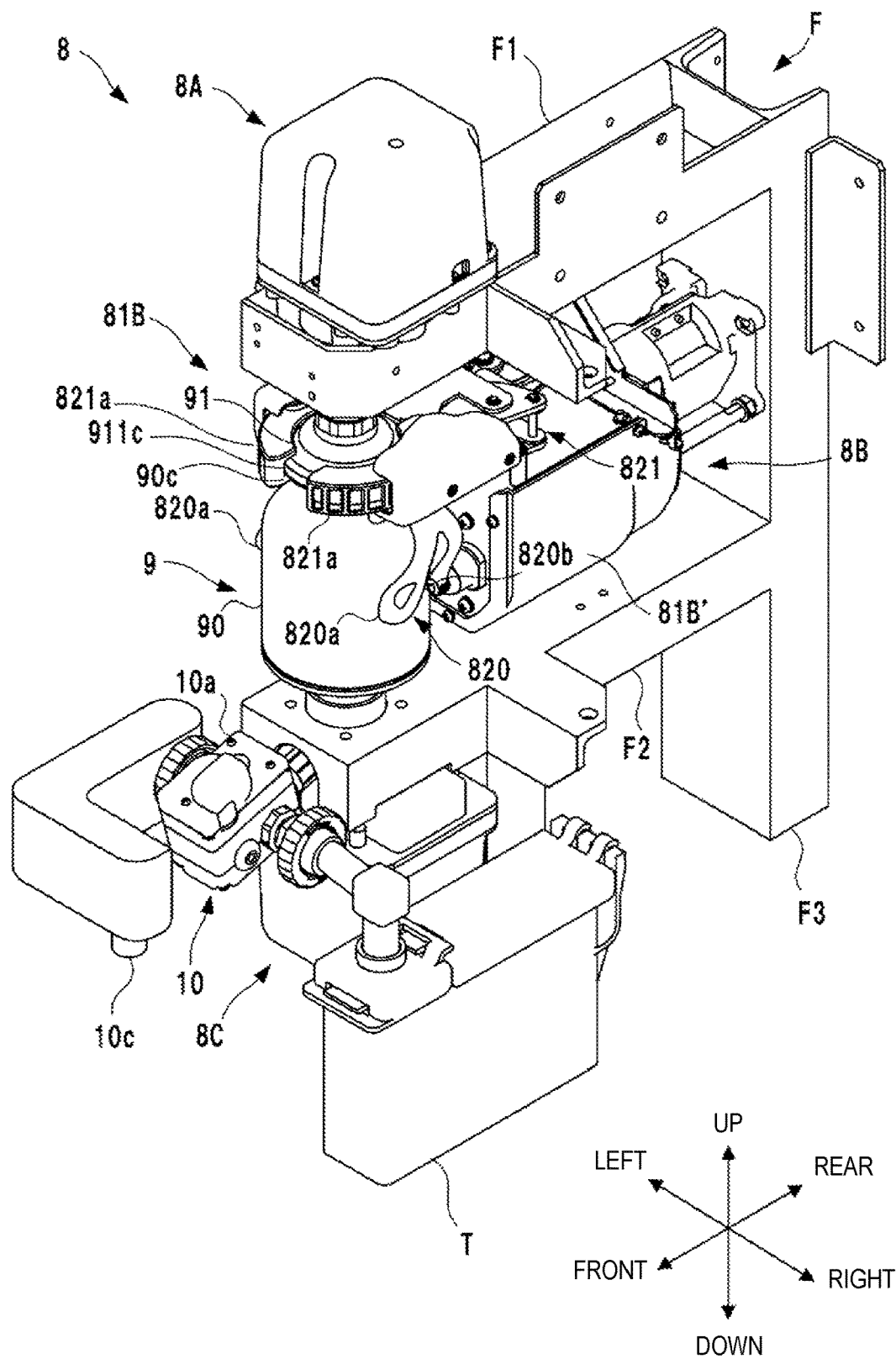
FIG. 5 is a perspective view of a drive unit and an extraction vessel.

With reference to FIG. 5, the drive unit 8 and the extraction vessel 9 of the extraction device 3 will be described. FIG. 5 is a perspective view of the drive unit 8 and the extraction vessel 9. A large part of the drive unit 8 is enclosed with the main body part 101.

The drive unit 8 is supported by a frame F. The frame F includes upper and lower beam parts F1 and F2 and a column part F3 that supports the beam parts F1 and F2. The drive unit 8 is generally divided into three units, an upper unit 8A, a middle unit 8B and a lower unit 8C. The upper unit 8A is supported by the beam part F1. The middle unit 8B is supported by the beam part F1 and the column part F3 between the beam part F1 and the beam part F2. The lower unit 8C is supported by the beam part F2.

The extraction vessel 9 is a chamber that includes a vessel main body 90 and a lid unit 91. The middle unit 9 is referred to also as a chamber. The middle unit 8B includes an arm member 820 that removably holds the vessel main body 90. The arm member 820 includes a holding member 820a and a pair of shaft members 820b spaced apart from each other in the left-right direction. The holding member 820a is an elastic C-shaped clip-like member made of resin or the like, and holds the vessel main body 90 by means of the elastic force thereof. The holding member 82a holds the vessel main body 90 by the left and right side parts thereof, and the front of the vessel main body 90 is exposed. Therefore, the inside of the vessel main body 90 can be easily seen from the front.

The vessel main body 90 is manually attached to and detached from the holding member 820a. The vessel main body 90 is attached to the holding member 820a by pressing the vessel main body 90 rearward in the front-rear direction against the holding member 820a. The vessel main body 90 can be separated from the holding member 820a by pulling the vessel main body 90 frontward in the front-rear direction from the holding member 820a.

Each of the pair of shaft members 820b is a rod extending in the front-rear direction and is a member that supports the holding member 820a. Although the number of the shaft members 820b is two in this embodiment, the number of the shaft members 820b may be one or three or more. The holding member 820a is fixed to front end parts of the pair of shaft members 820b. A mechanism described later can move the pair of shaft members 82b back and forth in the front-rear direction, thereby moving the holding member 820a back and forth, thereby translating the vessel main body 90 in the front-rear direction. The middle unit 8B can also rotate to invert the extraction vessel 9 upside down as described later.

4-2. Extraction Vessel

Figure 6:
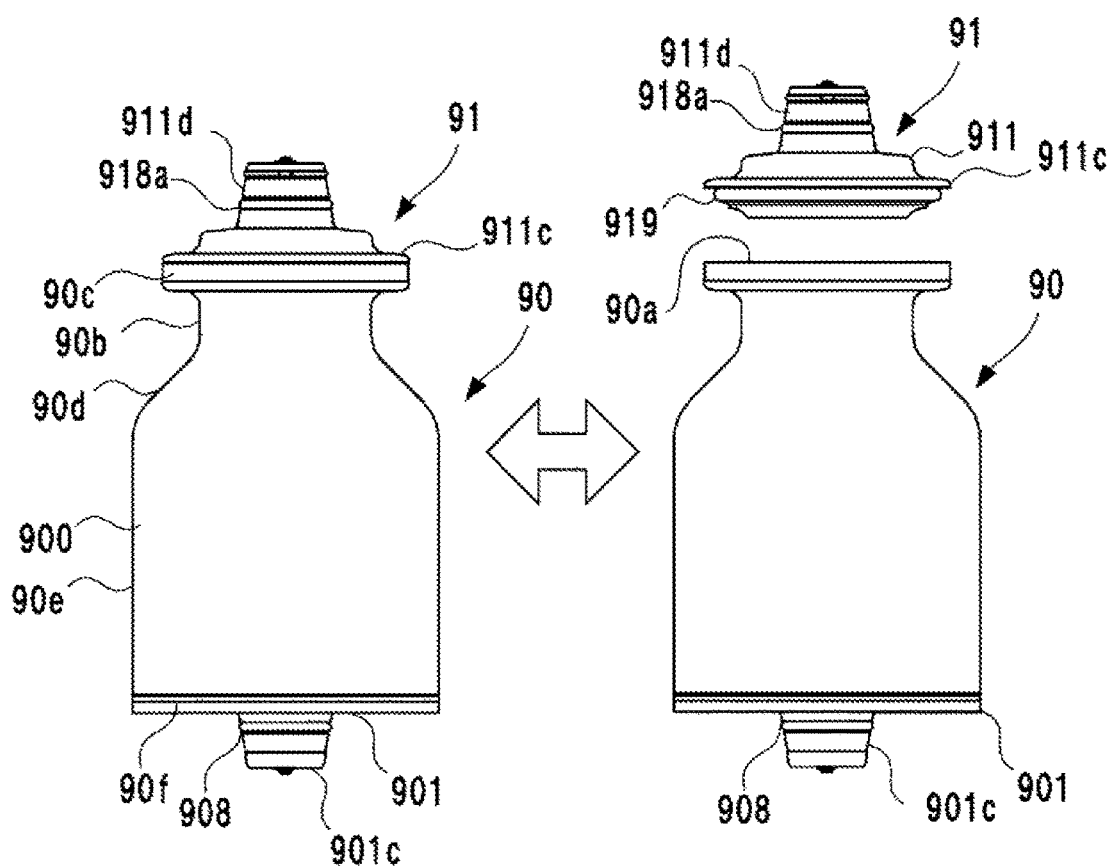
FIG. 6 is diagram showing an open state and a closed state of the extraction vessel in FIG. 5.

With reference to FIG. 6, the extraction vessel 9 will be described. FIG. 6 is a diagram showing an open state and a closed state of the extraction vessel 9. As described above, the extraction vessel 9 is inverted upside down by the middle unit 8B. The extraction vessel 9 in FIG. 6 is in a basic posture, in which the lid unit 91 is located at the top of the middle unit 9. In the following description, any vertical positional relationship means the vertical positional relationship in the basic posture unless otherwise specified.

The vessel main body 90 is a vessel with a closed bottom. The vessel main body 90 has a bottle-like shape and includes a neck part 90b, a shoulder part 90d, a trunk part 90e and a bottom part 90f. The neck part 90b has a flange part 90c formed at an end part thereof (an upper end part of the vessel main body 90), and the flange part 90c defines an opening 90a that is in communication with the interior space of the vessel main body 90.

The neck part 90b and the trunk part 90e have a cylindrical shape. The shoulder part 90d is a part between the neck part 90b and the trunk part 90e, and has a tapered shape with the cross-sectional area of the interior space thereof gradually decreasing as it goes from the trunk part 90e to the neck part 90b.

The lid unit 91 is a unit that opens and closes the opening 90a. The lid unit 91 is opened and closed (raised and lowered) by the action of the upper unit 8A.

The vessel main body 90 includes a main body member 900 and a bottom member 901. The main body member 900 is a cylindrical member with an open top and an open bottom that forms the neck part 90b, the shoulder part 90d and the trunk part 90e. The bottom member 901 is a member that forms the bottom part 90f, and is inserted and fixed in a lower part of the main body member 900. A seal member 902 is interposed between the main body member 900 and the bottom member 901 to improve the air tightness of the interior of the vessel main body 90.

In this embodiment, the main body member 900 is made of a transparent material, such as acrylic or glass, and forms a transparent vessel the whole of which is transparent. The administrator or the beverage consumer can see the process of brewing the coffee beverage in the vessel main body 90 through the cover part 102 and the main body member 900 of the vessel main body 90. The administrator can easily check the brewing operation, and the beverage consumer can enjoy seeing the brewing process.

The bottom member 901 has a projection part 901c at the center thereof, and a communicating hole that connects the interior of the vessel main body 90 to the outside and a valve (a valve 903 in FIG. 8) that opens and closes the communicating hole are provided on the projection part 901c. The communicating hole is used to discharge the waste liquid and residue in the cleaning of the interior of the vessel main body 90. The projection part 901c is provided with a seal member 908, which is a member for hermetically sealing between the upper unit 8A or lower unit 8CB and the bottom member 901.

The lid unit 91 includes a cap-like base member 911. The base member 911 has a projection part 911d and a collar part 911c that rests on the flange part 90c when the lid unit 91 is closed. The projection part 911d has the same structure as the projection part 901c of the vessel main body 90, and is provided with a communicating hole that connects the interior of the vessel main body 90 to the outside and a valve (a valve 913 in FIG. 8) that opens and closes the communicating hole. The communicating hole of the projection part 911d is mainly used to pour hot water into the vessel main body 90 and deliver the coffee beverage. The projection part 911d is provided with a seal member 918a. The seal member 918a is a member for hermetically seals between the upper unit 8A or lower unit 8CB and the base member 911. The lid unit 91 is also provided with a seal member 919. The seal member 919 improves the air tightness between the lid unit 91 and the vessel main body 90 when the lid unit 91 is closed. The lid unit 91 retains a filter for filtration.

4-3. Upper Unit and Lower Unit

Figure 7:
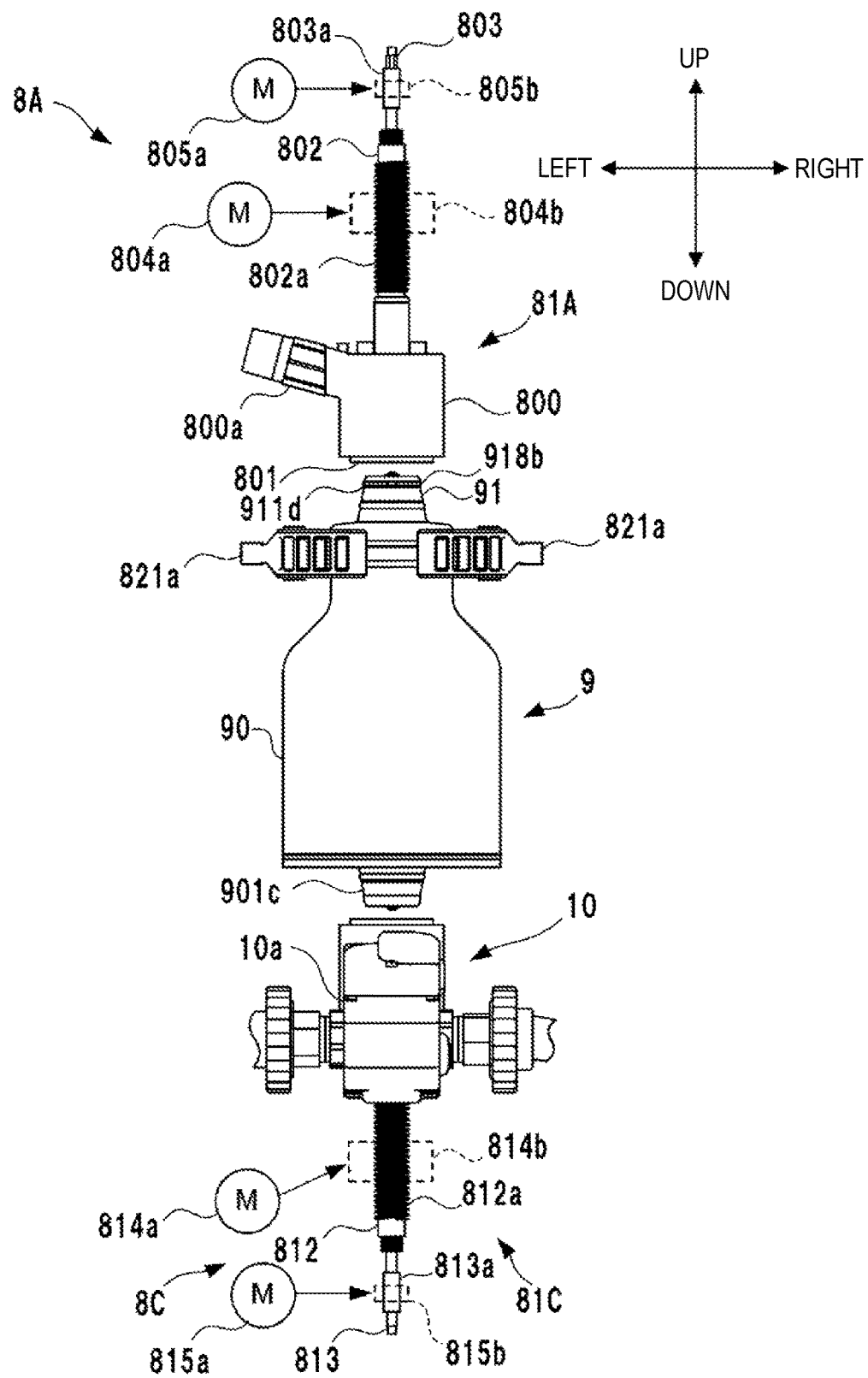
FIG. 7 is a front view showing some components of an upper unit and a lower unit.
Figure 8:
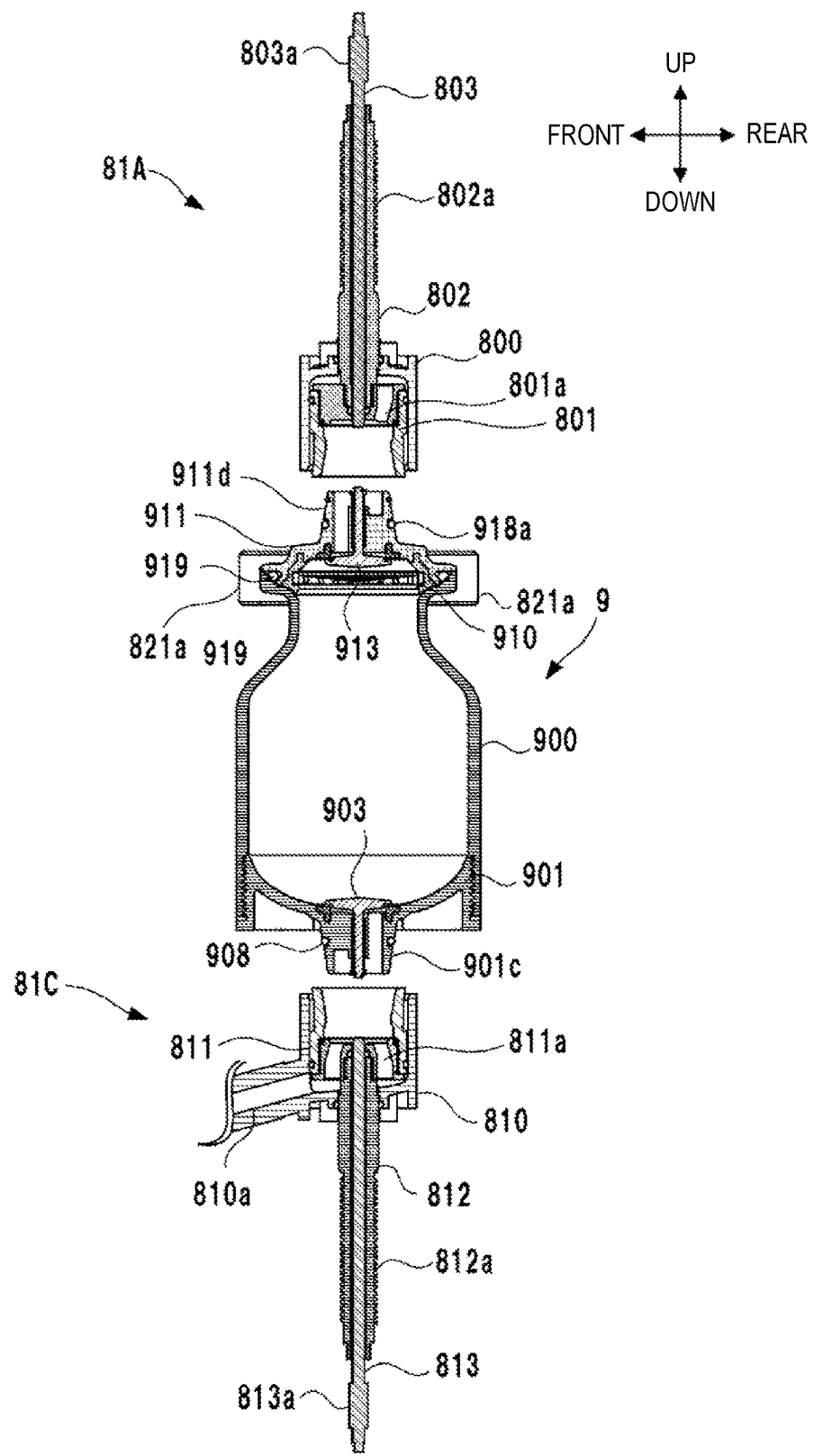
FIG. 8 is a vertical cross-sectional view of the components shown in FIG. 7.

With reference to FIGS. 7 and 8, the upper unit 8A and the lower unit 8C will be described. FIG. 7 is a front view showing some components of the upper unit 8A and the lower unit 8CB, and FIG. 8 is a vertical cross-sectional view of the components shown in FIG. 7.

The upper unit 8A includes an operational unit 81A. The operational unit 81A performs an operation of opening and closing (raising and lowering) the lid unit 91 on the vessel main body 90 and an operation of opening and closing the valves of the projection parts 901c and 911d. The operational unit 81A includes a supporting member 800, a holding member 801, a lifting shaft 802 and a probe 803.

The supporting member 800 is fixed so that the relative position thereof with respect to the frame F does not change, and houses the holding member 801. The supporting member 800 also includes a communicating part 800a that connects the piping L3 to the interior of the supporting member 800. The hot water, tap water or air pressure supplied from the piping L3 is introduced into the supporting member 800 through the communicating part 800a.

The holding member 801 is a member capable of removably holding the lid unit 91. The holding member 801 has a cylindrical space in which the projection part 911d of the lid unit 91 or the projection part 901c of the bottom member 901 is inserted, and has a mechanism that removably holds the projection parts 911d and 901c. The mechanism is a snap-ring mechanism, for example, and is engaged with the projection part when the projection part is pressed against the mechanism with a certain pressing force and is disengaged from the projection part when the projection part is pulled with a certain separating force. The hot water, tap water or air pressure supplied from the piping L3 can be supplied into the extraction vessel 9 through the communicating part 800a and the communicating hole 801a of the holding member 801.

The holding member 801 is a movable member that can slide in the vertical direction in the supporting member 800. The lifting shaft 802 is provided with the axial direction thereof coinciding with the vertical direction. The lifting shaft 802 hermetically passes through a top part of the supporting member 800 in the vertical direction, and can be vertically raised and lowered with respect to the supporting member 800.

A lower end part of the lifting shaft 802 is fixed to a top part of the holding member 801. The lifting shaft 802 can be raised and lowered to make the holding member 801 slide upward and downward in the vertical direction, thereby mounting and separating the holding member 801 onto and from the projection part 911d or 901c. The lifting shaft 802 can also be raised and lowered to open and close the lid unit 91 on the vessel main body 90.

A thread 802a is formed on an outer circumferential surface of the lifting shaft 802 to form a lead screw mechanism. A nut 804b is screwed on the thread 802a. The upper unit 8A includes a motor 804a, which drives the nut 804b to rotate at the fixed position (without vertically moving). The rotation of the nut 804b causes raising and lowering of the lifting shaft 802.

The lifting shaft 802 is a tubular shaft having a through-hole along the central axis thereof, and the probe 803 is inserted in the through-hole in such a manner that the probe 803 can vertically slide. The probe 803 hermetically passes through a top part of the holding member 801 in the vertical direction, and can be vertically raised and lowered with respect to the supporting member 800 and the holding member 801.

The probe 803 is an operational element that opens and closes the valves 913 and 903 in the projection parts 911d and 901c. As the probe 803 is lowered, the valves 913 and 903 in the closed state are opened. As the probe 803 is raised, the valves 913 and 903 in the open state are closed (by the action or a return spring (not shown)).

A thread 803a is formed on an outer circumferential surface of the probe 803 to form a lead screw mechanism. A nut 805b is screwed on the thread 803a. The upper unit 8A includes a motor 805a, which drives the nut 805b to rotate at the fixed position (without vertically moving). The rotation of the nut 805b causes raising and lowering of the probe 803.

The lower unit 8C includes an operational unit 81C. The operational unit 81C has the same structure as the operational unit 81A vertically inverted, and performs an operation of opening and closing the valve 913 or 903 in the projection part 911d or 901c. The operational unit 81C is also configured to be able to open and close the lid unit 91. In this embodiment, however, the operational unit 81C is not used to open and close the lid unit 91.

In the following, the operational unit 81C will be described, although the description will be substantially the same as that of the operational unit 81A. The operational unit 81C includes a supporting member 810, a holding member 811, a lifting shaft 812 and a probe 813.

The supporting member 810 is fixed so that the relative position thereof with respect to the frame F does not change, and houses the holding member 811. The supporting member 810 also includes a communicating part 810a that connects the switch valve 10a of the switch unit 10 and the interior of the supporting member 810 to each other. The coffee beverage, tap water or the residue of the ground beans in the vessel main body 90 is introduced to the switch valve 10a through the communicating part 810a.

The holding member 811 has a cylindrical space in which the projection part 911d of the lid unit 91 or the projection part 901c of the bottom member 901 is inserted, and has a mechanism that removably holds the projection parts 911d and 901c. The mechanism is a snap-ring mechanism, for example, and is engaged with the projection part when the projection part is pressed against the mechanism with a certain pressing force and is disengaged from the projection part when the projection part is pulled with a certain separating force. The coffee beverage, tap water or the residue of the ground beans in the vessel main body 90 is introduced to the switch valve 10a through the communicating part 810a and a communicating hole 811a of the holding member 811.

The holding member 811 is a movable member that can slide in the vertical direction in the supporting member 810. The lifting shaft 812 is provided with the axial direction thereof coinciding with the vertical direction. The lifting shaft 812 hermetically passes through a bottom part of the supporting member 800 in the vertical direction, and can be vertically raised and lowered with respect to the supporting member 810.

A lower end part of the lifting shaft 812 is fixed to a bottom part of the holding member 811. The lifting shaft 812 can be raised and lowered to make the holding member 811 slide upward and downward in the vertical direction, thereby mounting and separating the holding member 811 onto and from the projection part 901c or 911d.

A thread 812a is formed on an outer circumferential surface of the lifting shaft 812 to form a lead screw mechanism. A nut 814b is screwed on the thread 812a. The lower unit 8C includes a motor 814a, which drives the nut 814b to rotate at the fixed position (without vertically moving). The rotation of the nut 814b causes raising and lowering of the lifting shaft 812.

The lifting shaft 812 is a tubular shaft having a through-hole along the central axis thereof, and the probe 813 is inserted in the through-hole in such a manner that the probe 813 can vertically slide. The probe 813 hermetically passes through a bottom part of the holding member 811 in the vertical direction, and can be vertically raised and lowered with respect to the supporting member 810 and the holding member 811.

The probe 813 is an operational element that opens and closes the valves 913 and 903 in the projection parts 911d and 901c. As the probe 813 is raised, the valves 913 and 903 in the closed state are opened. As the probe 813 is lowered, the valves 913 and 903 in the open state are closed (by the action or a return spring (not shown)).

A thread 813a is formed on an outer circumferential surface of the probe 813 to form a lead screw mechanism. A nut 815b is screwed on the thread 813a. The lower unit 8C includes a motor 815a, which drives the nut 815b to rotate at the fixed position (without vertically moving). The rotation of the nut 815b causes raising and lowering of the probe 813.

4-4. Middle Unit

With reference to FIGS. 5 and 9, the middle unit 8B will be described. FIG. 9 is a schematic diagram showing the middle unit 8B. The middle unit 8B includes a supporting unit 81B that supports the extraction vessel 9. The supporting unit 81B includes a unit main body 81B' that supports a lock mechanism 821 in addition to the arm member 820 described above.

The lock mechanism 821 is a mechanism that keeps the lid unit 91 in the closed state on the vessel main body 90. The lock mechanism 821 includes a pair of grasping members 821a that pinch the collar part 911c of the lid unit 91 and the flange part 90c of the vessel main body 90 from above and below. The pair of grasping members 821a have a C-shaped cross section so as to be fitted around the collar part 911c and the flange part 90c, and are opened and closed in the left-right direction by the driving force of a motor 822. When the pair of grasping members 821a are in the closed state, as shown by the solid line in the encircled part of FIG. 9, the grasping members 821a are fitted onto the collar part 911c and the flange part 90c to pinch them from above and below, thereby hermetically locking the lid unit 91 onto the vessel main body 90. In this locked state, even if someone tries to open the lid unit 91 by raising the holding member 801 with the lifting shaft 802, the lid unit 91 does not move (the lock is not released). That is, the locking force of the lock mechanism 821 is set to be higher than the force to open the lid unit 91 with the holding member 801. In this way, the lid unit 91 on the vessel main body 90 can be prevented from being opened when an abnormality occurs.

When the pair of grasping members 821a are in the open state, as shown by the dashed line in the encircled part of FIG. 9, the grasping members 821a are spaced apart from the collar part 911c and the flange part 90c, and the lid unit 91 and the vessel main body 90 are unlocked from each other.

When the holding member 801 is holding the lid unit 91, and the holding member 801 is raised from a lowered position to a raised position, the lid unit 91 is separated from the vessel main body 90 if the pair of grasping members 821a are in the open state. To the contrary, if the pair of grasping members 821a are in the closed state, the holding member 801 releases the lid unit 91, and only the holding member 801 is raised.

The middle unit 8B further includes a mechanism that horizontally moves the arm member 820 in the front-rear direction with a motor 823 as a drive source. This mechanism allows the vessel main body 90 supported by the arm member 820 to be moved between an extraction position (a state ST1) toward the rear of the beverage making apparatus 1 and a bean input position (a state ST2) toward the front of the beverage making apparatus 1. The bean input position is a position where ground beans are input to the vessel main body 90, and beans ground by the grinder 5B are input through the discharge pipe 5C to the opening 90a of the vessel main body 90 with the lid unit 91 separated therefrom. In other words, the discharge pipe 5C is positioned above the vessel main body 90 located in the bean input position.

The extraction position is a position where the vessel main body 90 can be operated by the operational units 81A and 81C. The extraction position is a position on the same axis as the probes 803 and 813 where the coffee liquid is extracted. The extraction position is located further toward the rear than the bean input position. FIGS. 5, 7 and 8 show the vessel main body 90 in the extraction position. Since the vessel main body 90 is located at different positions between when inputting ground beans and when extracting the coffee liquid and supplying water, steam produced when extracting the coffee liquid can be prevented from coming into contact with the discharge pipe 5C, which is a part for supplying ground beans.

The middle unit 8B further includes a mechanism that rotates the supporting unit 81B about a shaft 825 extending in the front-rear direction with a motor 824 as a drive source. This mechanism allows the posture of the vessel main body 90 to be changed from an upright posture with the neck part 90b at the top (in the state ST1) to an inverted posture with the neck part 90b at the bottom (in a state ST3). While the extraction vessel 9 is being rotated, the lock mechanism 821 keeps the lid unit 91 locked onto the vessel main body 90. The vertical positional relationship concerning the extraction vessel 9 is inverse between the upright posture and the inverted posture. In the inverted posture, the projection part 911d is located at the position of the projection part 901c in the upright posture. In the inverted posture, the projection part 901c is located at the position of the projection part 911d in the upright posture. Therefore, in the inverted posture, the operational unit 81A can perform the operation of opening and closing the valve 903, and the operational unit 81C can perform the operation of opening and closing the valve 913.

5. Control Device

Figure 10:
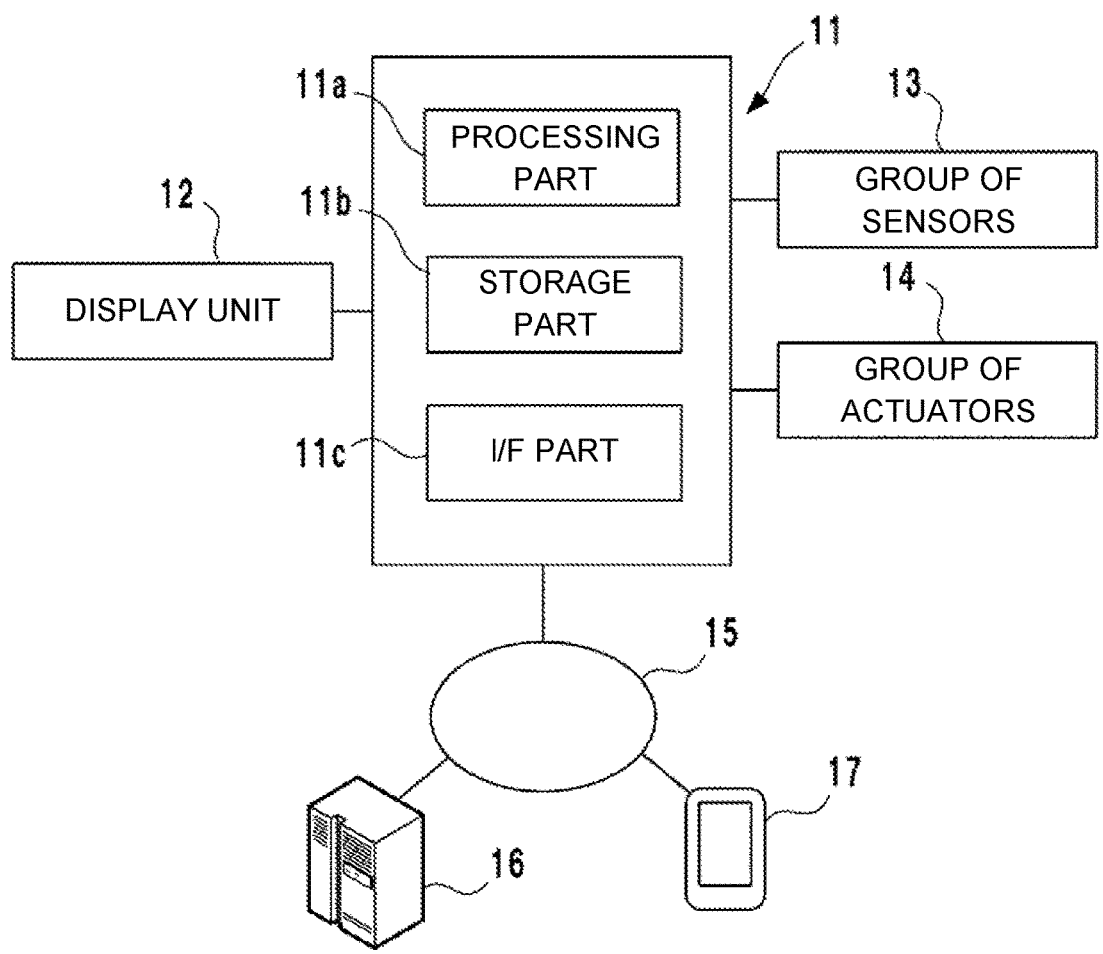
FIG. 10 is a block diagram showing a control device of the beverage making apparatus in FIG. 1.

With reference to FIG. 10, a control device 11 of the beverage making apparatus 1 will be described. FIG. 10 is a block diagram showing the control device 11.

The control device 11 controls the whole of the beverage making apparatus 1. The control device includes a processing part 11a, a storage part 11b, and an interface (I/F) part 11c. The processing part 11a is a processor, such as a CPU. The storage part 11b is a RAM or ROM, for example. The I/F part 11c includes an input/output interface for input and output signals between an external device and the processing part 11a. The I/F part 11c further includes a communication interface capable of data communication with a server 16 over a communication network 15, such as the Internet. The server 16 can communicate with a mobile terminal 17, such as a smartphone, over the communication network 15, and can receive a request for beverage production, customer feedback or other information from the mobile terminal 17 of the beverage consumer.

The processing part 11a executes a program stored in the storage part 11b and controls a group of actuators 14 according to a command from the information display device 12, a detection result from a group of sensors 13, or a command from the server 16. The group of sensors 13 includes various sensors provided in the beverage making apparatus 1 (such as a temperature sensor for hot water, an operating position sensor for a mechanism, or a pressure sensor). The group of actuators 14 includes various actuators provided in the beverage making apparatus 1 (such as a motor, a solenoid valve, or a heater).

65. Example of Operation Control

Figure 11A:
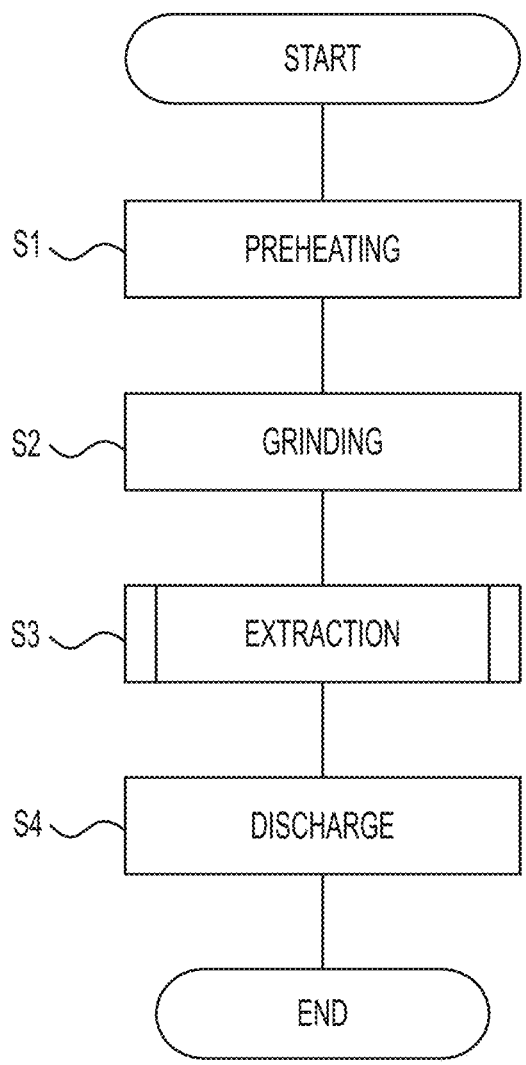
FIGS. 11(A) and 11(B) are flowcharts showing an example of a control performed by the control device.

With reference to FIGS. 11A(A) and 11(B), an example of a process of controlling the beverage making apparatus 1 performed by the processing part 11a will be described. FIG. 11(A) shows an example of a control involved with one coffee beverage production process. A state of the beverage making apparatus 1 before a production command is referred to as a standby state. In the standby state, each mechanism is in the state described below.

The extraction device 3 is in the state shown in FIG. 5. The extraction vessel 9 is in the upright posture and is located in the extraction position. The lock mechanism 821 is in the closed state, and the lid unit 91 closes the opening 90a of the vessel main body 90. The holding member 801 is at the lowered position and is mounted on the projection part 911d. The holding member 811 is at the raised position and is mounted on the projection part 901c. The valves 903 and 913 are in the closed state. The switch valve 10a allows communication of the communicating part 810a of the operational unit 8C to the waste tank T.

In the standby state, when a coffee beverage production command occurs, the process shown in FIG. 11(A) is performed. In Step S1, a preheating processing is performed. This processing is a processing of pouring hot water into the vessel main body 90 to heat the vessel main body 90 in advance. First, the valves 903 and 913 are opened. As a result, the piping L3, the extraction vessel 9 and the waste tank T come into communication with each other.

The solenoid valve 72i is opened and kept open for a predetermined time (1500 ms, for example) and then closed. This allows hot water to be poured from the water tank 72 into the extraction vessel 9. The solenoid valve 73 is then opened and kept open for a predetermined time (500 ms, for example) and then closed. This allows the air in the extraction vessel 9 to be compressed to promote discharge of hot water to the waste tank T. By this processing, the interior of the extraction vessel 9 and the piping L2 are preheated, and the decrease of the temperature of the hot water can be reduced in the following production of the coffee beverage.

In Step S2, a grinding processing is performed. In this step, roasted coffee beans are ground, and the ground beans are input to the vessel main body 90. First, the lock mechanism 821 is opened, and the holding member 801 is raised to the raised position. The lid unit 91 is held by the holding member 801 and therefore raised with the holding member 801. As a result, the lid unit 91 is separated from the vessel main body 90. The holding member 811 is lowered to the lowered position. The vessel main body 90 is moved to the bean input position. The storage device 4 and the griding device 5 are then activated. This allows roasted coffee beans for a cup of coffee beverage to be supplied to the grinder 5A from the storage device 4. The grinders 5A and 5B grind the roasted coffee beans in two steps, and the separating device 6 separates unwanted matters from the roasted coffee beans. The ground beans are input to the vessel main body 90.

The vessel main body 90 is returned to the extraction position. The holding member 801 is lowered to the lowered position to mount the lid unit 91 onto the vessel main body 90. The lock mechanism 821 is closed to hermetically lock the lid unit 91 onto the vessel main body 90. The holding member 811 is raised to the raised position. Of the valves 903 and 913, the valve 903 is in the open state, and the valve 913 is in the closed state.

Figure 11B:
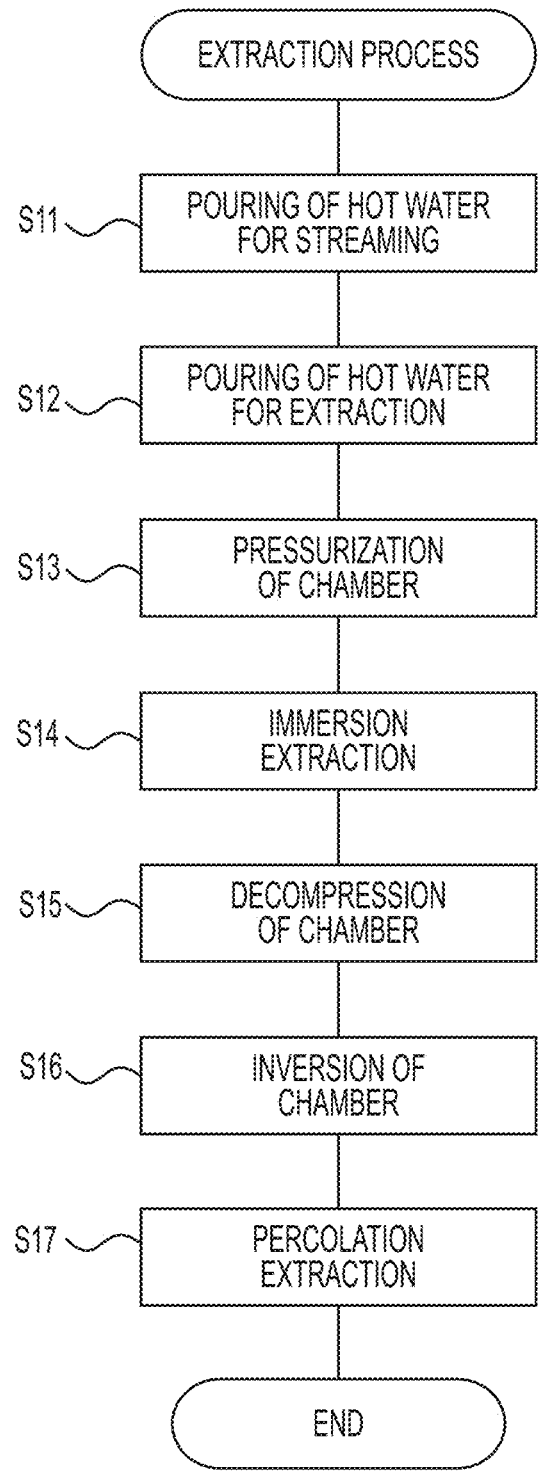

In Step S3, an extraction processing is performed. In this example, coffee liquid is extracted from the ground beans in the vessel main body 90. FIG. 11(B) is a flowchart showing the extraction processing of Step S3.

In Step S11, in order to steam the ground beans in the extraction vessel 9, a smaller amount of hot water than the amount of hot water for a cup is poured into the extraction vessel 9. In this example, the solenoid valve 72*i* is opened and kept open for a predetermined time (500 ms, for example) and then closed. This allows hot water to be poured from the water tank 72 into the extraction vessel 9. The processing of Step S11 is then ended after a predetermined waiting time (5000 ms, for example). By this processing, the ground beans can be steamed. By steaming the ground beans, carbonic acid gas can be released from the ground beans, and the subsequent extraction can be more effectively performed.

In Step S12, the remainder of the hot water for a cup of coffee beverage is poured into the extraction vessel 9 so that the hot water for a cup of coffee beverage is accommodated in the extraction vessel 9. In this example, the solenoid valve 72*i* is opened and kept open for a predetermined time (7000 ms, for example) and then closed. This allows the hot water to be poured from the water tank 72 into the extraction vessel 9.

The processing of Step S12 can set the interior of the extraction vessel 9 at a temperature (about 110° C., for example) higher than 100° C. at 1 atmosphere. In Step S13, the interior of the extraction vessel 9 is then pressurized. In this example, the solenoid valve 73*b* is opened and kept open for a predetermined time (1000 ms, for example) and then closed, thereby pressuring the interior of the extraction vessel 9 to an air pressure (about 4 atmospheres (a gauge pressure of about 3 atmospheres), for example) at which the hot water does not boil. The valve 903 is then closed.

This state is then kept for a predetermined time (7000 ms, for example) to perform immersion extraction of coffee liquid (S14). In this way, immersion extraction of coffee liquid is performed at high temperature and high pressure. The immersion extraction at high temperature and high pressure can have the following advantages. First, the high pressure facilitates penetration of hot water into the ground beans and extraction of coffee liquid. Second, the high temperature promotes extraction of coffee liquid. Third, because of the high temperature, the viscosity of oil in the ground beans decreases, and extraction of the oil is promoted. In this way, a more flavorful coffee beverage can be produced.

Although the temperature of the hot water (high-temperature water) can be any temperature higher than 100° C., a higher temperature is more advantageous for extraction of coffee liquid. In general, however, raising the temperature of the hot water leads to an increase of cost. For these reasons, the temperature of the hot water can be set to be equal to or higher than 105° C., 110° C. or 115° C. and equal to or lower than 130° C. or 120° C., for example. The air pressure can be any air pressure at which the hot water does not boil.

In Step S15, the interior of the extraction vessel 9 is decompressed. In this example, the air pressure in the extraction vessel 9 is set at an air pressure at which the hot water boils. Specifically, the valve 913 is opened, and the solenoid valve 73*c* is opened and kept open for a predetermined time (1000 ms, for example) and then closed. The extraction vessel 9 is opened to the ambient air. The valve 913 is then closed again.

The interior of the extraction vessel 9 is rapidly decompressed to an air pressure lower than the bubble point pressure, and the hot water in the extraction vessel 9 rapidly boils. The hot water and the ground beans in the extraction vessel 9 are explosively scattered in the extraction vessel 9. In this way, the hot water can be made to uniformly boil. In addition, destruction of the cell walls of the ground beans can be promoted, and the subsequent extraction of coffee liquid can be further promoted. In addition, the ground beans and the hot water can be agitated by this boiling, and the extraction of coffee liquid can be promoted. In this embodiment, in this way, the efficiency of extraction of coffee liquid can be improved.

In Step S16, the extraction vessel 9 is inverted from the upright posture to the inverted posture. In this example, the holding member 801 is moved to the raised position, and the holding member 811 is moved to the lowered position. The supporting unit 81B is then rotated. The holding member 801 is then returned to the lowered position, and the holding member 811 is returned to the raised position. In the inverted posture, the extraction vessel 9 has the neck part 90*b* and the lid unit 91 located at the bottom.

In Step S17, percolation extraction of coffee liquid is performed, and the coffee beverage is delivered into the cup C. In this example, the switch valve 10*a* is switched to make the pouring part 10*c* be in communication with the channel part 810*a* of the operational unit 81C. The valves 903 and 913 are closed. Furthermore, the solenoid valve 73*b* is opened and kept open for a predetermined time (10000 ms, for example) to set the interior of the extraction vessel 9 at a predetermined air pressure (1.7 atmospheres (a gauge pressure of 0.7 atmospheres), for example). In the extraction vessel 9, the coffee beverage made of hot water and coffee liquid dissolved in the hot water passes through a filter in the lid unit 91 and is delivered into the cup C. The filter prevents the residue of the ground beans from being delivered. This is the end of the extraction processing.

In this embodiment, the efficiency of extraction of coffee liquid is improved by the combination of the immersion extraction in Step S14 and the percolation extraction in Step S17. When the extraction vessel 9 is in the upright posture, the ground beans are accumulated on the bottom part 90*f* in the trunk part 90*e*. When the extraction vessel 9 is in the inverted posture, the ground beans are accumulated in the neck part 90*b* and the shoulder part 90*d*. The trunk part 90*e* has a greater cross-sectional area than the neck part 90*b*, so that the thickness of the accumulated ground beans is greater in the inverted posture than in the upright posture. That is, the ground beans are accumulated in the extraction vessel 9 to a relatively small thickness over a relatively wide area in the upright posture and accumulated to a relatively great thickness over a relatively narrow area in the inverted posture.

In this embodiment, the immersion extraction in Step S14 is performed with the extraction vessel 9 in the upright posture, so that the hot water and the ground beans can come into contact with each other over a wider area, so that the efficiency of the extraction of coffee liquid can be improved. In the immersion extraction, however, the hot water and the ground beans tend to partially come into contact with each other. On the other hand, the percolation extraction in Step S17 is performed with the extraction vessel 9 in the inverted posture, the hot water passes through the accumulated ground beans while coming into contact with more ground beans. The hot water more uniformly comes into contact with the ground beans, so that the efficiency of the extraction of coffee liquid can be further improved.

Referring back to FIG. 11(A), after the extraction processing in Step S3, a discharge processing is performed in Step S4. In this example, a processing relating to cleaning of the interior of the extraction vessel 9 is performed. The cleaning of the extraction vessel 9 is performed by returning the extraction vessel 9 from the inverted posture to the upright posture and then supplying tap water (purified water) to the extraction vessel 9. The interior of the extraction vessel 9 is then pressurized to discharge the water in the extraction vessel 9 and the residue of the ground beans to the waste tank T.

This is the end of one coffee beverage production process. After that, the same process is repeated each time a production command occurs. The time required for one coffee beverage production is about 60 to 90 seconds, for example.

Figure 12:
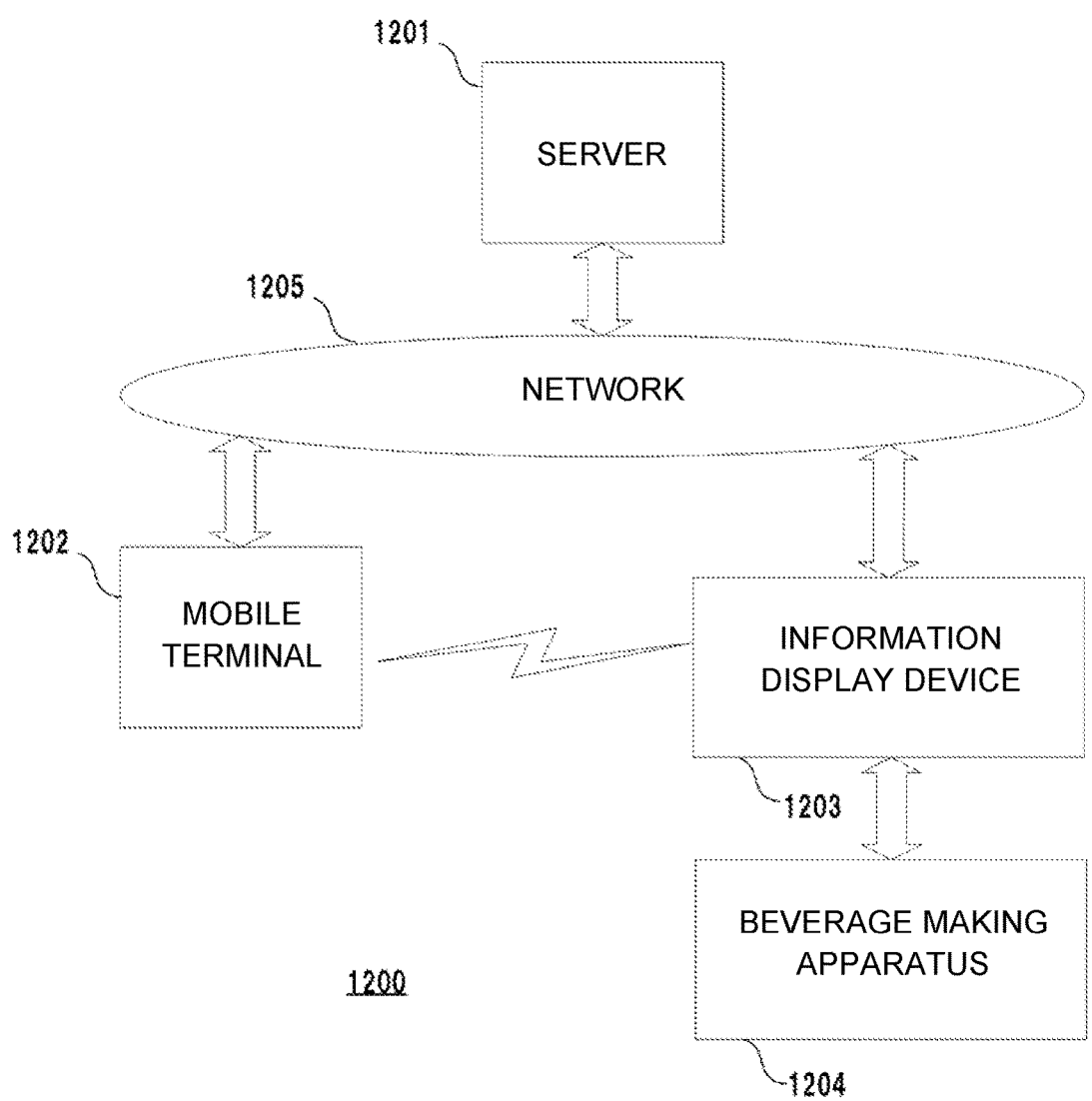
FIG. 12 is a diagram showing a general configuration of a system including the beverage making apparatus.

Next, with reference to FIG. 12, an application system (referred to simply as a system, hereinafter) including the beverage making apparatus 1 will be described. FIG. 12 is a diagram showing a general configuration of a system 1200 including the beverage making apparatus 1. The system 1200 includes a server 1201, a mobile terminal 1202, an information display device 1203, and a beverage making apparatus 1204. The beverage making apparatus 1204 corresponds to the beverage making apparatus 1, and the interface production device 1204 corresponds to the information display device 12. The mobile terminal 1202 is a smartphone of a user, for example. The server 1201, the mobile terminal 1202 and the information display device 1203 are communicably connected to each other over a network 1205, such as the Internet. The information display device 1203 and the beverage making apparatus 1204 are located at a shop that provides coffee beans or beverage, for example, and the information display device 1203 is capable of short-range radio communication based on Bluetooth (registered trademark) or the like with the mobile terminal 1202 of the user.

In the system 1200, the server 1201 can provide various services (functions) relating to coffee via an application downloaded to the mobile terminal 1202. The functions provided by the server 1201 include a service concerning rewards points that can be used at a shop (such as a cafe), a coffee beans online shopping service, a review service concerning purchases, such as commenting or rating, and a custom recipe service described later, for example. The services provided by the server 1201 are not limited to these but may include a cafe search service or a service for editing an image of a cup of coffee ordered by the user taken by the mobile terminal 1202 before uploading the image to the user's social media site. The user can receive various services relating to coffee, such as those described above, by clicking or otherwise activating the application downloaded from the server 1201.

Figure 13:
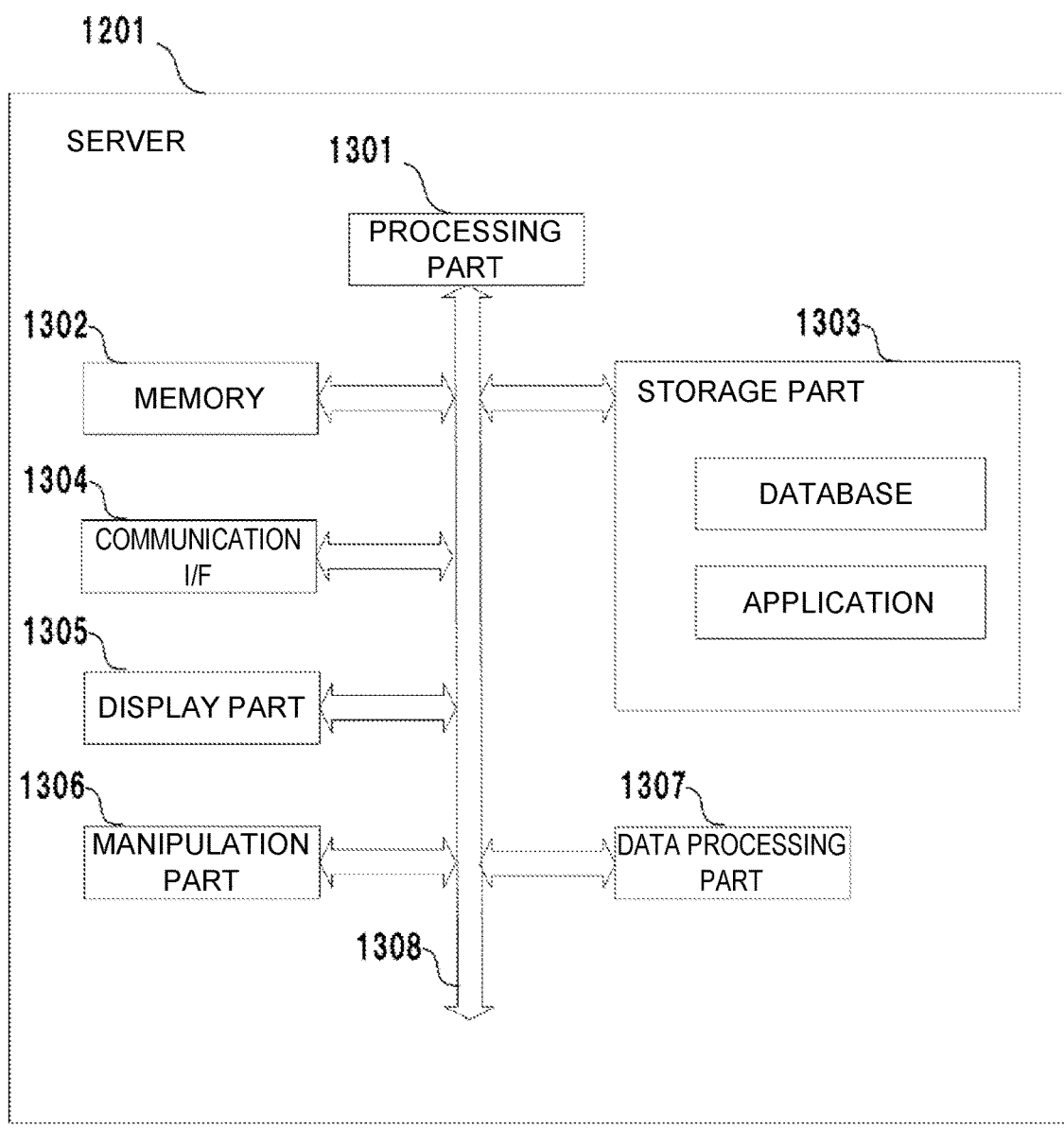
FIG. 13 is a diagram showing a configuration of a server.

FIG. 13 is a diagram showing a configuration of the server 1201. A processing part 1301 includes a CPU, for example, and controls the server 1201 in a centralized manner. In this embodiment, the operation of the server 1201 is achieved by the processing part 1301 loading a program stored in a storage part 1303 to a memory 1302 and executing the program. The memory 1302 is also used as a working memory for the CPU of the processing part 1301. The storage part 1303 stores a basic control program, data and a parameter that allow the server 1201 to operate. Various databases 1309 are built in the storage part 1303. For example, the databases are built based on review information or comment information transmitted from the mobile terminal 1202 of each user or information on a custom recipe. The storage part 1303 also stores various applications 1310, such as an application that can provide any of the services described above. The user can access the server 1201 via the mobile terminal 1202 to download an application to the mobile terminal 1202.

A communication interface (I/F) 1304 is configured to the medium of the network 1205, such as whether the medium is wired or wireless. A display part 1305 is a display, for example, and displays a user interface screen to an administrator who builds the databases 1309, for example. A manipulation part 1306 is a keyboard or a mouse, for example, and can receive a manipulation of the administrator.

A data processing part 1307 includes a GPU, for example, and analyzes a feature value based on big data transmitted from the mobile terminal 1202 of each user. The big data transmitted from the mobile terminal 1202 of each user may be organized as a database 1309, or the result of an analysis by the data processing part 1307 may be organized as a database 1309. The parts shown in FIG. 13 can be connected to each other by a bus 1308.

Figure 14:
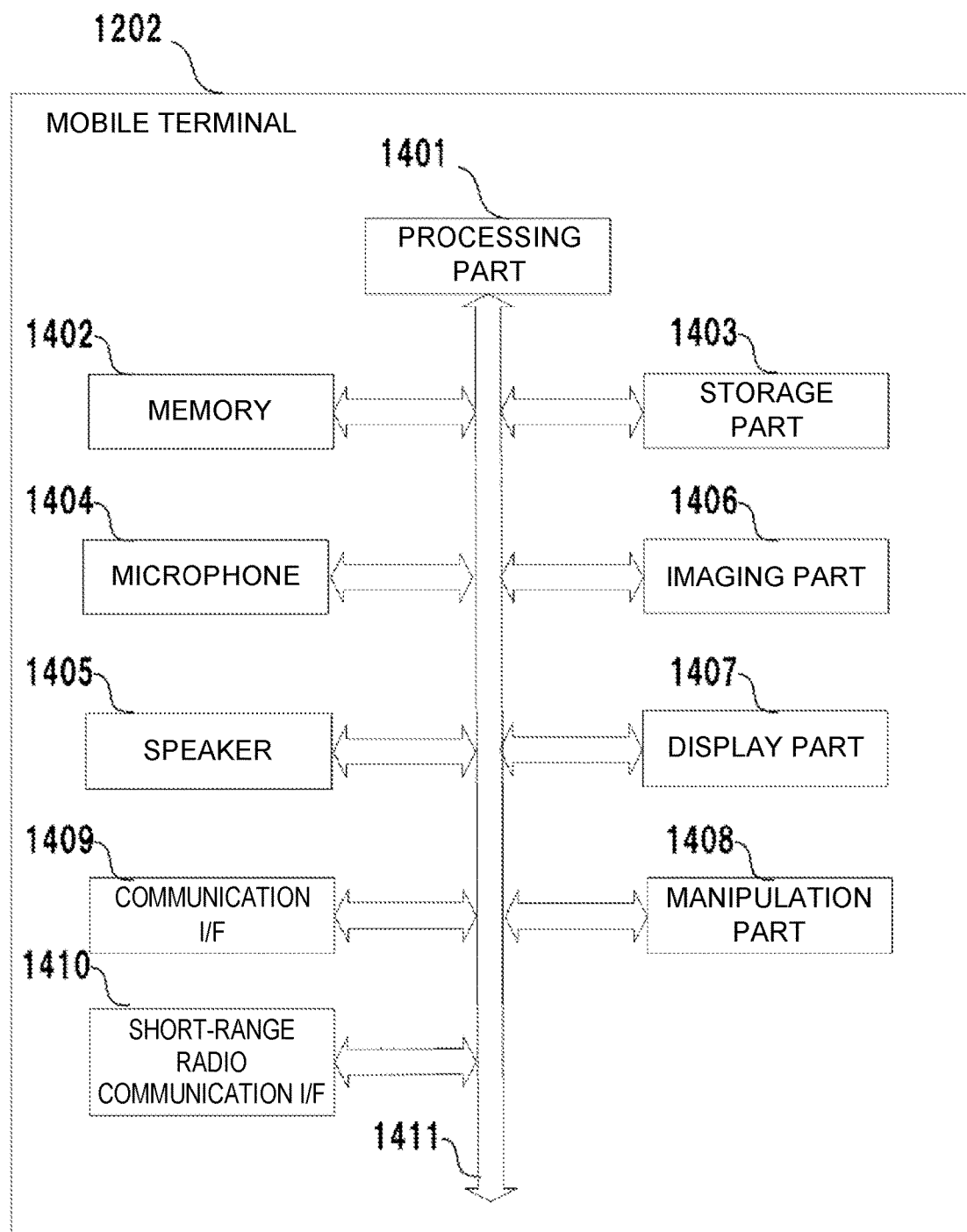
FIG. 14 is a diagram showing a configuration of a mobile terminal.

FIG. 14 is a diagram showing a configuration of the mobile terminal 1202. As described above, the mobile terminal 1202 is a smartphone of a user, for example. A processing part 1401 includes a CPU, for example, and controls the mobile terminal 1202 in a centralized manner. In this embodiment, the operation of the mobile terminal 1202 is achieved by the processing part 1401 loading a program stored in a storage part 1403 to a memory 1402 and executing the program, for example. The memory 1402 is also used as a working memory for the CPU of the processing part 1401. The storage part 1403 stores a basic control program, data and a parameter that allow the mobile terminal 1202 to operate. The storage part 1403 also stores an application 1310 downloaded from the server 1201.

A microphone 1404 receives a voice of the user, a speaker 1405 outputs a voice of another user or reproduces a message based on predetermined sound data. An imaging part 1406 is a camera and generates image data of a static image or a moving image. A display part 1407 is a touch panel and displays an icon for activating the application 1310 or various user interface screens relating to the application 1310, for example. The display part 1407 can also receive a manipulation from the user via the touch panel. A manipulation part 1408 can receive a manipulation of the user, and is a power button or a volume button, for example.

A communication I/F 1409 is configured to the medium of the network 1205, such as whether the medium is wired or wireless. A short-range radio communication I/F 1410 performs a communication according to a different communication scheme than that of the communication I/F 1409, such as Bluetooth. In this embodiment, the mobile terminal 1202 can communicate information on a custom recipe or the like to the information display device 1203 via the short-range radio communication I/F 1410. The parts shown in FIG. 14 can be connected to each other by a bus 1411.

Figure 15:
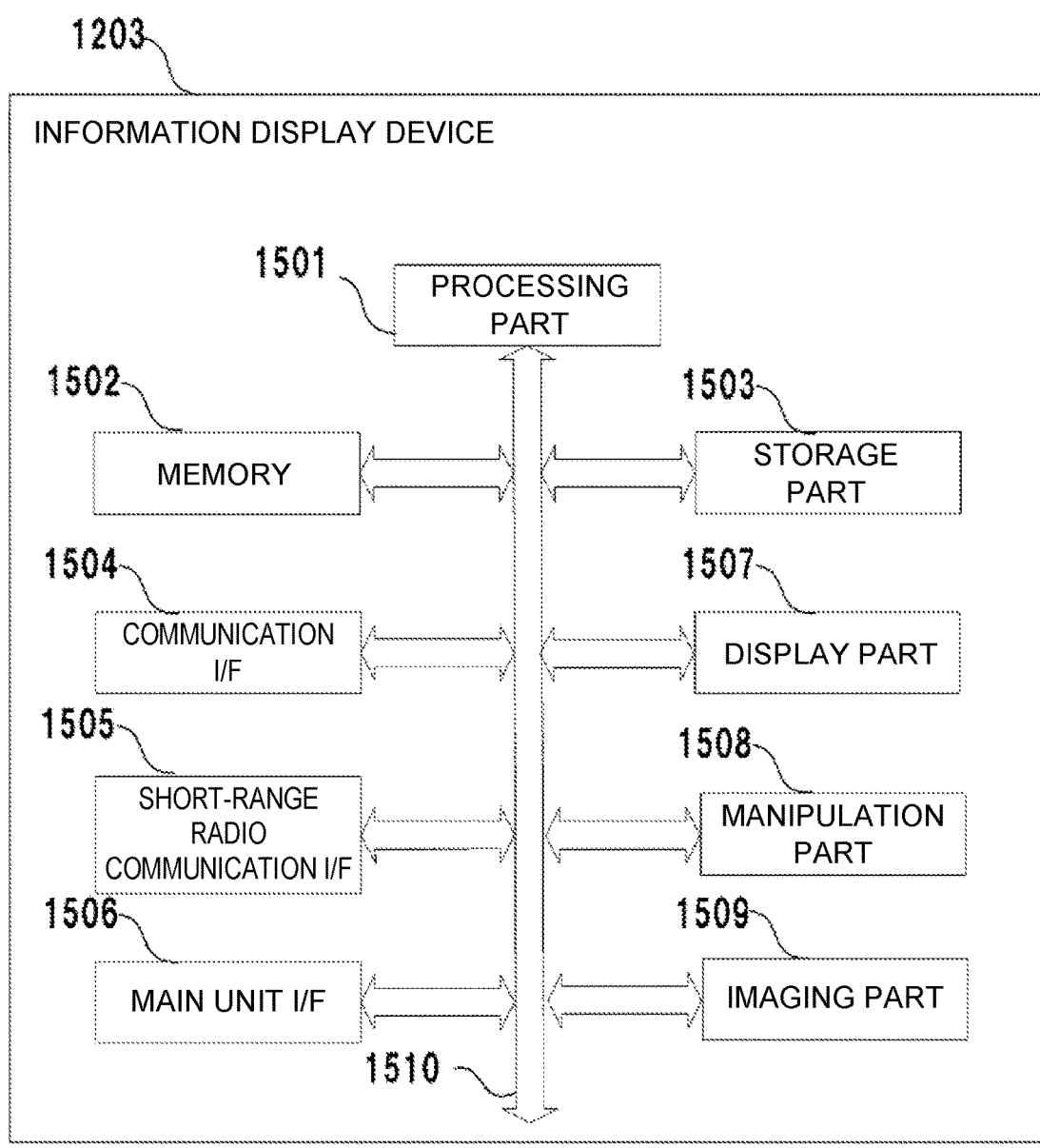
FIG. 15 is a diagram showing a configuration of an information display device.

FIG. 15 is a diagram showing a configuration of the information display device 1203. As described above, the information display device 1203 corresponds to the information display device 12. A processing part 1501 includes a CPU, for example, and controls the information display device 1203 in a centralized manner. In this embodiment, the operation of the information display device 1203 is achieved by the processing part 1501 loading a program stored in a storage part 1503 to a memory 1502 and executing the program, for example. The memory 1502 is also used as a working memory for the CPU of the processing part 1501. The storage part 1503 stores a basic control program, data and a parameter that allow the information display device 1203 to operate.

A communication I/F 1504 is configured to the medium of the network 1205, such as whether the medium is wired or wireless. A short-range radio communication I/F 1505 performs a communication according to a different communication scheme than that of the communication I/F 1504, such as Bluetooth. In this embodiment, the information display device 1203 can receive information on a custom recipe or the like from the mobile terminal 1202 via the short-range radio communication I/F 1505.

A display part 1507 is a touch panel and displays a user interface screen that allows the user to use the beverage making apparatus 1204. A manipulation part 1508 can receive a manipulation from the user and includes a hardware key for entry or the like. When the display part 1507 is a touch panel, the manipulation part 1508 may be implemented as a software key on the touch panel.

An imaging part 1509 is a camera and generates image data of a static image. The imaging part 1509 can take a photograph of beans brought to the shop by the user or of a two-dimensional code displayed on the display part 1407 of the mobile terminal 1202, for example. By taking a photograph of a two-dimensional code displayed on the display part 1407 of the mobile terminal 1202, the information display device 1203 becomes able to communicate with the mobile terminal 1202 according to a communication scheme different from the communication schemes of the communication I/F 1504 and the short-range radio communication I/F 1505. A main unit I/F 1506 is an interface part to the control device 11 and transmits coffee beans choice information or extraction profile information set by the user via the display part 1507 and the manipulation part 1508 to the control device 11, for example. The parts shown in FIG. 15 can be connected to each other by a bus 1510.

Figure 16:
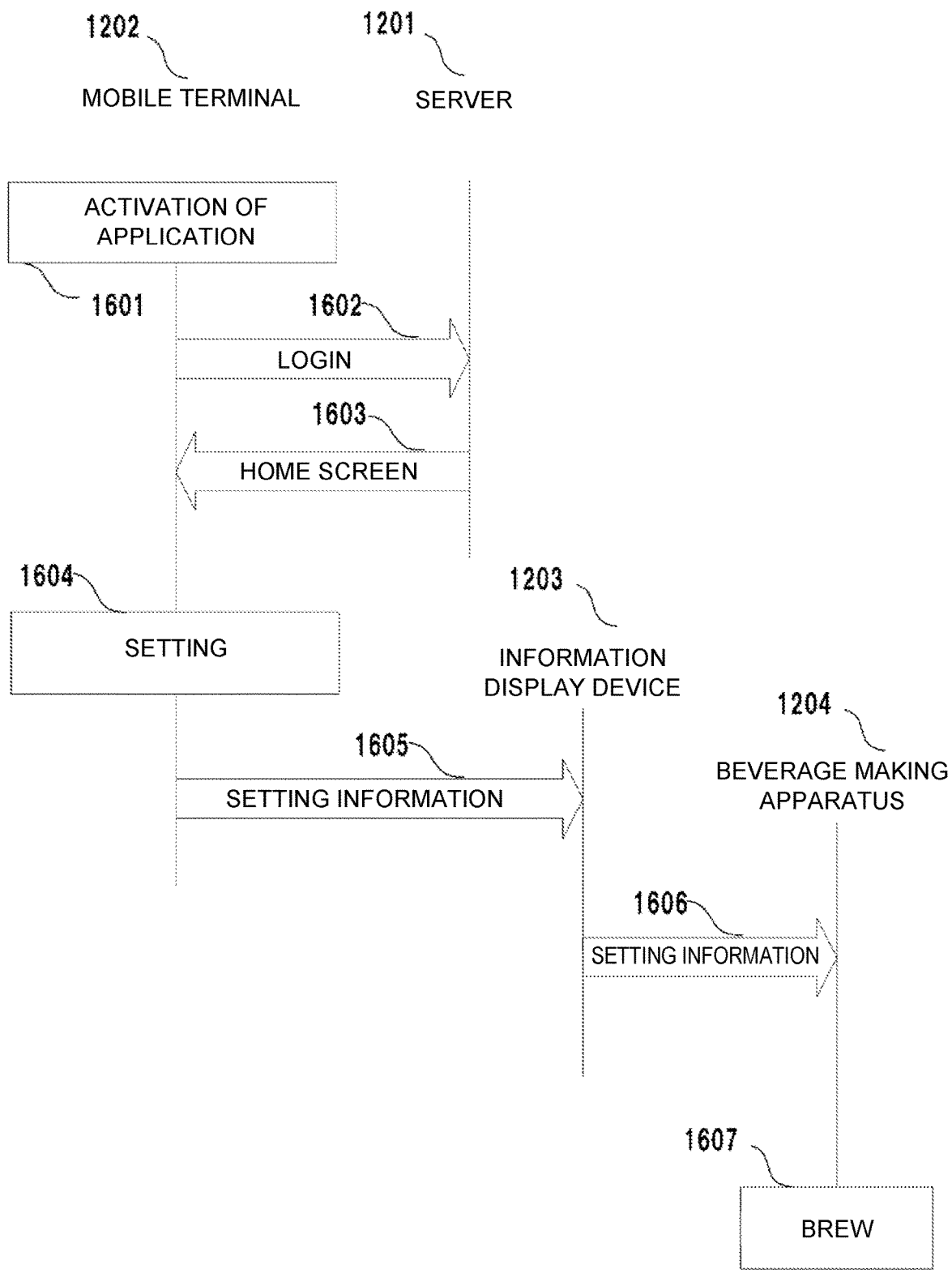
FIG. 16 is a diagram for illustrating a flow of a process until coffee is brewed.

FIG. 16 is a diagram for illustrating a flow of a process in which the user uses the mobile terminal 1202 to customize a recipe and uses the beverage making apparatus 1204 to brew coffee in the system 1200.

First, the user clicks an icon displayed on the display part 1407 of the mobile terminal 1202 to activate the application 1310 that has been downloaded from the server 1201 in advance (Step 1601). Once the application 1310 is activated on the mobile terminal 1202, a login screen that allows the user to log in the server 1201 is displayed on the display part 1407 of the mobile terminal 1202. The user inputs an ID and a password obtained in advance on the login screen (Step 1602). Once the server 1201 has authenticated the user, the server 1201 returns a home screen of the application 1310 to the mobile terminal 1202.

Figure 18:
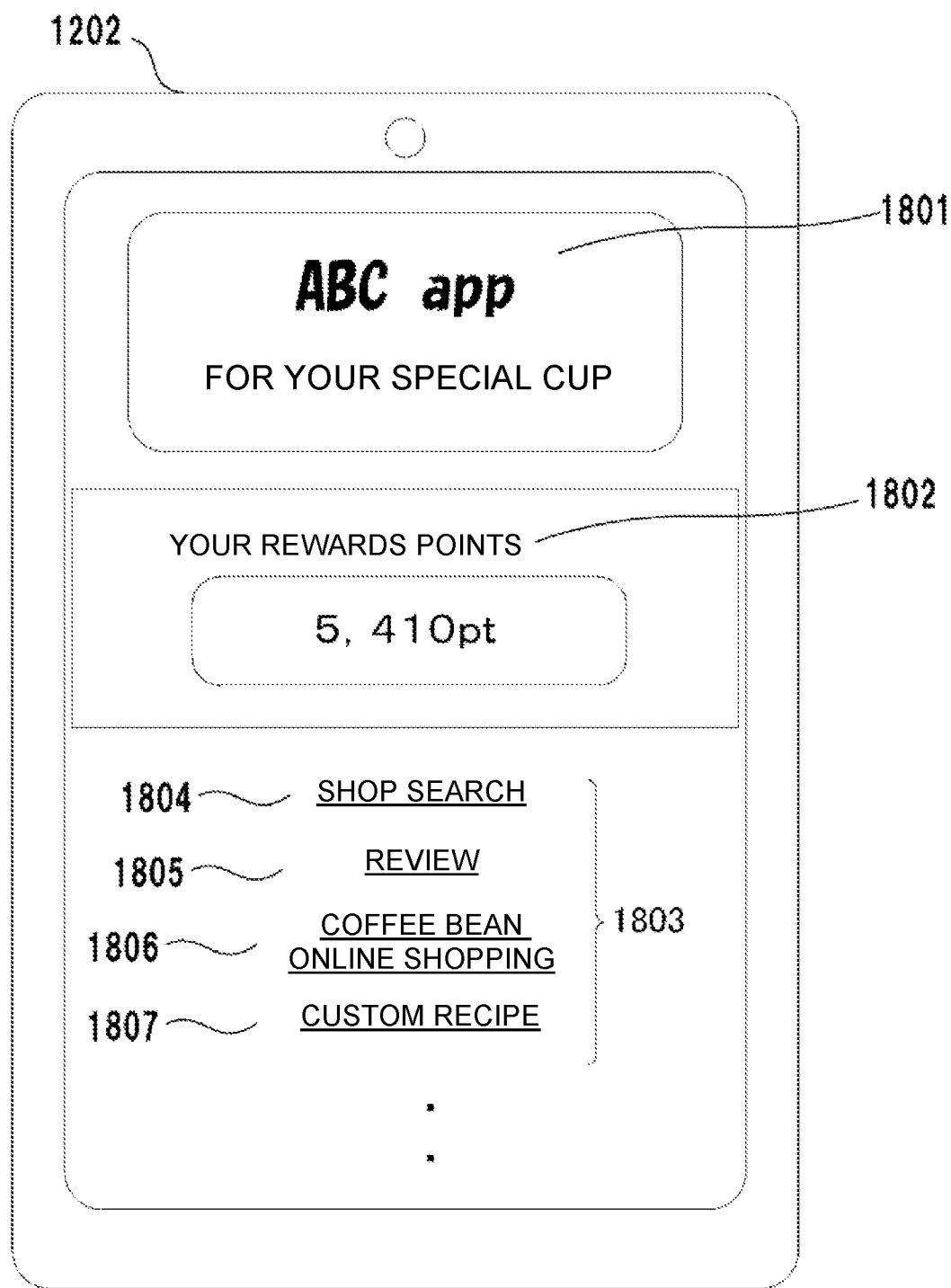
FIG. 18 is a diagram showing an example of a home screen of an application displayed on the mobile terminal.

FIG. 18 is a diagram showing an example of the home screen of the application 1310 displayed on the display part 1407 of the mobile terminal 1202. In a display area 1801, the name "ABC app" of the application 1310 is displayed. In a display area 1802, the current rewards points of the user are displayed. The user can use the rewards points to purchase coffee beans on an online shop, for example. In a display area 1803, a list of services that can be provided by the application 1310 is displayed. The user can click any of display areas 1804, 1805, 1806 and 1807. Once any of the display areas is clicked, a screen of the corresponding service is displayed.

The display area 1804 shows a shop search service, which allows the user to search for a cafe participating in the rewards points program, for example. The display area 1805 shows a review service, which allows the user to make a comment on or rate a cafe the user has visited, for example. The display area 1806 shows a coffee beans online shopping service, which allows the user to browse an online shop of coffee beans and purchase coffee beans. The display area 1807 shows a custom recipe service, which allows the user to adjust an extraction profile on the mobile terminal 1202.

Figure 19:
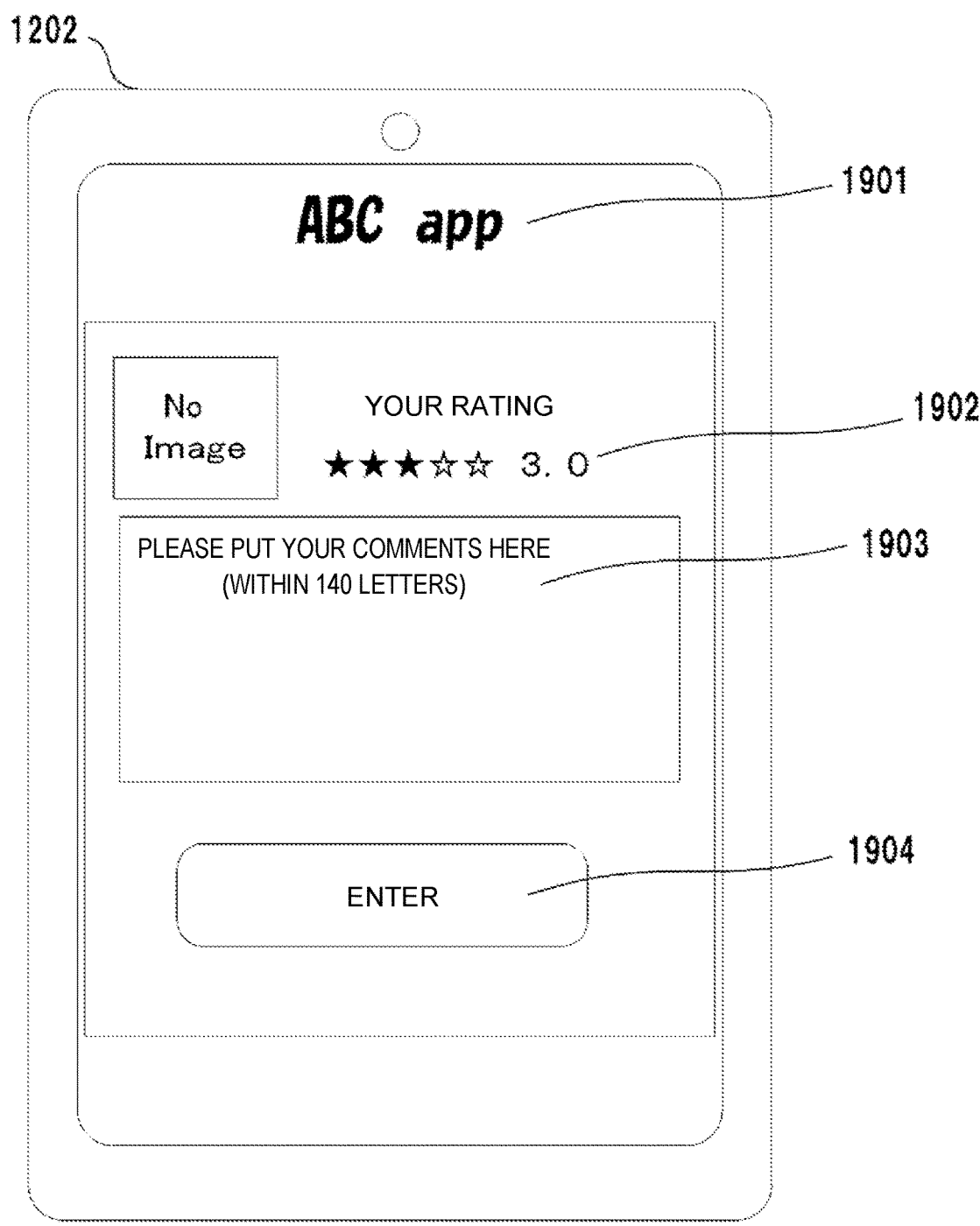
FIG. 19 is a diagram showing a service screen.

FIG. 19 is a diagram showing an example of a service screen displayed when the user clicks the display area 1805. In a display area 1901, the name "ABC app" of the application 1310 is displayed. In a display area 1902, rating information is displayed, and the user can rate the coffee the user has purchased at the cafe the user visited. In a display area 1903, a comment field is displayed, and the user can make a comment on the cafe the user visited. When an enter button 1904 is pressed, the comment made by the user with this review service is entered. In this embodiment, once the enter button 1904 is pressed and the comment is entered, the entered comment is transmitted to the server 1201. In this way, the server 1201 collects review information from the users, and the data processing part 1307 can analyze the review information.

Figure 20:
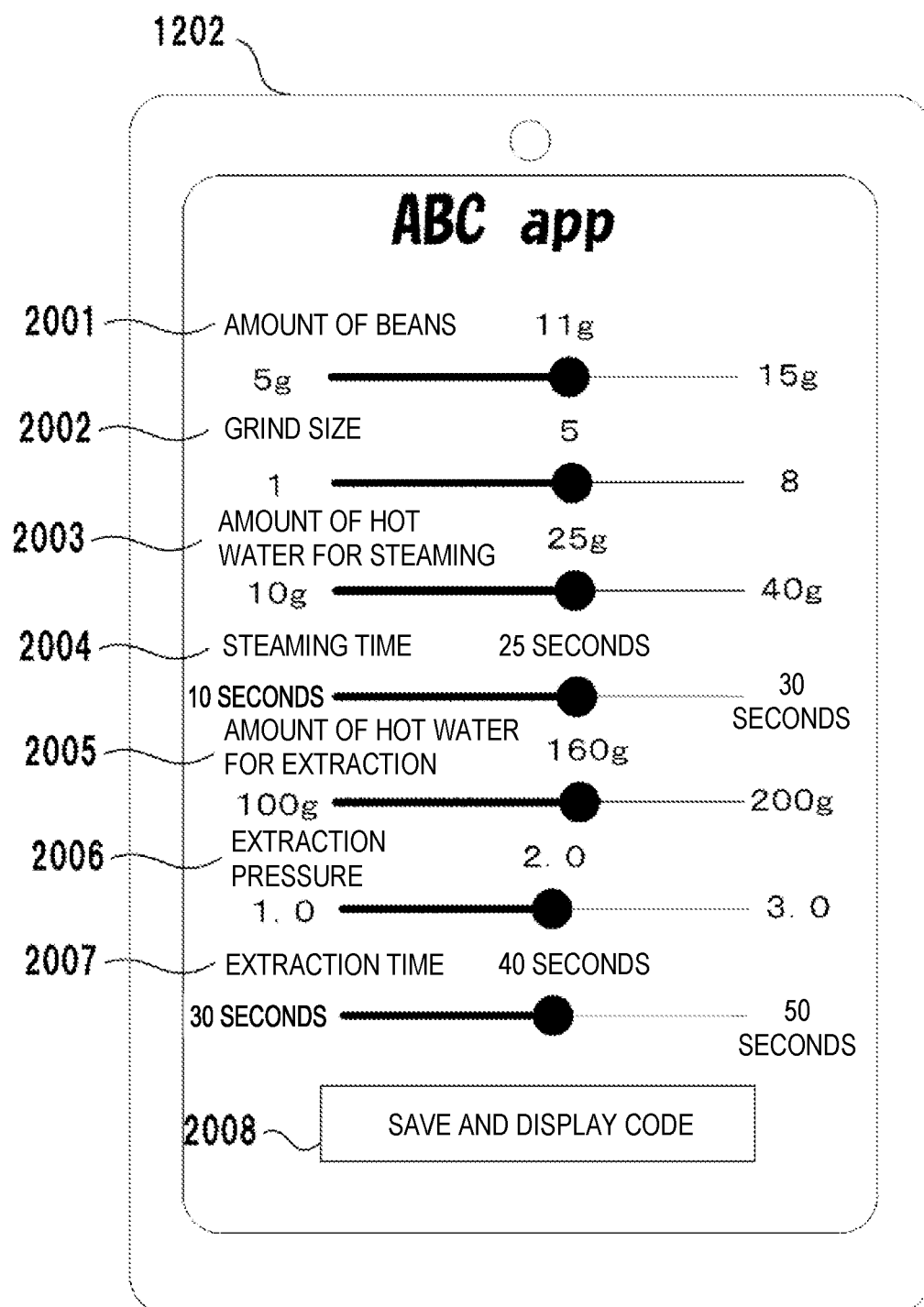
FIG. 20 is a diagram showing a service screen.

FIG. 20 is a diagram showing an example of a service screen displayed when the user clicks the display area 1807. The screen shown in FIG. 20 allows the user to adjust the amount of hot water for extraction or the like on the mobile terminal 1202. The screen in FIG. 20 shows basically the same setting items as those displayed on the information display device 1203, and the user can adjust the amount of hot water for extraction or the like to a preferable value on the mobile terminal 1202 before visiting the cafe.

A display area 2001 allows the user to adjust and set the amount of beans as desired. A display area 2002 allows the user to adjust and set the grind size as desired. A display area 2003 allows the user to adjust and set the amount of hot water for steaming as desired. A display area 2004 allows the user to adjust and set the steaming time as desired. A display area 2005 allows the user to adjust and set the amount of hot water for extraction as desired. A display area 2006 allows the user to adjust and set the extraction pressure as desired. A display area 2007 allows the user to adjust and set the extraction time as desired.

A button 2008 is a button to enter the settings in the display areas 2001 to 2007. In the case shown in FIG. 20, once the button 2008 is pressed, the settings in the display areas 2001 to 2007 are saved, and a two-dimensional code is displayed. In the cafe, the user can communicate the settings in the display areas 2001 to 2007 to the information display device 1203 by holding the two-dimensional code displayed on the mobile terminal 1202 over the imaging part 1509 of the information display device 1203. The button 2008 may not be a button for displaying a two-dimensional code. For example, the button 2008 may be a button for entering and saving the settings in the display areas 2001 to 2007, and the settings in the display areas 2001 to 2007 may be transmitted to the information display device 1203 via the short-range radio communication I/F 1410.

By adjusting the parameters for brewing of a coffee beverage shown in FIG. 20 on the mobile terminal 1202, the user can easily feel as if the user were a barista and brewed coffee. In this embodiment, a set of parameters for brewing of a coffee beverage such as those shown in FIG. 20 is referred to as an extraction profile or a recipe.

Refer back to FIG. 16. Once the mobile terminal 1202 receives the home screen from the server 1201 in Step 1603, the user clicks the display area 1807 and adjusts and sets the extraction profile on the screen shown in FIG. 20 (Step 1604). After that, as described above, the user visits the cafe and communicates setting information from the mobile terminal 1202 to the information display device 1203 (Step 1605). The setting information here is the settings in the display areas 2001 to 2007 shown in FIG. 20, for example. The setting information may be communicated via a two-dimensional code or short-range radio communication.

Once the information display device 1203 has obtained the setting information, the information display device 1203 transmits the setting information to the control device 11 of the beverage making apparatus 1204 via the main unit I/F 1506 (Step 1606). The beverage making apparatus 1204 brews a coffee beverage based on the setting information (Step 1607).

Figure 17:
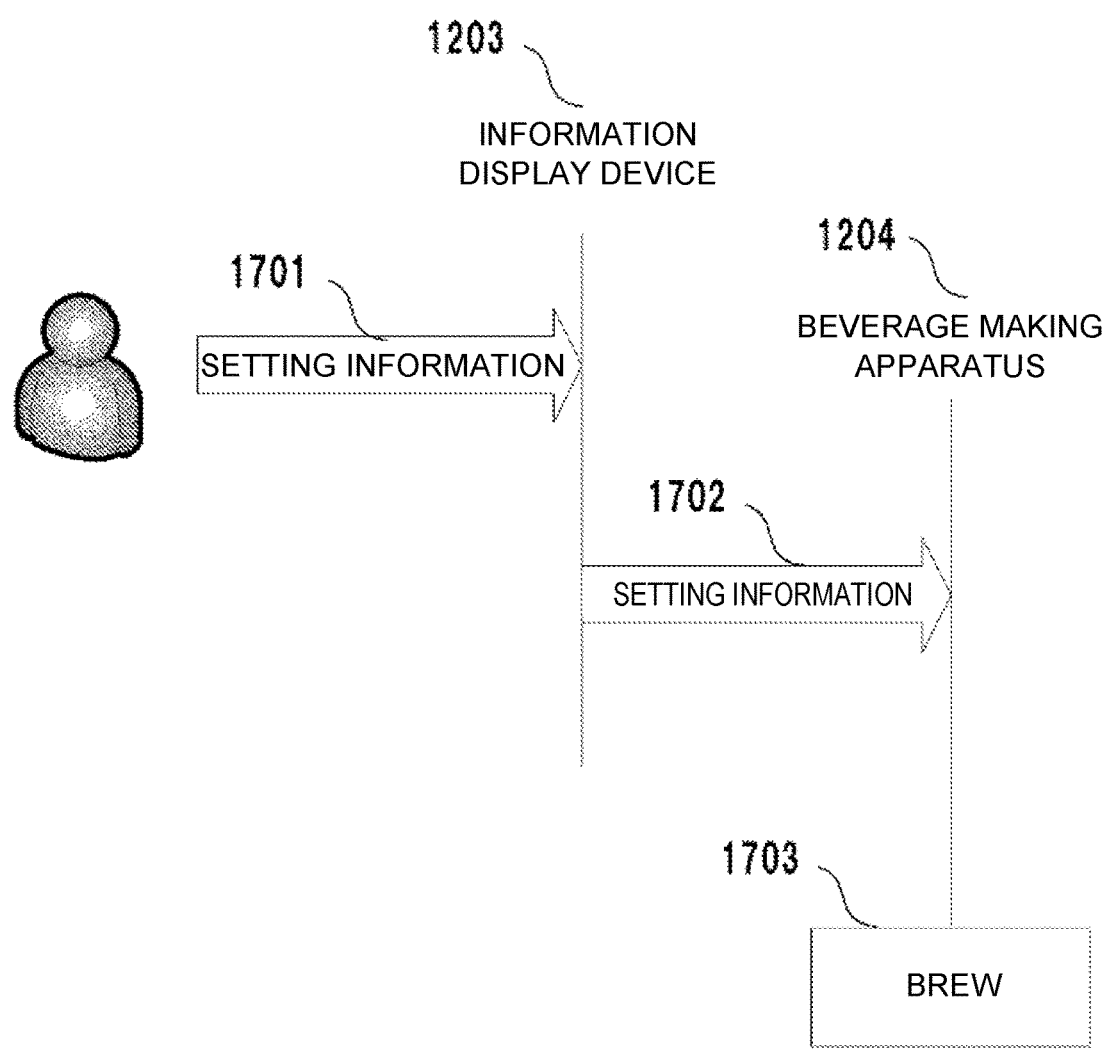
FIG. 17 is a diagram for illustrating a flow of a process until coffee is brewed.

FIG. 17 is a diagram for illustrating a flow of a process in which the user customizes a recipe on the information display device 1203 and the beverage making apparatus 1204 brews coffee in the system 1200.

Although FIG. 16 shows a situation where the user adjusts the extraction profile on the mobile terminal 1202, FIG. 17 shows a situation where the user adjusts the extraction profile on the information display device 1203 in the cafe.

The user adjusts and sets the extraction profile on the user interface screen displayed on the display part 1507 of the information display device 1203 (Step 1701). The user interface screen displays basically the same items as those displayed on the screen shown in FIG. 20. Once the information display device 1203 has obtained the setting information, the information display device 1203 transmits the setting information to the control device 11 of the beverage making apparatus 1204 via the main unit I/F 1506 (Step 1702). The beverage making apparatus 1204 brews a coffee beverage based on the setting information (Step 1703).

Figure 21:
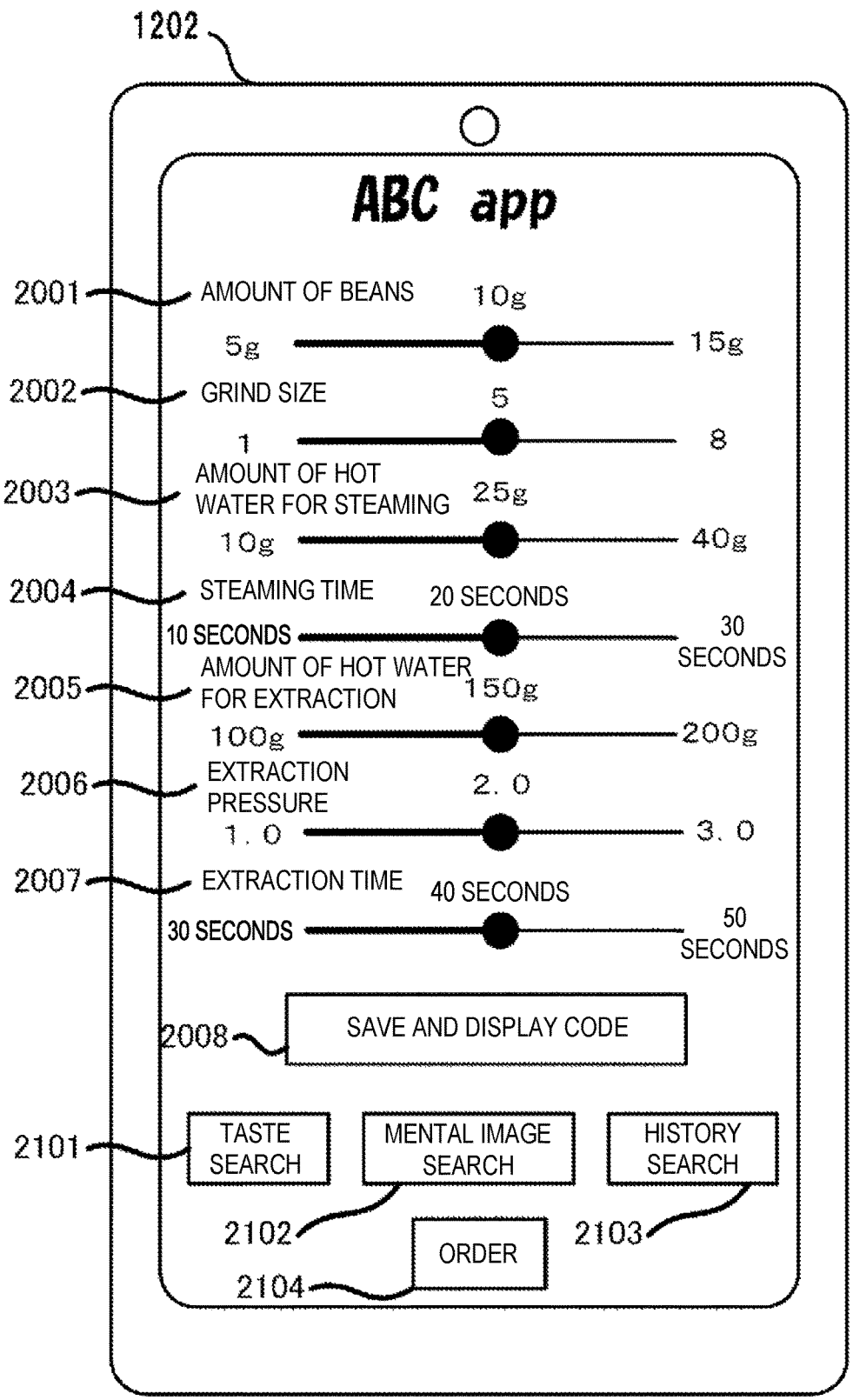
FIG. 21 is a diagram showing an example of a service screen.

FIG. 21 is a diagram showing an example of a service screen displayed when the user clicks the display area 1807. The screen shown in FIG. 21 allows the user to adjust any parameter of the extraction profile, such as amount of hot water for extraction, on the mobile terminal 1202. The screen in FIG. 21 shows basically the same setting items as those displayed on the information display device 1203, and the user can adjust the amount of hot water for extraction or the like to a preferable value on the mobile terminal 1202 before visiting the cafe. The display areas 2001 to 2008 are the same as those shown in FIG. 20, and therefore descriptions thereof will be omitted.

The service screen shown in FIG. 21 includes a "taste search" button 2101, a "mental image search" button 2102, a "history search" button 2103, and an "order" button 2104. The "taste search" button 2101, the "mental image search" button 2102 and the "history search" button 2103 are pressed by the user to start a process of obtaining information (beverage information) concerning the properties, the extraction profile, the ingredients and the price of the beverage from the server 1201.

First Embodiment

In this embodiment, a process performed by the mobile terminal 1202 when the user presses the "taste search" button 2101 will be described.

Figure 22:
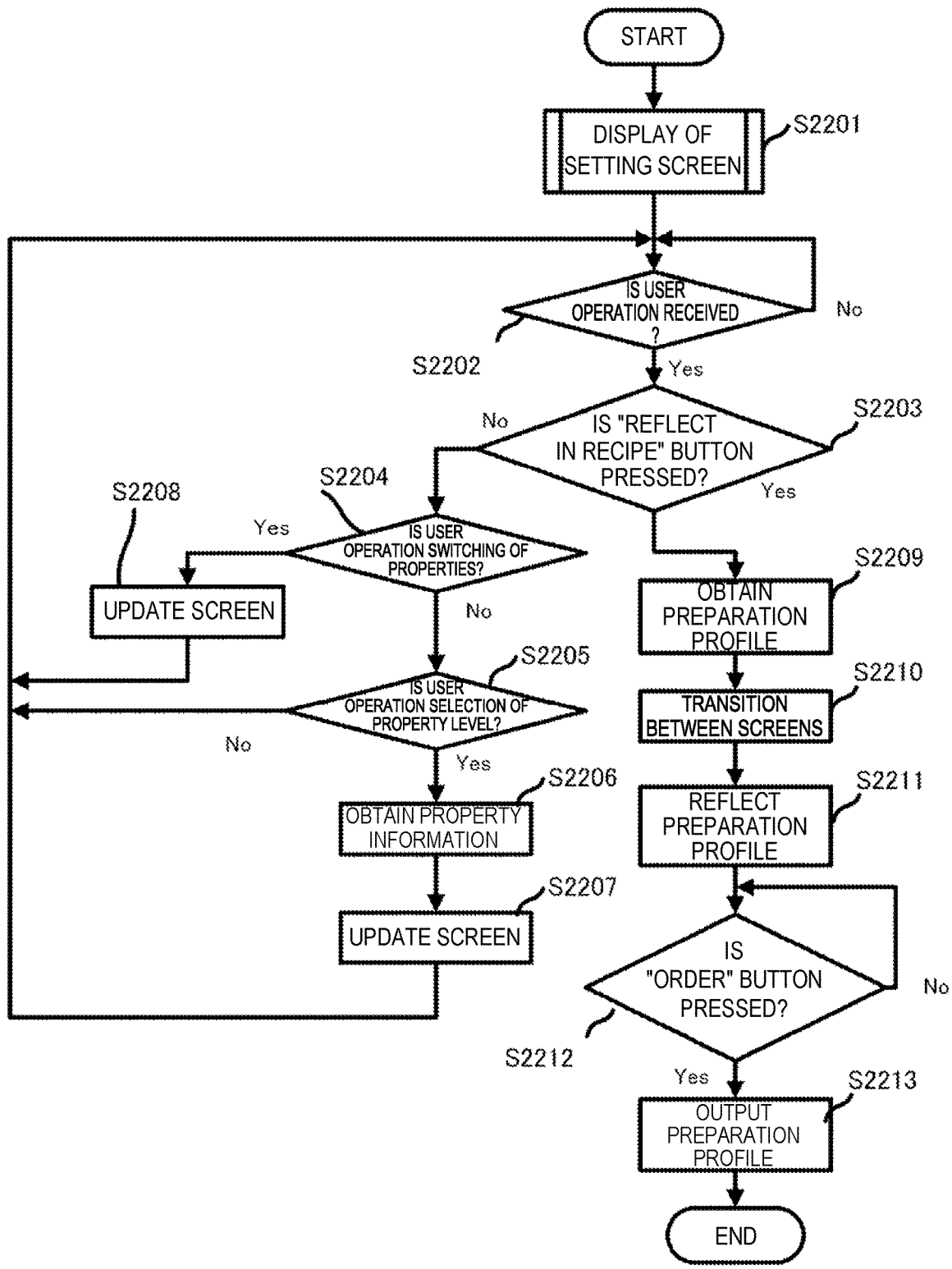
FIG. 22 is a flow diagram showing an example of a process of taste search performed on a setting screen.

FIG. 22 is a flow diagram showing a process performed by the mobile terminal 1202. The process shown in FIG. 22 is achieved by the processing part 1401 loading a program (application) stored in the storage part 1403 to the memory 1402 and executing the program.

First, in Step S2201, the processing part 1401 controls the display part 1407 to display a setting screen for obtaining beverage information. The setting screen will be described in detail later with reference to FIG. 23. Having displayed a setting screen 2300 shown in FIG. 23 in Step S2201, the processing part 1401 proceeds to Step S2202, where the processing part 1401 waits until the processing part 1401 receives a user operation via the display part 1407, the manipulation part 1408 or the microphone 1404. When the processing part 1401 determines that the processing part has received a user operation (if Yes in Step S2202), the processing part 1401 proceeds to Step S2203, where the processing part 1401 determines whether or not the operation received in Step S2202 is a pressing of a "reflect in recipe" button. If the user operation received by the processing part 1401 is not a pressing of the "reflect in recipe" button (if No in Step S2203), the processing part 1401 proceeds to Step S2204, where the processing part 1401 determines whether or not the user operation received by the processing part 1401 is a switching of properties used for obtaining beverage information. If the user operation received by the processing part 1401 is a switching of properties (if Yes in Step S2204), the processing part 1401 proceeds to Step S2208, where the processing part 1401 updates the screen to display the switched property. If the user operation received by the processing part 1401 is not a switching of properties (if No in Step S2204), the processing part 1401 proceeds to Step S2205, where the processing part 1401 determines whether or not a selection of a property level has occurred. If the user operation received by the processing part 1401 is a selection of a property level (if Yes in Step S2205), the processing part 1401 proceeds to Step S2206, where the processing part 1401 obtains information (property information) concerning the properties from the server 1201 or the storage part 1403 of the mobile terminal 1202. The processing part 1401 then proceeds to Step S2207, where the processing part 1401 updates the screen. A process performed when it is determined in Step S2203 that the "reflect in recipe" button is pressed (if Yes in Step S2203) will be described later.

Figure 23:
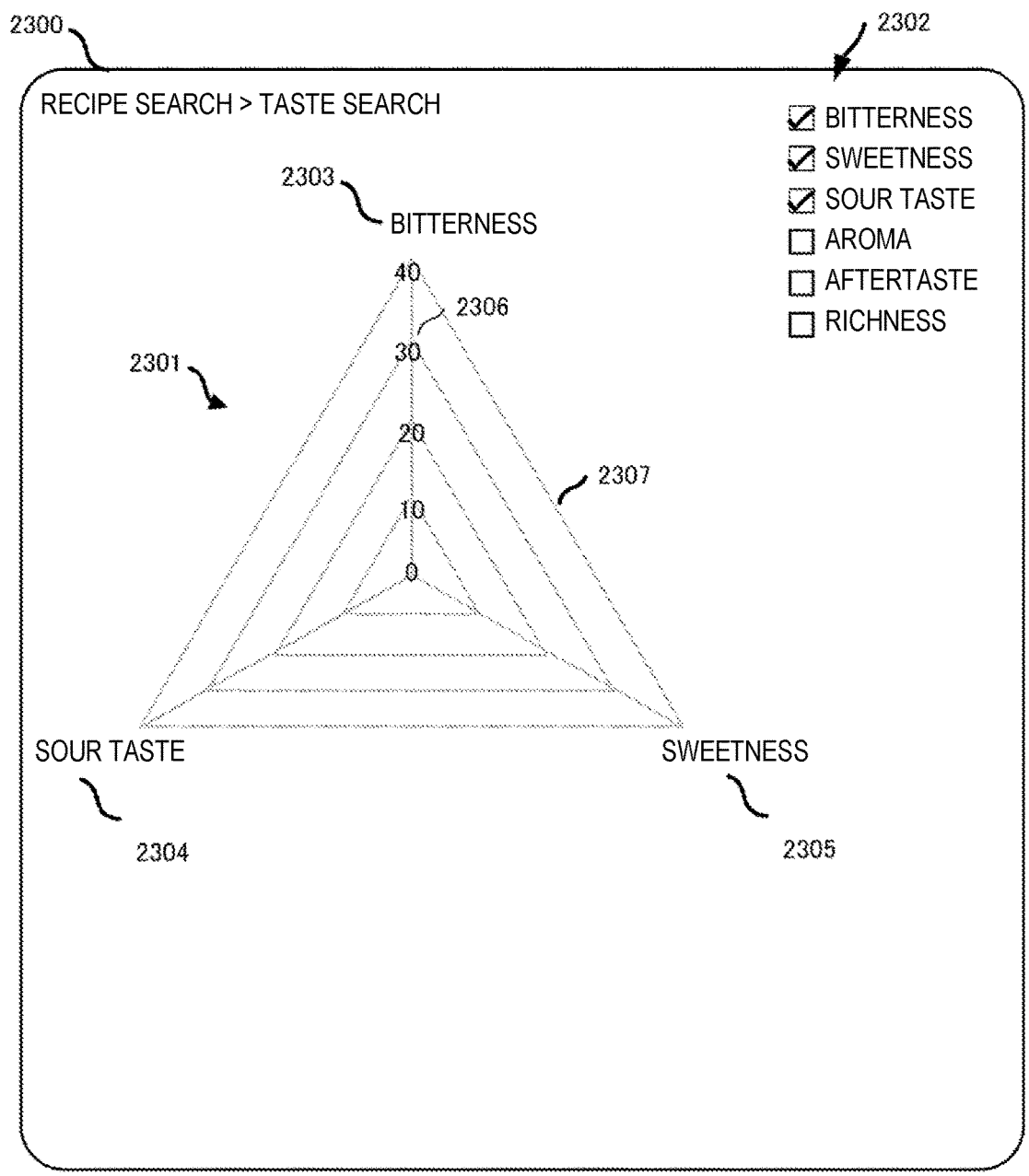
FIG. 23 is a diagram showing an example of a setting screen according to a first embodiment.

Next, FIG. 23 shows an example of the setting screen displayed in Step S2201. The setting screen 2300 includes a graph area 2301 and a legend area 2302. Note that FIG. 23 shows an example of the initial setting screen 2300 in which only axes are displayed in the graph area 2301.

In the example shown in FIG. 23, in the legend area 2302, properties ("bitterness", "sweetness", "sour taste", "aroma", "aftertaste" and "richness") of the taste of coffee can be selected, and "bitterness", "sweetness" and "sour taste" are selected. In the following description, parameters used to obtain coffee beverage information will be referred to as "properties" unless otherwise specified. The properties selected to obtain beverage information in the initial display of the setting screen may be stored in a program as default values or may be user-configurable.

In the graph area 2301, "bitterness" 2303, "sour taste" 2304 and "sweetness" 2305 are displayed on axes of a graph (a 3-axis radar chart in this example) corresponding to the properties "bitterness", "sweetness" and "sour taste" selected by the user in the legend area 2302. On each axis, a value (level) can be selected from among a plurality of values. In this embodiment, an integer value ranging from 0, the lowest level, to 40, the highest level, can be selected.

Although the description of this embodiment will be made on the supposition that the level of each of "bitterness" 2303, "sour taste" 2304 and "sweetness" 2305 can be selected from 0 to 40, at least any of the lowest level and the highest level may differ between different properties. For example, the level of the property "bitterness" 2303 may be selected from 0 to 40, while the level of the property "sour taste" 2304 may be selected from 0 to 20. Furthermore, depending on the property, the level may not be indicated by a numerical value but may be indicated by "present" and "absent" or by "weak", "medium" and "strong". In short, the level of a property can be indicated in any manner as far as the level can assume a plurality of values. The selectable levels of each property may be stored in a program as default values.

Here, it is supposed that, on the setting screen 2300 in FIG. 23, a point 2306, which corresponds to a level of the property "bitterness" 2303 of 30, is pressed. In this case, since the operation received in Step S2202 is not a pressing of the "reflect in recipe" button (No in Step S2203), the processing part 1401 proceeds to Step S2204. In Step S2204, it is determined whether or not the operation received in Step S2202 is a switching of properties. The "switching of properties" means changing the selected properties in the legend area 2302 in FIG. 23. The operation on the point 2306 is also not a switching of properties (No in Step S2204), and therefore, the processing part 1401 proceeds to Step S2205. In Step S2205, it is determined whether or not the operation received in Step S2202 is a selection of a property level. Since the operation on the point 2306 is a selection of a property level (a level of the property "bitterness" of 30) (Yes in Step S2205), the processing part 1401 proceeds to Step S2206. In Step S2206, the mobile terminal 1202 obtains property information from the database 1309 of the server 1201 based on the property level specified by the user operation.

FIG. 41 shows an example of data retained in the database 1309. FIG. 41(A) shows a user information database (DB) 4110 that stores information on a beverage ordered by a user. FIG. 41(B) shows a preparation profile DB 4120 that stores a preparation profile ID and a parameter of a preparation profile corresponding to the preparation profile ID. FIG. 41(C) shows a property information DB 4130 that stores property information, and ingredient information and preparation profile ID corresponding to the property information.

The user information DB 4110 stores a user identifier 4111, data-and-time information 4112, bean information 4113, producing area information 4114, roasting degree information 4115, preparation profile ID 4116, machine information 4117, rating information 4118, and comment information 4119. The user identifier 4111 can be any information that allows the server 1201 to identify the user and, in an example, may include a user identifier (ID). In another example, the user identifier 4111 may include at least any of an email address of the user, an identifier of a mobile terminal or the name of the user. The data-and-time information 4112 includes information corresponding to the data and time at which the user ordered a beverage. The bean information 4113, which indicates the type of a bean, the producing area information 4114, which indicates the producing area of a bean, and the roasting degree information 4115, which indicates the degree of roasting of a bean, are referred to as ingredient information. The preparation profile ID 4116 stores a key used to retrieve data from the preparation profile DB 4120. The machine information 4117 stores an identifier of the machine that has prepared a beverage. The rating information 4118 and the comment information 4119 store a rating value and a comment on a beverage from the user obtained on the service screen shown in FIG. 19.

The preparation profile DB 4120 includes a preparation profile including at least any of preparation profile ID 4121, amount of bean 4122, grind size 4123, amount of hot water for steaming 4124, steaming time 4125, amount of hot water for extraction 4126, extraction pressure 4127, and extraction time 4128. In an example, the preparation profile includes the items displayed in the display areas in FIG. 21.

The property information DB 4130 includes bean information 4131, producing area information 4132, roasting degree information 4133, preparation profile ID 4134, bitterness 4135, sweetness 4136, sour taste 4137, priority 4138, and price 4139. The bitterness 4135, the sweetness 4136 and the sour taste 4137 are property information, and the property information in the property information DB 4130 corresponds to the properties "bitterness", "sweetness", "sour taste", "aroma", "aftertaste" and "richness" displayed in the legend area 2302 in FIG. 23.

In an example, when a user has ordered a beverage or made a rating or comment on an ordered beverage in the server 1201 via the mobile terminal 1202, the data is added to the user information DB 4110. As a further alternative, an authorized user, such as a staff member or barista of a coffee shop, may add data to the property information DB 4130.

In Step S2206, the processing part 1401 transmits the property level (the level of the property "bitterness" of 30 in the example shown in FIG. 23) specified by the user operation to the server 1201 to request for property information. In an example, in Step S2206, the processing part 1401 may obtain property information based on the property level (the level of the property "bitterness" of 30 in the example shown in FIG. 23) specified by the user operation. Having received the property level, the server 1201 determines whether or not there is data corresponding to the property level specified by the user operation in the property information database, and searches for a data set including the property level that matches the specified property level. In this embodiment, the term "data set" means a row of data stored in the property information DB 4130. In the example in FIG. 41, the server 1201 locates the first row of data set (A, COL (Colombia), light roasting, 1, 30, 20, 22, 5, 550) in the property information DB 4130 in FIG. 41, which matches the level of "bitterness" of 30, and transmits the data set to the mobile terminal 1202.

In an example, a data set may be determined which indicates a level of the same property as the property specified in the received data that is the closest to the level specified in the received data. That is, a data set may be determined which indicates a different level of the property than the level specified in the data transmitted from the mobile terminal 1202. Having obtained the data set from the server 1201, the mobile terminal 1202 stores the data set in the memory 1402 or storage part 1403 and proceeds to Step S2207.

In this embodiment, in Step S2206, the property information obtained by the mobile terminal 1202 from the server 1201 is described as one or more data sets in the property information DB 4130. However, in an example, the mobile terminal 1202 may not obtain some data in a data set, such as priority 4138.

Figure 24:
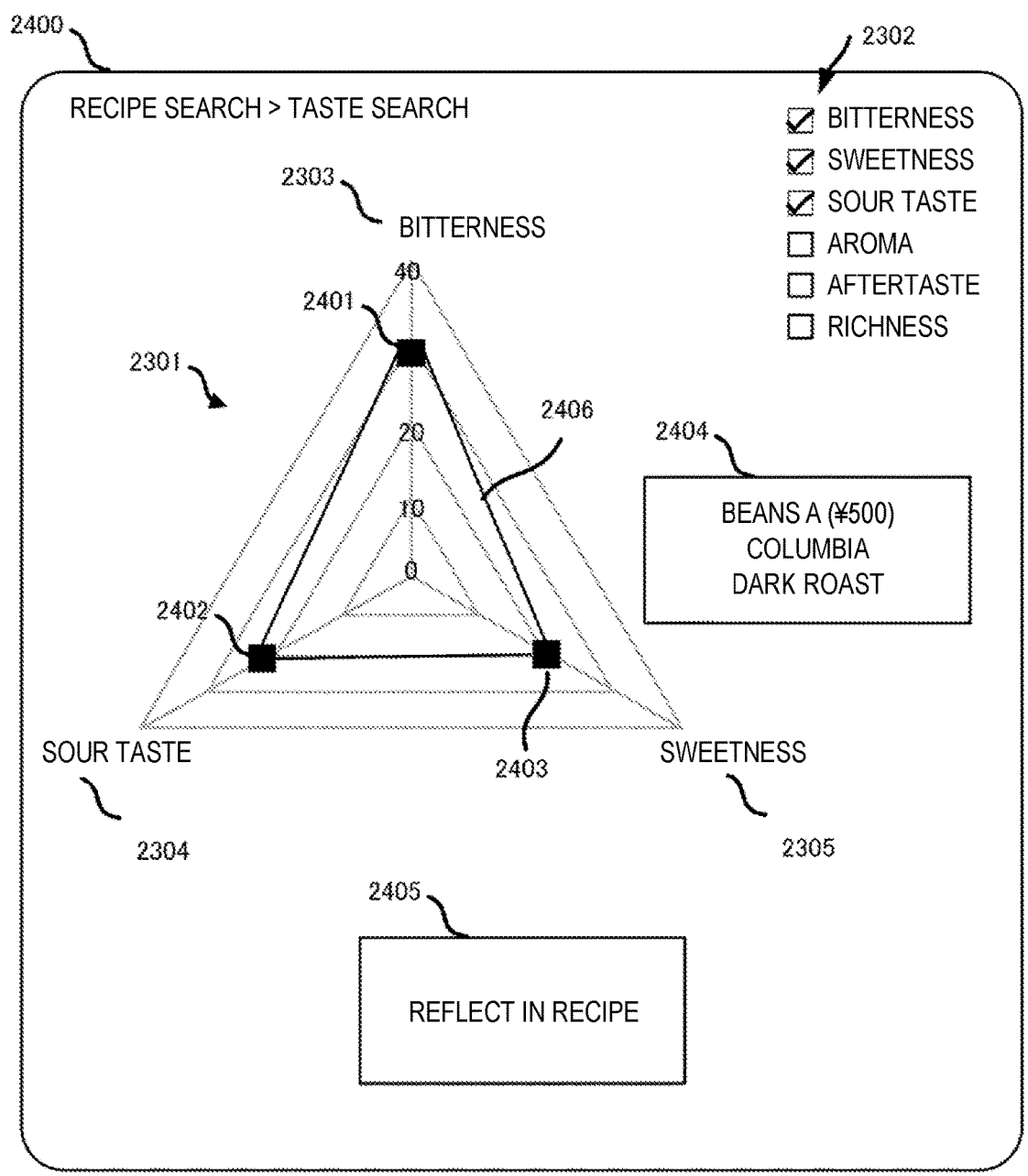
FIG. 24 is a diagram showing an example of a setting screen according to the first embodiment.

In Step S2207, the mobile terminal 1202 updates the setting screen 2300. FIG. 24 shows a setting screen displayed when a data set indicating a piece of property information is obtained from the server 1201 after property levels are selected on the setting screen shown in FIG. 23. A setting screen 2400 shown in FIG. 24 includes the graph area 2301 and the legend area 2302 as with the setting screen shown in FIG. 23. In the graph area 2301, the axes of the selected properties (bitterness, sour taste and sweetness) 2303 to 2305 are displayed, markers 2401 to 2403 indicating the levels of the properties (a level of bitterness of 30, a level of sour taste of 22, and a level of sweetness of 20) of the obtained data set are plotted on the respective axes, and the markers are connected by a line 2406. The setting screen 2400 includes an area 2404 in which ingredient information of the obtained data set is displayed, and displays a "reflect in recipe" button 2405.

In this specification, the "reflect in recipe" button 2405 is described as being displayed in Step S2207 after a predetermined number or less of data sets are obtained in Step S2206. However, in an example, the "reflect in recipe" button 2405 may be always displayed and be made available when a predetermined number or less of data sets are obtained in Step S2206.

The processing part 1401 then returns to Step S2202, and waits until the processing part 1401 receives a user operation.

Next, a setting screen will be described which is displayed when the user changes the level of bitterness from 30 to 22 by dragging the point 2401 plotted at the level of bitterness of 30 in the setting screen 2400. This user operation is also a selection of a property level, so that the processing part 1401 obtains property information again in Step S2206 in FIG. 22. The description will be made on the supposition that another data set is obtained in Step S2206. In Step S2207, the processing part 1401 then updates the graph area 2301.

Figure 25:
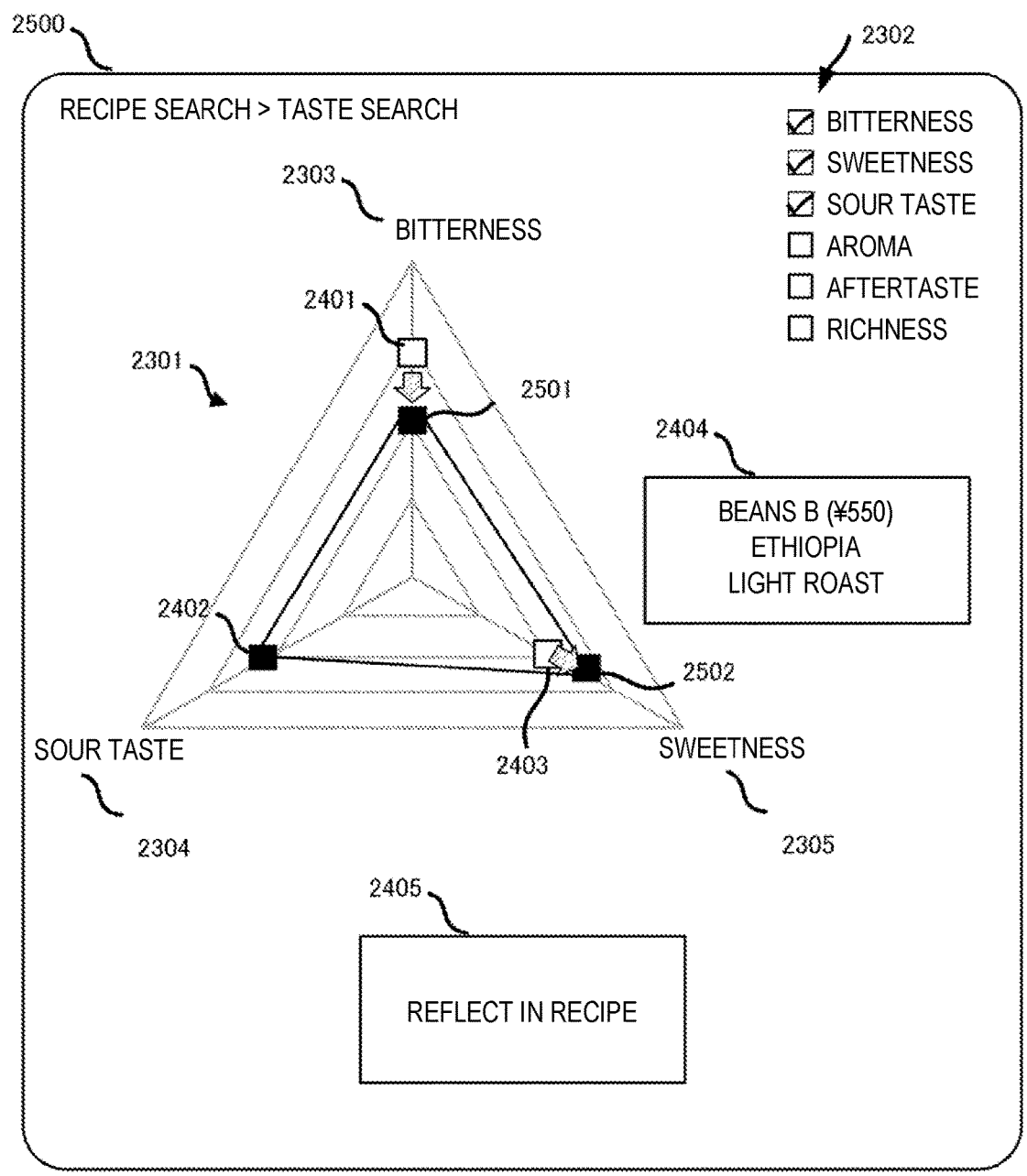
FIG. 25 is a diagram showing an example of a setting screen according to the first embodiment.

FIG. 25 shows a setting screen displayed when the user has changed the level of bitterness from 30 to 22 by dragging the point 2401 plotted at the level of bitterness of 30 in the setting screen 2400. In this example, the point 2401 corresponding to the level of bitterness of 30 of the displayed properties 2406 is modified to the level of bitterness of 22 by the user operation, and the displayed points are updated to points 2501, 2402 and 2502 based on the property information newly obtained based on the level of bitterness of 22. The area 2404 displaying the ingredient information may also be updated based on the newly obtained property information. After that, the control part 1401 returns to Step S2202 again.

Next, a case will be described where the user taps "richness" in the legend area 2302 in the setting screen 2500 to check the level of the property "richness" of the current data set. In this case, the user operation corresponds to a switching of properties (Yes in Step S2204). Therefore, the processing part 1401 proceeds to Step S2208, where the processing part 1401 updates the screen.

Figure 26:
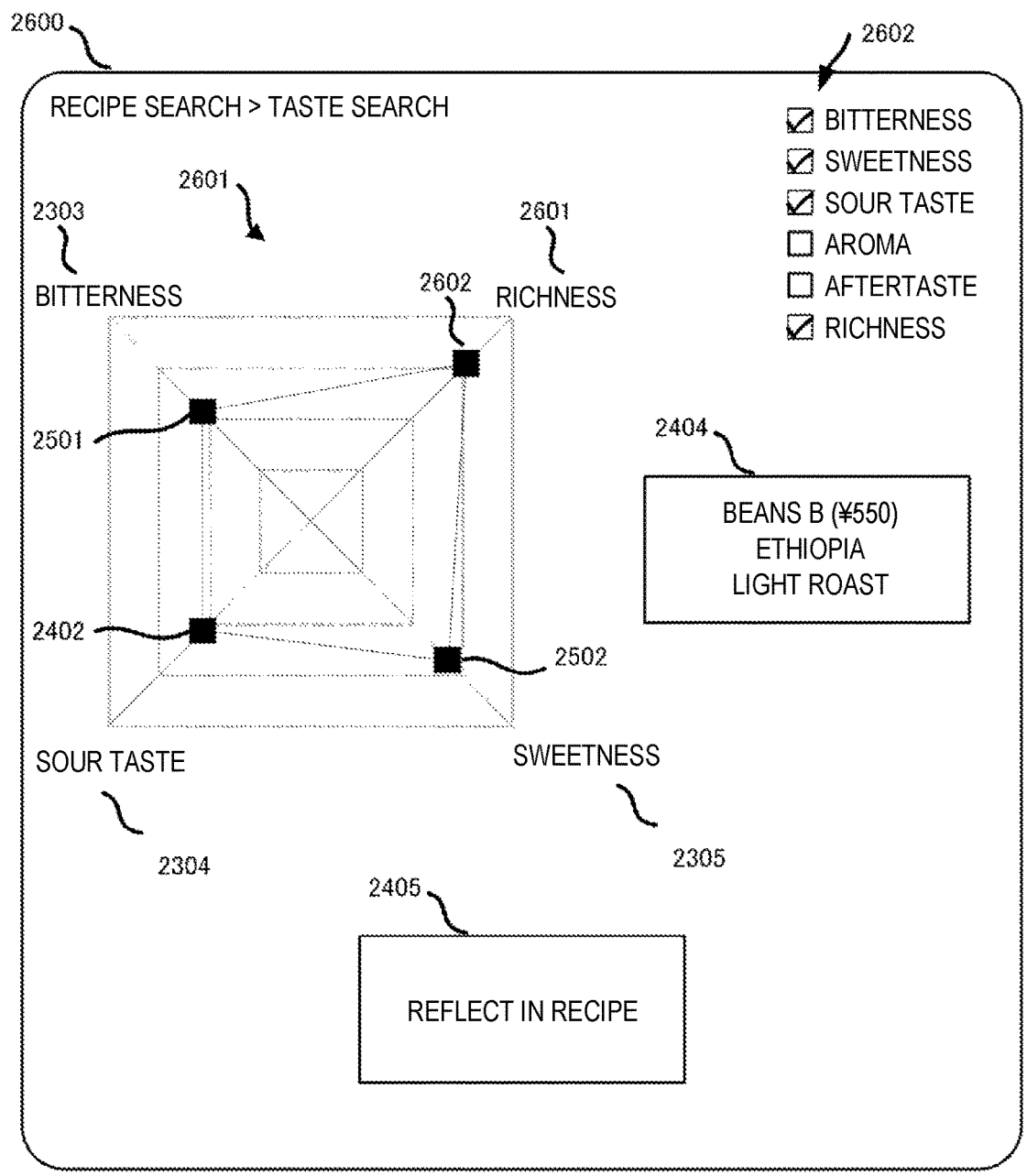
FIG. 26 is a diagram showing an example of a setting screen according to the first embodiment.

FIG. 26 shows an example of a screen displayed when the user changes the properties to be used for searching for a recipe in the setting screen 2500. In this example, in a graph area 2601 of a setting screen 2600 shown in FIG. 26, richness 2601 as well as bitterness 2303, sour taste 2304 and sweetness 2305 are shown by a 4-axis radar chart. As can be seen from the above examples, the levels of the properties selected by the user are indicated by a radar chart having a number of axes corresponding to the number of the selected properties. The processing part 1401 obtains the level of the property "richness" from the property information obtained in Step S2206, and plots the level on an axis of richness 2601. The processing part 1401 then returns to Step S2202, where the processing part 1401 waits until the processing part 1401 receives a user operation. Although not described, an operation of hiding a property (or reducing the number of properties) used for obtaining beverage information or an operation of displaying or hiding a plurality of properties at the same time can also be achieved in the same process.

Next, an operation of the processing part 1401 will be described which occurs when the user presses the "reflect in recipe" button 2405 on a setting screen 2600 shown in FIG. 26. When the processing part 1401 determines that the processing part 1401 has accepted a user operation (if Yes in Step S2202), the processing part 1401 proceeds to Step S2203, where the processing part 1401 determines whether or not the "reflect in recipe" button has been pressed. In this example, the processing part 1401 determines that the "reflect in recipe" button has been pressed (Yes in Step S2203), and the processing part 1401 proceeds to Step S2209, where the processing part 1401 obtains a preparation profile.

In Step S2209, the processing part 1401 transmits a preparation profile ID included in the obtained property information to the server 1201 via the communication I/F 1409 or short-range radio communication I/F 1410. Having received the preparation profile ID from the mobile terminal 1202, the server 1201 obtains a preparation profile from the preparation profile DB 4120 based on the preparation profile ID, and transmits the preparation profile to the mobile terminal 1202. Having received the preparation profile, the mobile terminal 1202 proceeds to Step S2210, where the mobile terminal 1202 transitions from the setting screen 2600 to the service screen shown in FIG. 21.

The processing part 1401 then proceeds to Step S2211, where the processing part 1401 reflects the obtained preparation profile in the parameters in the display areas 2001 to 2007 in the service screen. The processing part 1401 then proceeds to Step S2212, where the processing part 1401 waits until the user presses the order button 2104. Any of the parameters in the display areas 2001 to 2007 in the service screen may be able to be changed before the user presses the order button 2104.

Once the user presses the order button 2104 (if Yes in Step S2212), the processing part 1401 proceeds to Step S2213, where the preparation profile is output. In an example, the mobile terminal 1202 may transmits setting information including the preparation profile to the information display device 1203 via the short-range radio communication I/F or communication I/F 1409 (Step 1605). Alternatively, the mobile terminal 1202 may display a two-dimensional barcode, such as a QR code (registered trademark), in the display part 1407 to transmit the setting information including the preparation profile to the imaging part 1509 of the information display device 1203.

As described above, in this embodiment, a level of a property relating to the taste of a beverage can be selected from among a range of levels of the property to obtain beverage information corresponding to the selected level. This allows the user to determine a beverage, a beverage ingredient or a beverage preparation profile that fits the taste of the user.

In this embodiment, one or more properties relating to a beverage can be selected, and the ranges of the levels of the properties displayed can be changed according to the selection of the one or more properties. Therefore, the user can obtain beverage information in terms of a property to which the user gives high priority.

In this embodiment, as beverage information, at least any of information on an ingredient and information on a preparation profile is obtained. Therefore, the beverage making apparatus can be controlled to prepare a beverage determined based on the level(s) selected by the user.

In this embodiment, at least part of the obtained property information is output to the beverage making apparatus. Therefore, the beverage making apparatus can be controlled to prepare a beverage determined by the user in advance.

In this embodiment, at least part of beverage information is output by short-range radio communication or in the form of a two-dimensional barcode. Therefore, the beverage making apparatus can be controlled without a direct operation.

Although an example has been described in this embodiment where the levels of the properties are represented by a radar chart, the levels of the properties can also be represented in different manners. The levels of the properties can be indicated by any user-friendly means, such as a bar chart. That is, labels of the properties (such as "bitterness", "sweetness", and "sour taste") may be arranged in the row direction, and the level of each property may be represented by the number of coffee bean icons arranged in the corresponding row in the column direction.

Second Embodiment

In the first embodiment, on the setting screen displayed in Step S2201 in FIG. 22, the graph area displays only the axes of properties, and the user may select the level of a property that is not registered with the database of the server. In a second embodiment, information on levels of the properties registered with the database of the server is displayed to help the user select a level of a property. Note that descriptions of the same components or processings as those in the first embodiment will be omitted.

Figure 27:
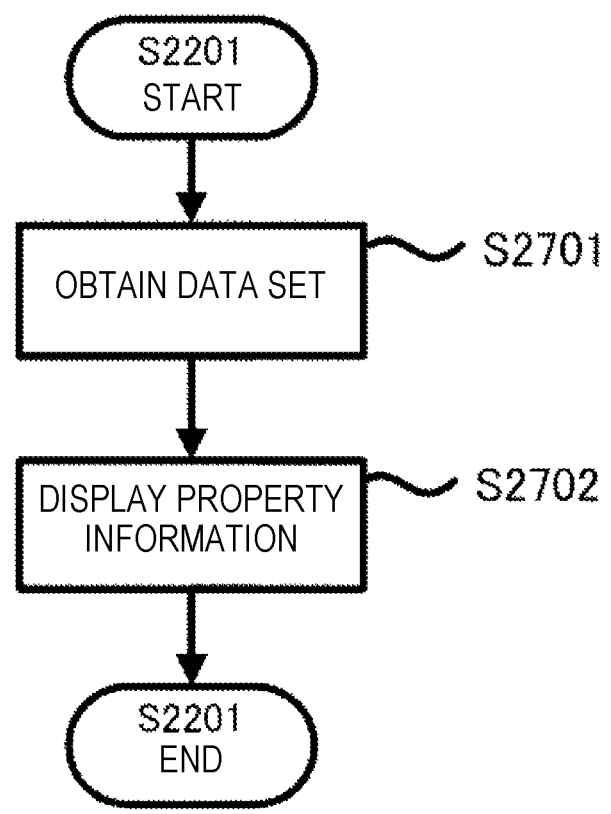
FIG. 27 is a flow diagram showing an example of a process of displaying a setting screen according to a second embodiment.

FIG. 27 is a flow diagram showing a process of Step S2201 according to the second embodiment in detail. In Step S2701, the processing part 1401 obtains a data set stored in the property information DB 4130 of the server 1201. The processing part 1401 then proceeds to Step S2702, where the processing part 1401 displays a setting screen including the property information included in the obtained data set. The processing part 1401 then proceeds to Step S2202. The subsequent process is the same as that in the first embodiment and therefore will not be further described.

Figure 28:
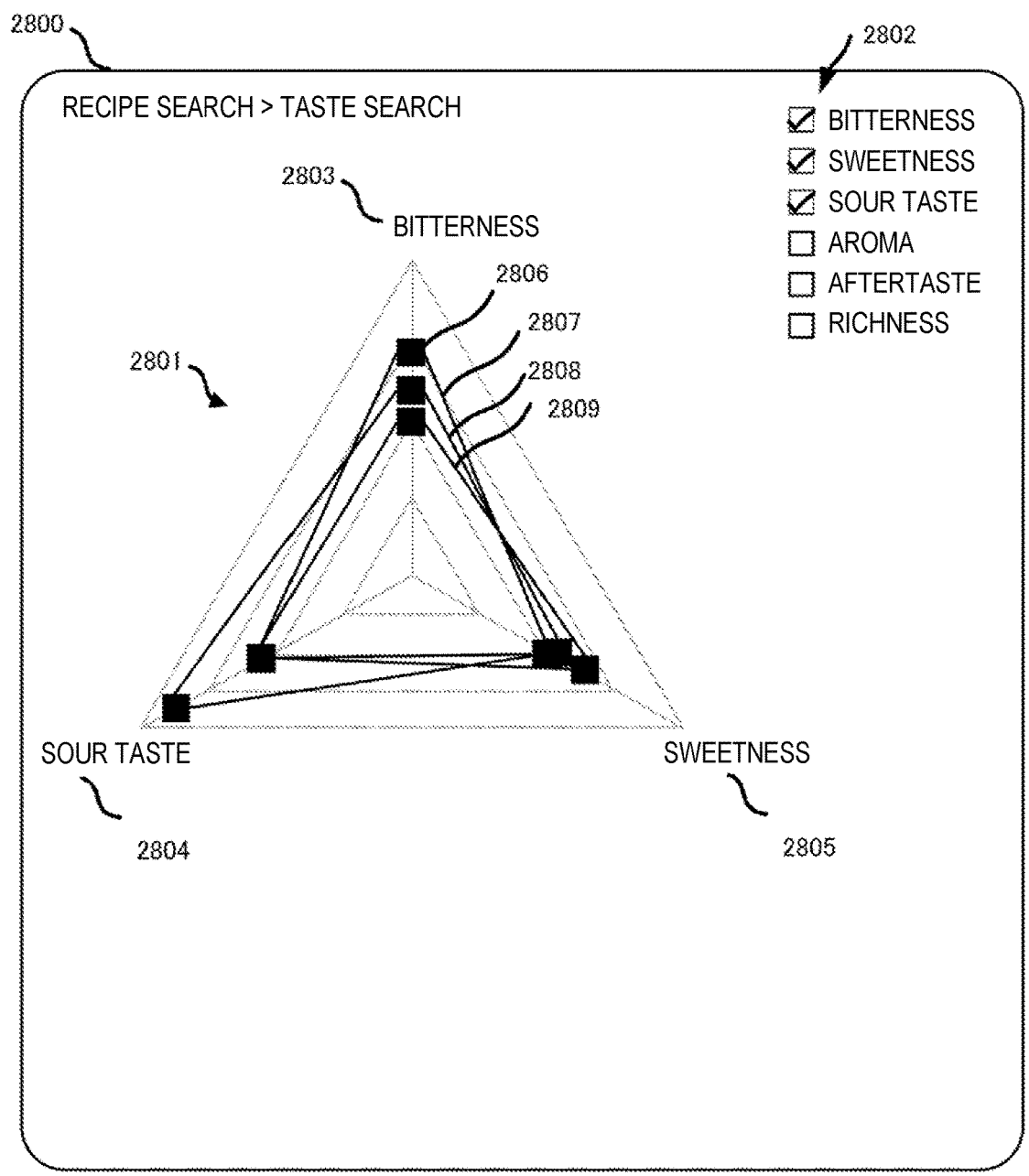
FIG. 28 is a diagram showing an example of the setting screen according to the second embodiment.

FIG. 28 shows an example of a setting screen that is initially displayed in the second embodiment. In the description of this example, it is supposed that the property information DB 4130 of the server 1201 stores three data sets.

In a setting screen 2800 shown in FIG. 28, a graph area 2801 and a legend area 2802 are displayed. In the graph area 2801, pieces of property information 2807 to 2809 included in the three data sets stored in the property information DB 4130 of the server 1201 are plotted. Since all the data sets stored in the property information DB 4130 are plotted at the beginning, the user can understand what choices are available.

If the user taps a level of 30 (point 2806) on an axis 2803 of bitterness plotted in the graph area 2801, the processing part 1401 determines in the affirmative (Yes) in Step S2202, determines in the negative (No) in Step S2203, determines in the negative (No) in Step S2204, determines in the affirmative (Yes) in Step S2205, and then proceeds to Step S2206. After that, since the data set corresponding to the level of the property "bitterness" of 30 is only the property information 2807, the screen can be updated in Step S2207 to be the same as the screen shown in FIG. 24 by hiding the property information 2808 and 2809 of the two data sets other than the relevant data set.

As described above, in this embodiment, the levels of the properties registered with the database of the server can be displayed to help the user select a level of a property.

Third Embodiment

In the second embodiment all the data sets are displayed in the graph area 2801. However, as the number of the data sets of the property information stored in the property information DB 4130 of the server 1201 increases, the visibility of the graph area 2801 may deteriorate. In a third embodiment, the data sets of the property information registered with the database of the server are processed to display a range of selectable levels of a property, thereby helping the user to select a level of the property. Note that descriptions of the same components or processings as those in the first or second embodiment will be omitted.

Figure 29:
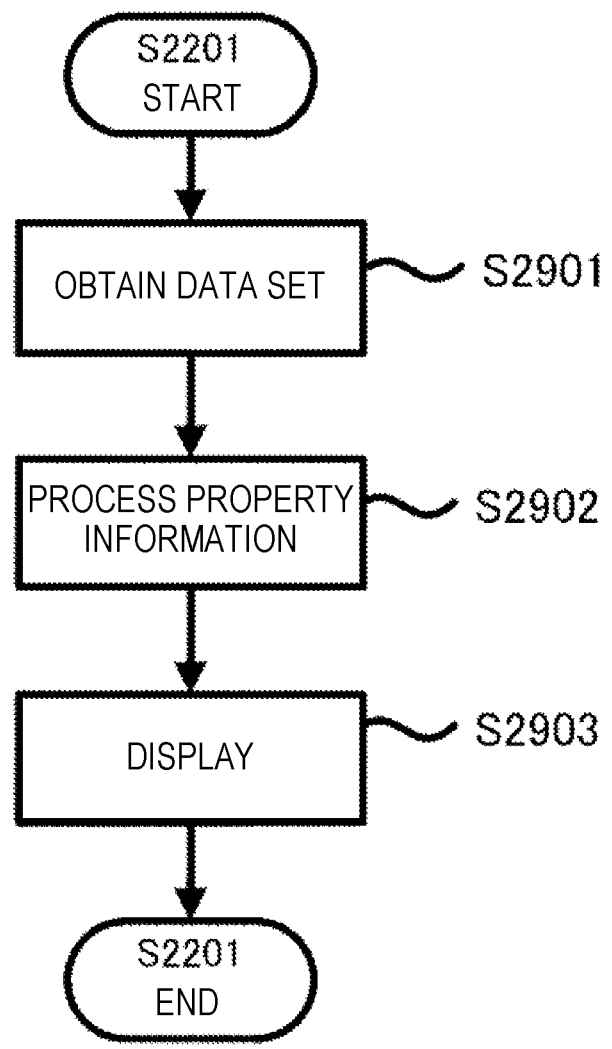
FIG. 29 is a flow diagram showing an example of a process of displaying a setting screen according to a third embodiment.

FIG. 29 is a flow diagram showing a process of Step S2201 according to the third embodiment in detail. In Step S2901, the processing part 1401 obtains property information stored in the property information DB 4130 of the server 1201. The processing part 1401 then proceeds to Step S2902, where the processing part 1401 performs a data processing described later on the property information included in the obtained data set. The processing part 1401 then proceeds to Step S2903, where an initial display of a setting screen is provided, and the processing part 1401 then proceeds to Step S2202. The subsequent process is the same as that in the first embodiment and therefore will not be further described.

The data processing in Step S2902 is a processing of specifying a range of the level of a property based on a plurality of pieces of property information. In an example, the range of the level of a property may be specified based on the minimum value and the maximum value of the level of the property in a plurality of pieces of property information. Specifically, for each of the properties, the minimum value and the maximum value of the level of the property may be obtained from the property information, and the range between the minimum value and the maximum value may be designated as the "range of selectable levels" of the property.

In another example, the range of selectable levels of a property may be generated based on a statistical numerical value, such as an average value, a median or a variance of the levels of the property in all the property information.

In an example, the processings of Steps S2901 and S2902 may be performed by the processing part 1301 of the server 1201. That is, the mobile terminal 1202 having performed the processing of Step S2201 may request the server 1201 to generate an initial display screen, and the processing part 1301 may determine the range of the level of a property based on the data in the database 1309 and transmit the range to the mobile terminal 1202. The mobile terminal 1202 can then display the received range of the level of the property.

Figure 30:
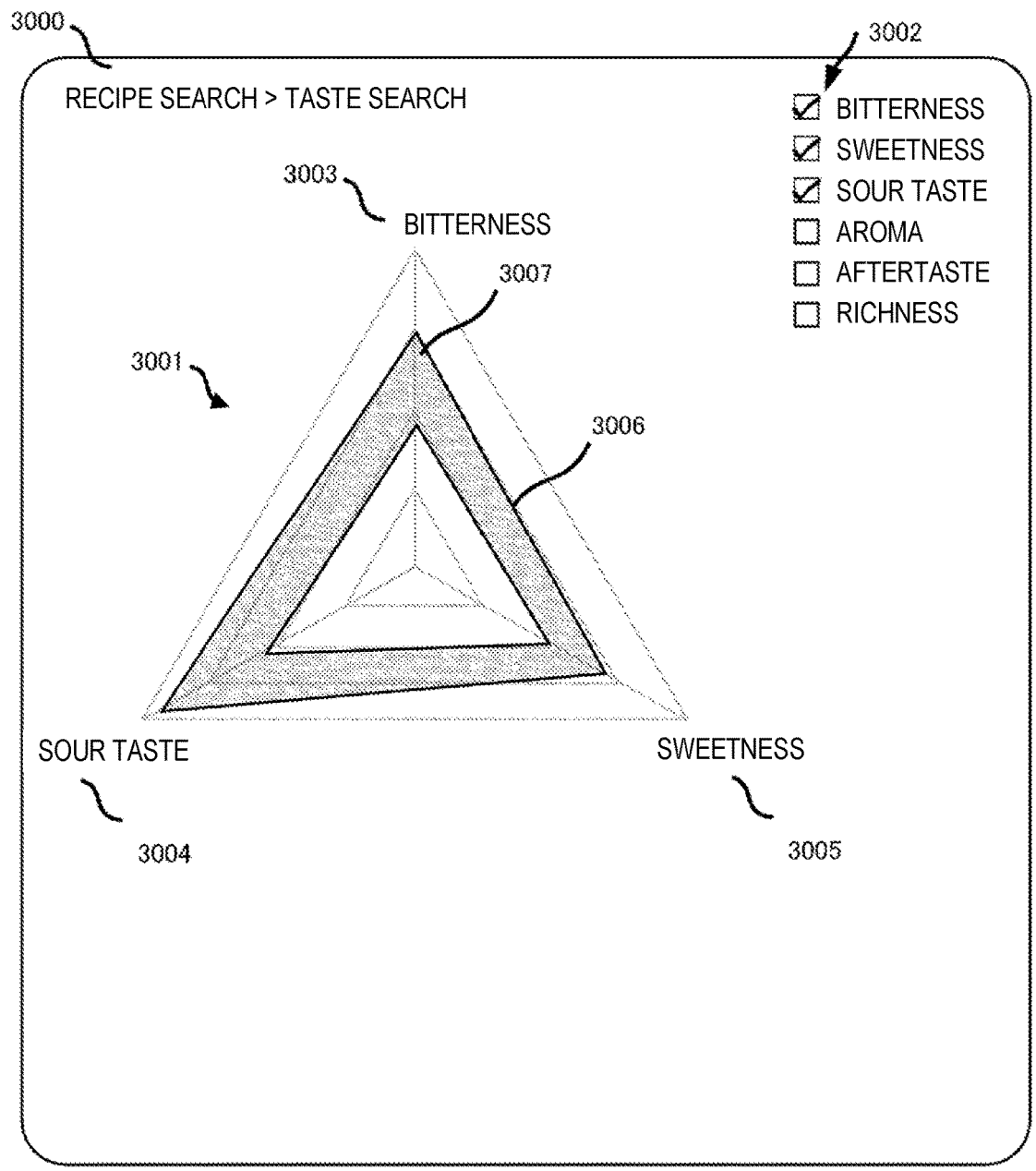
FIG. 30 is a diagram showing an example of the setting screen according to the third embodiment.

FIG. 30 shows an example of a setting screen initially displayed in the third embodiment. In a setting screen 3000 shown in FIG. 30, a graph area 3001 and a legend area 3002 are displayed. In the graph area 3001, an axis 3003 of the property "bitterness", an axis 3004 of property "sour taste", an axis 3005 of the property "sweetness", and a selectable range 3006 based on the range of the levels of the properties determined in Step S2902 are displayed. As can be seen, in the example shown in FIG. 30, for all the data sets stored in the property information DB 4130, the level of the property "bitterness" falls within a range from 19 to 30, for example. It can also be seen that, for all the data sets, the level of the property "sour taste" falls within a range from 21 to 38.

The range of the levels of the properties generated based on the data sets stored in the property information DB 4130 displayed at the beginning can serve as a guidance for the user to select the level of a property. In addition, even if the number of the data sets of the property information stored in the property information DB 4130 increases, a good visibility of the graph area can be maintained while the user selects the level of a property.

If the user taps a level of 30 (point 3007) on the axis 3003 of bitterness plotted in the graph area 3001, the processing part 1401 determines in the affirmative (Yes) in Step S2202, determines in the negative (No) in Step S2203, determines in the negative (No) in Step S2204, determines in the affirmative (Yes) in Step S2205, and then proceeds to Step S2206. After that, when the data sets corresponding to the level of the property "bitterness" of 30 is narrowed down to one data set, the screen can be updated in Step S2207 to be the same as the screen shown in FIG. 24 in which the range of the levels of the properties is hidden.

As described above, in this embodiment, a range of selectable levels of a property registered with the database of the server is displayed to help the user select a level of the property. In this way, even if the number of pieces of property information registered with the database increases, a good visibility of the graph area can be maintained while helping the user select a level of a property.

Although FIG. 30 shows an example in which the selectable range 3006 based on the determined range of the levels of the properties is represented by a radar chart, the present invention is not limited thereto. For example, a bar chart or the like may be used to indicate to the user that the level of the property "bitterness" falls within a range from 19 to 30. In such a case, labels of the properties (such as "bitterness", "sweetness", and "sour taste") can be arranged in the row direction, and eighteen white coffee bean icons, twelve black coffee bean icons following the white coffee bean icons and a predetermined number of white coffee bean icons following the black coffee bean icons can be arranged in the row of the property "bitterness" in the column direction. The black coffee bean icons can indicate that the level of the property "bitterness" falls within a range from 19 to 30.

Fourth Embodiment

In the third embodiment, the ranges of the levels of the properties from all the property information stored in the database are collectively displayed in the graph area 2801. In another example, a range of the level of a property may be displayed for each type of beans to help the user to select the level of the property. In a fourth embodiment, a mobile terminal will be described which obtains property information registered with the database of the server and processes and display the property information for each type of beans to help the user to select a level of a property. Note that descriptions of the same components or processings as those in the first to third embodiment will be omitted.

Figure 31:
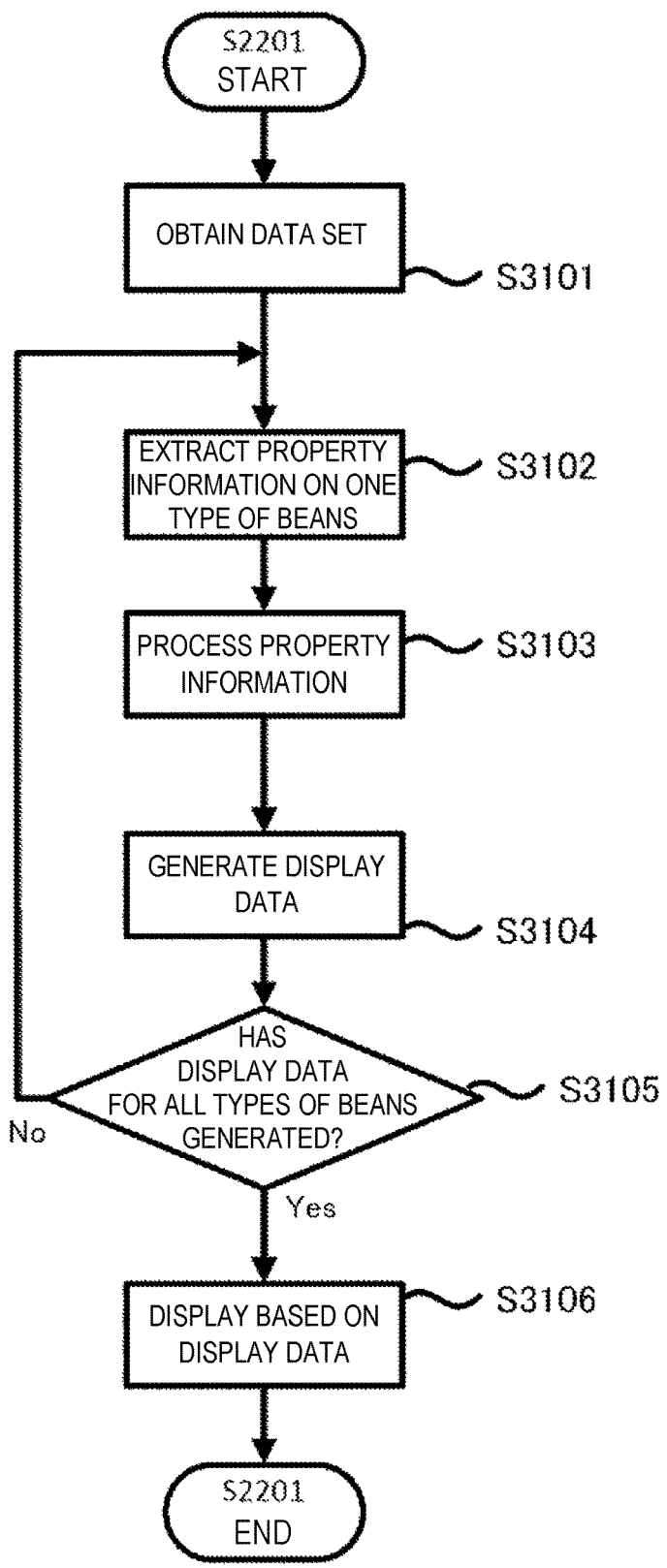
FIG. 31 is a flow diagram showing an example of a process of displaying a setting screen according to a fourth embodiment.

FIG. 31 is a flow diagram showing a process of Step S2201 performed by a processing part 1401 of a mobile terminal according to the fourth embodiment in detail. In Step S3101, the processing part 1401 obtains the data sets stored in the property information DB 4130 of the server 1201. The processing part 1401 then proceeds to Step S3102, where the processing part 1401 extracts property information corresponding to one type of beans from the obtained data sets.

The processing part 1401 then proceeds to Step S3103, where the processing part 1401 processes the property information. The processing part 1401 generates display data in Step S3104, and determines in Step S3105 whether or not display data has been generated for all types of bean included in the obtained data sets. If the processing part 1401 determines that display data has not been generated for all types of bean (if No in Step S3105), the processing part 1401 returns to Step S3102, where the processing part 1401 extracts property information corresponding to another type of beans. If the processing part 1401 determines that display data has been generated for all types of bean (if Yes in Step S3105), the processing part 1401 proceeds to Step S3106, where the processing part 1401 provides an initial display of a setting screen based on all the display data generated. After that, the processing part 1401 proceeds to Step S2202. The subsequent process is the same as that in the first embodiment and therefore will not be further described. As with the processing of property information in Step S2902, the processing of property information in Step S3103 may be a processing of specifying a range of the level of a property based on a plurality of pieces of property information.

Figure 32:
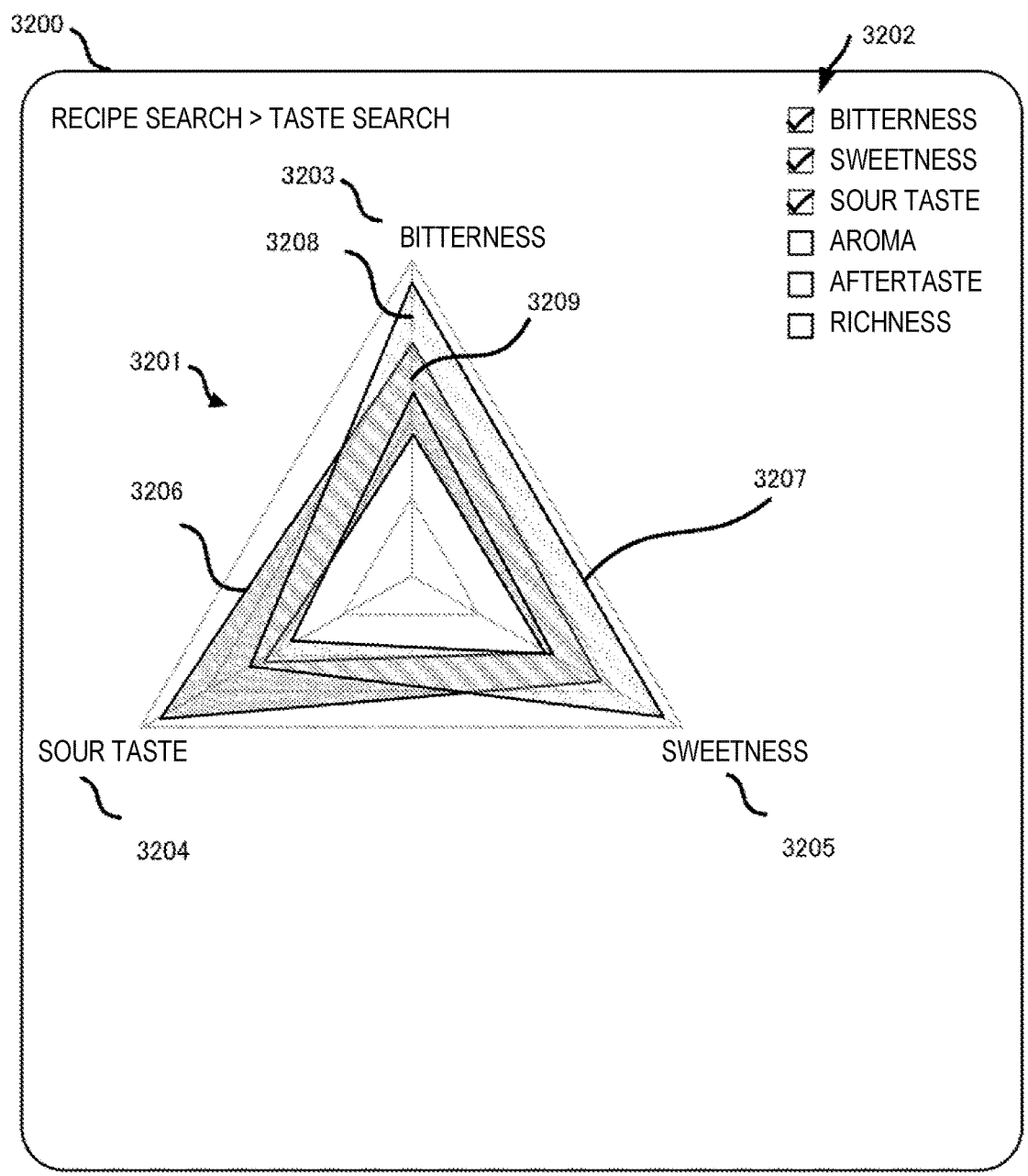
FIG. 32 is a diagram showing an example of the setting screen according to the fourth embodiment.

FIG. 32 shows an example of the initial display of a setting screen according to the fourth embodiment. In the description of the example shown in FIG. 32, it is supposed that the property information DB 4130 stores data sets concerning two types of beans (beans A and beans B).

In a setting screen 3200 shown in FIG. 32, a graph area 3201 and a legend area 3202 are displayed. In the graph area 3201, axes 3203 to 3205 of properties are displayed, and a range 3206 of the levels of the properties of the type "A" of beans and a range 3207 of the levels of the properties of the type "B" of beans are displayed as the display data generated in Step S3104.

The range of the levels of the properties generated based on the data sets stored in the property information DB 4130 and displayed for each type of beans at the beginning can serve as a guidance for the user to select the level of a property. Since the range of the levels of the properties is displayed for each type of beans, the user can also understand the levels of the properties specific to a particular type of beans.

Next, an operation of the processing part 1401 will be described which occurs when the user taps a point 3208 on the screen shown in FIG. 32. The point 3208 is a point indicating a level of the property "bitterness" of 35. The point 3208 does not fall within the range 3206 of the levels of the properties of the beans A but falls within the range 3207 of the levels of the properties of the beans B.

Figure 33:
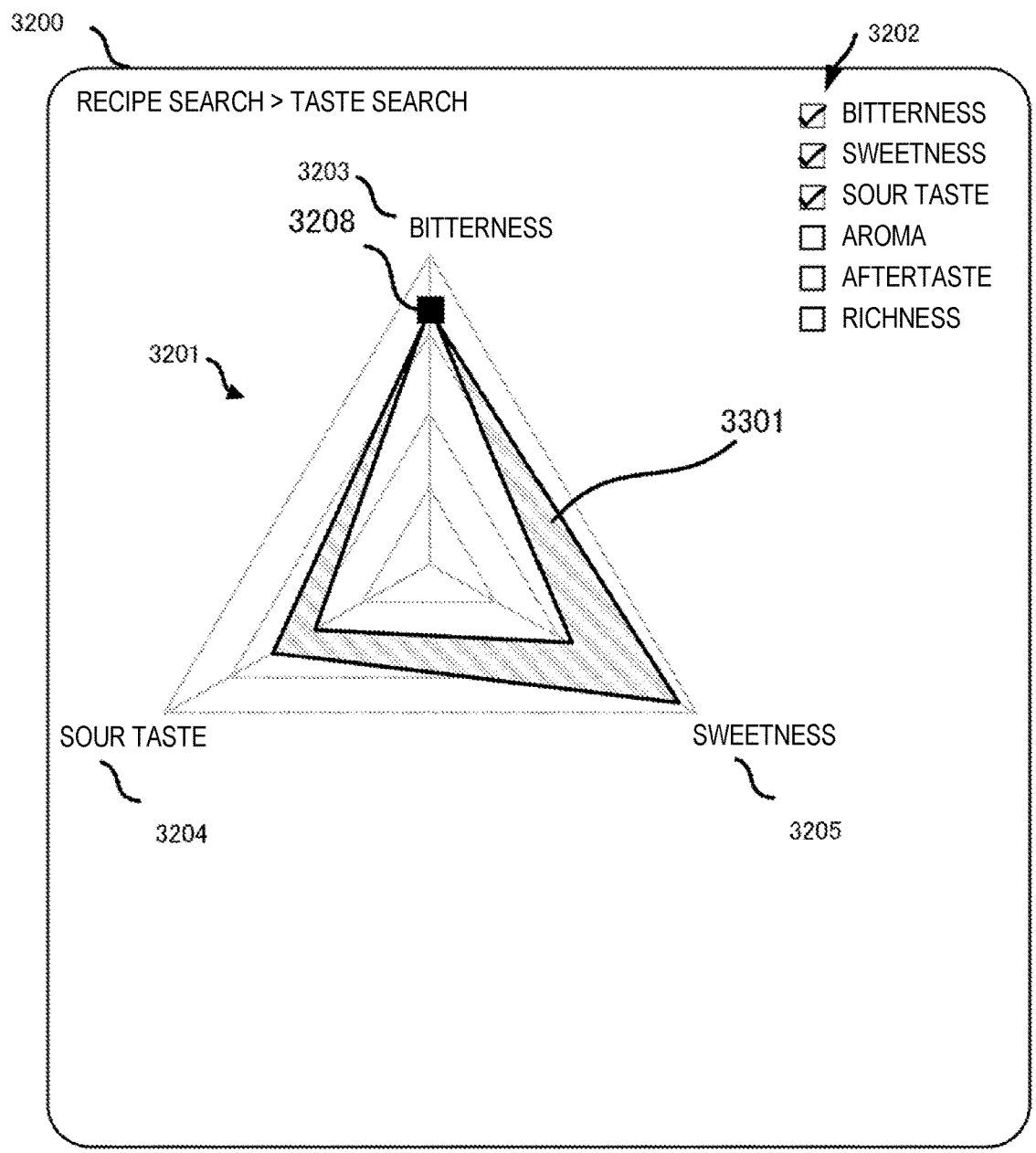
FIG. 33 is a diagram showing an example of the setting screen according to the fourth embodiment.

In this case, in an example, the range of the levels of the properties indicated by a data set including the selected level of the property may be displayed. FIG. 33 shows an example of a setting screen displayed when the level of the property "bitterness" of 35 is tapped on the screen shown in FIG. 32. In the graph area 3201 shown in FIG. 33, the same axes 3203 to 3205 of properties as those shown in FIG. 32 are displayed, and a range 3301 of the levels of the properties is displayed which is indicated by a data set including the same level of the property as the level at the point 3208. That is, the example shown in FIG. 33 is an example where the user has selected the point 3208, and a plurality of data sets can be further selected.

Since the level of the property corresponding to the point 3208 is included in the range 3207 of the levels of the properties of the beans B but is not included in the range 3206 of the levels of the properties of the beans A, the range of the levels of the properties of the beans A is not displayed.

Figure 34:
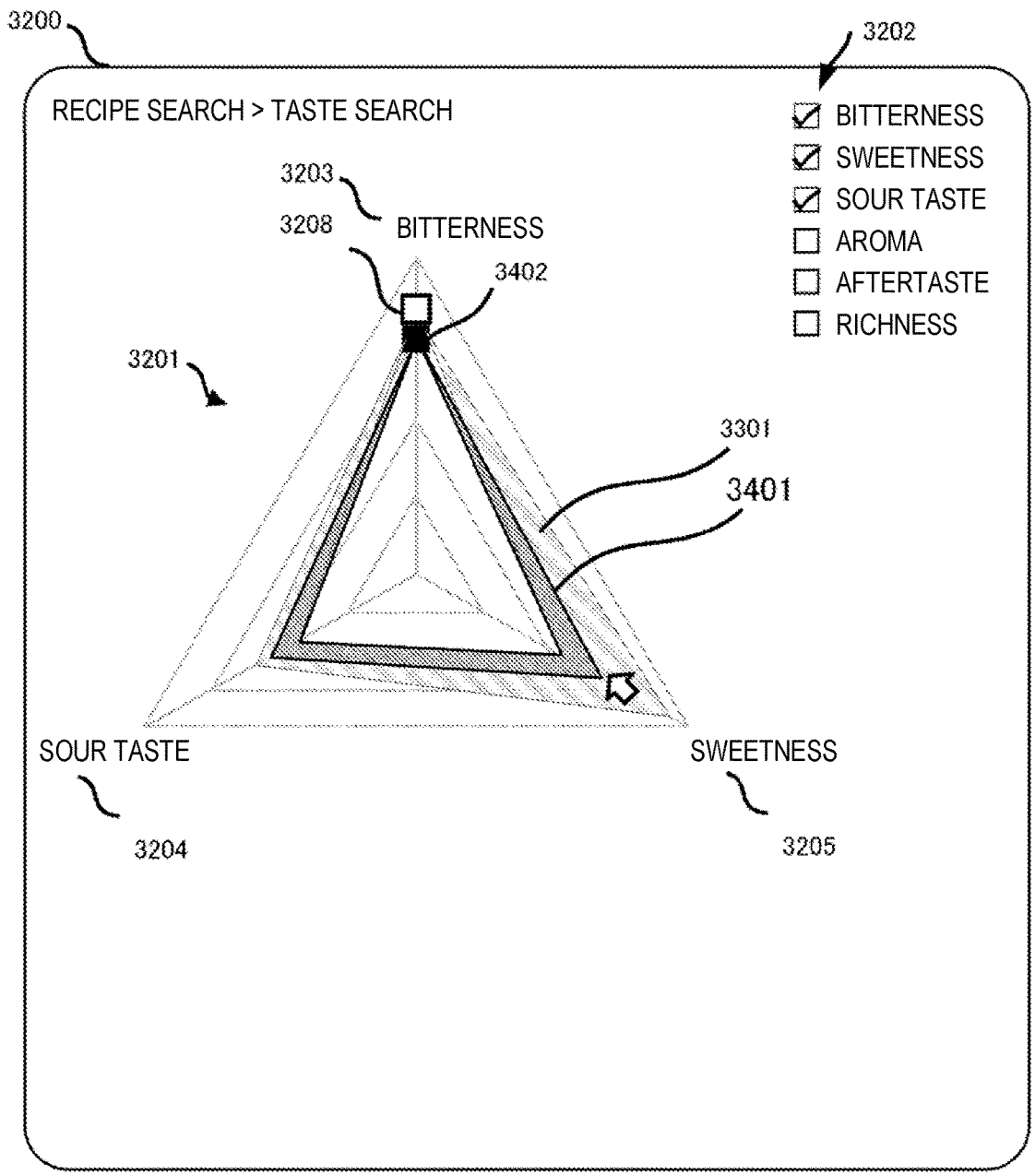
FIG. 34 is a diagram showing an example of the setting screen according to the fourth embodiment.

Next, with reference to FIG. 34, an operation will be described which occurs when the user has moved the point 3208 by dragging on the screen shown in FIG. 33. FIG. 34 illustrates an operation that occurs when the level of the selected property "bitterness" is changed from the point 3208, which corresponds to a level of "bitterness" of 35, to a point 3402, which corresponds to a level of "bitterness" of 32. In this case, since the point 3402 falls outside the range 3206 of the levels of the properties of the beans A although the point 3402 falls within the range 3207 of the levels of the properties of the beans B, the range 3206 of the levels of the properties of the beans A is not displayed. If the data set indicating the same level of the property as the level indicated by the newly selected point 3402 has a different range of levels of properties, the range of the levels of the properties is changed from the range 3301 to a range 3401, for example.

Next, a setting screen will be described which is displayed when the user taps a point 3209 on the screen shown in FIG. 32. The point 3209 is a point corresponding to a level of the property "bitterness" of 28, and is included in the range 3206 of the levels of the properties of the beans A and the range 3207 of the levels of the properties of the beans B. It is supposed that there are two data sets that indicate the same level of the property as the level at the point 3209.

In this case, the processing part 1401 may display the property information included in the two data sets, as well as ingredient information 3501 and 3502 included in the two data sets and a "reflect in recipe" button 3503. The user can obtain a preparation profile by pressing and selecting any of the ingredient information 3501 and 3502 and then pressing the "reflect in recipe" button 3503 (Yes in Step S2203) (S2209).

Alternatively, the level of the property "sour taste" may be further selected. In that case, a data set may be selected by tapping a point 3504 or a point 3505.

Figure 35:
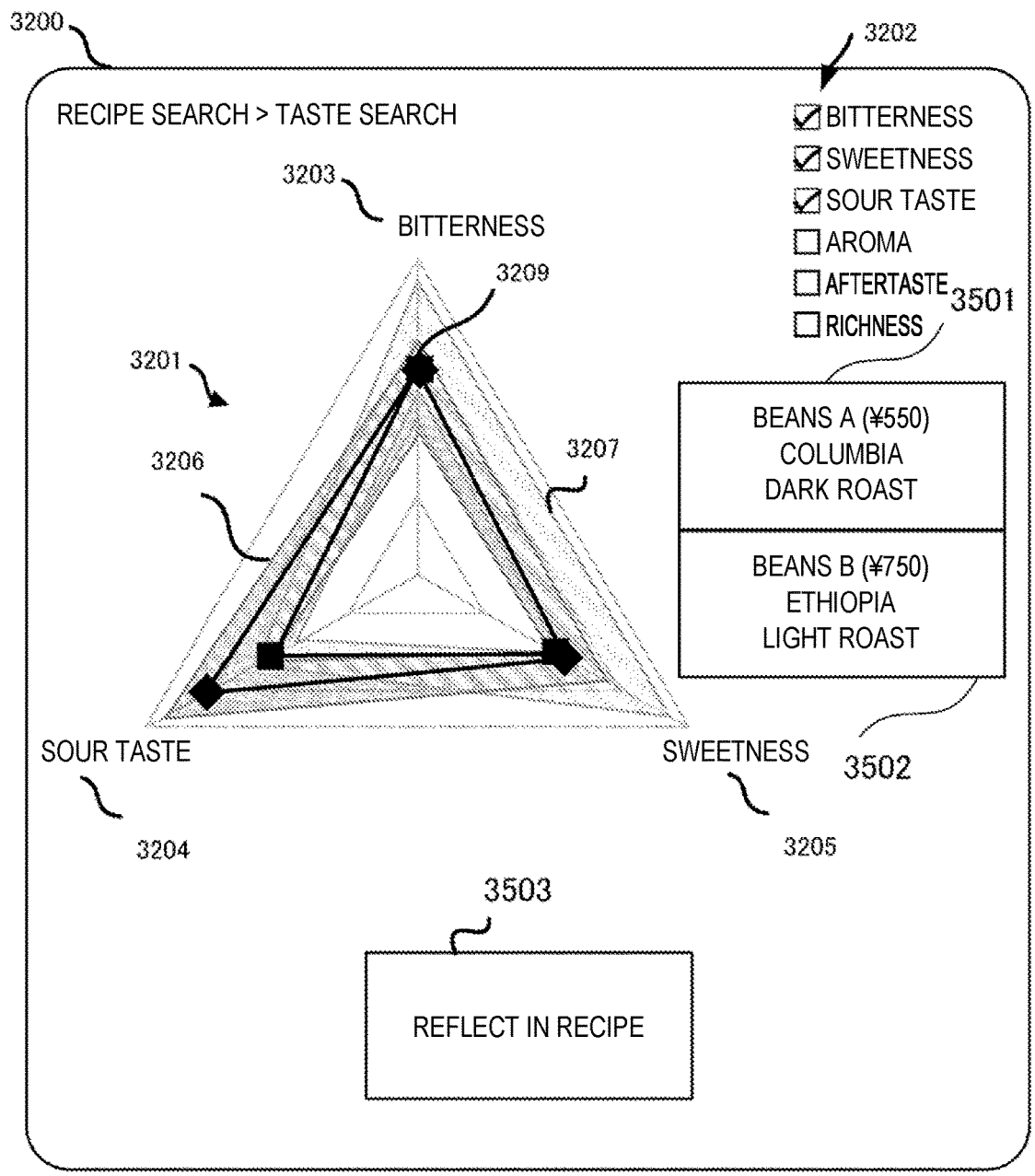
FIG. 35 is a diagram showing an example of the setting screen according to the fourth embodiment.

Although the range 3206 of the levels of the properties of the beans A and the range 3207 of the levels of the properties of the beans B are still displayed on the screen shown in FIG. 35, the ranges 3206 and 3207 may be hidden when the two data sets including the same level of the property as the level at the point 3209 are displayed.

Figure 36:
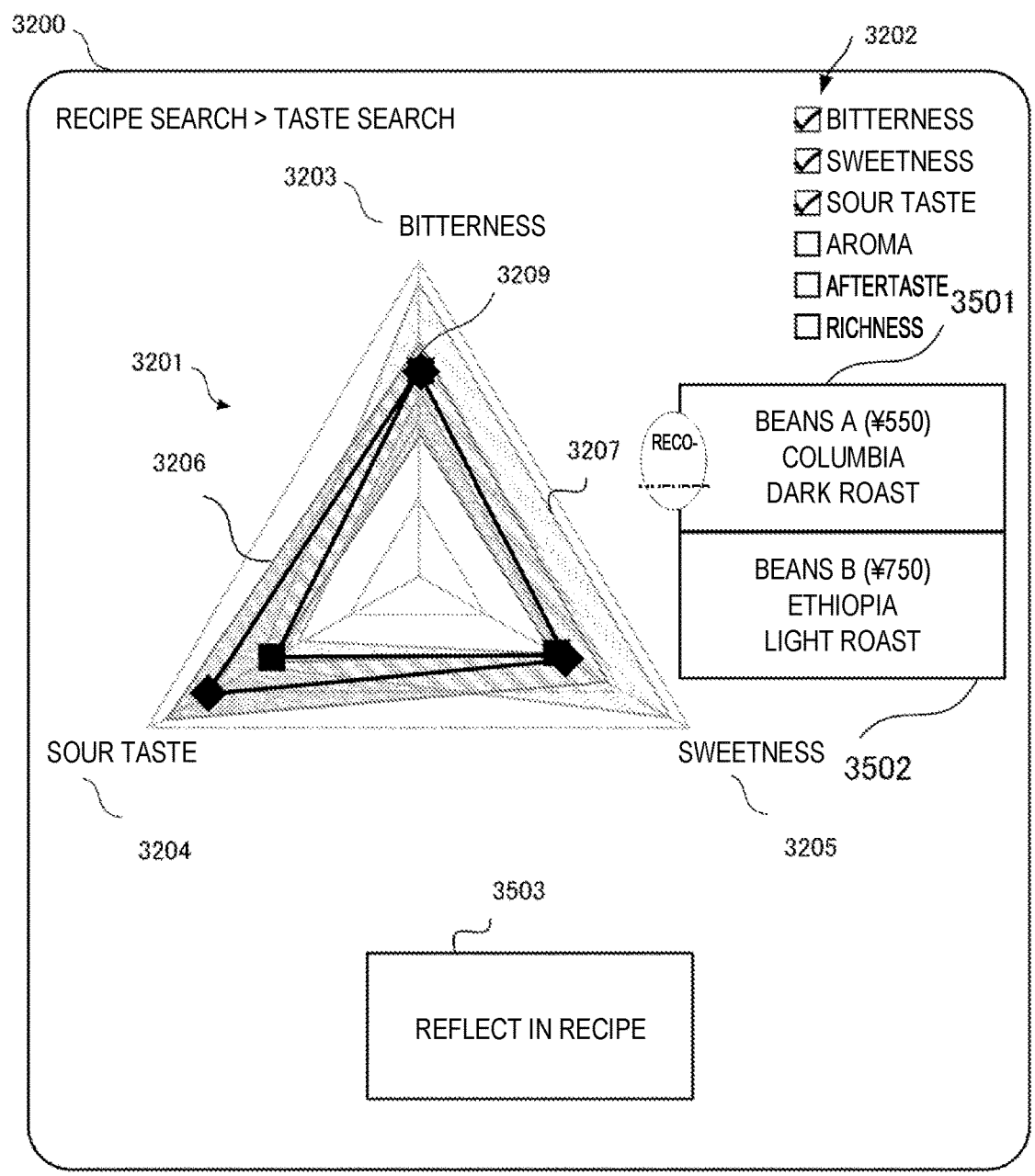
FIG. 36 is a diagram showing an example of the setting screen according to the fourth embodiment.

In an example, when the processing part 1401 displays a plurality of pieces of ingredient information, the processing part 1401 may recommend any beverage information based on the information included in the data sets. With reference to FIG. 36, an operation of the processing part 1401 will be described which occurs when the user taps the point 3209 on the screen shown in FIG. 32.

When displaying ingredient information 3501 and 3502, the processing part 1401 displays a recommendable ingredient based on at least any of priority information 4138 and price information 4139 included in the data sets. In an example, the ingredient DB 4130 may store information on a stock of beans, and the processing part 1401 may display a recommendable ingredient based on the information on a stock of beans.

As described above, in this embodiment, a range of the levels of the properties registered with the database of the server can be displayed for each type of beans to help the user select a level of a property.

In an example, a range of the levels of the properties may be displayed for each producing area or each degree of roasting, rather than for each type of beans.

Fifth Embodiment

In the first to fourth embodiments, the user selects a flavor to the taste of the user based on the level of any of the properties "bitterness", "sweetness", "sour taste", "aroma", "aftertaste" and "richness". In an example, the property used when the user selects a flavor to the taste of the user can be changed. In a fifth embodiment, a process of changing the property used when selecting the beverage information to be obtained based on a mental image of an ideal coffee will be described.

In this embodiment, when the "mental image search" button 2102 in FIG. 21 is pressed, the processing part 1401 of the mobile terminal 1202 performs the process shown in FIG. 22. In Step S2201 in FIG. 22, the process shown in FIG. 37 is performed.

Figure 37:
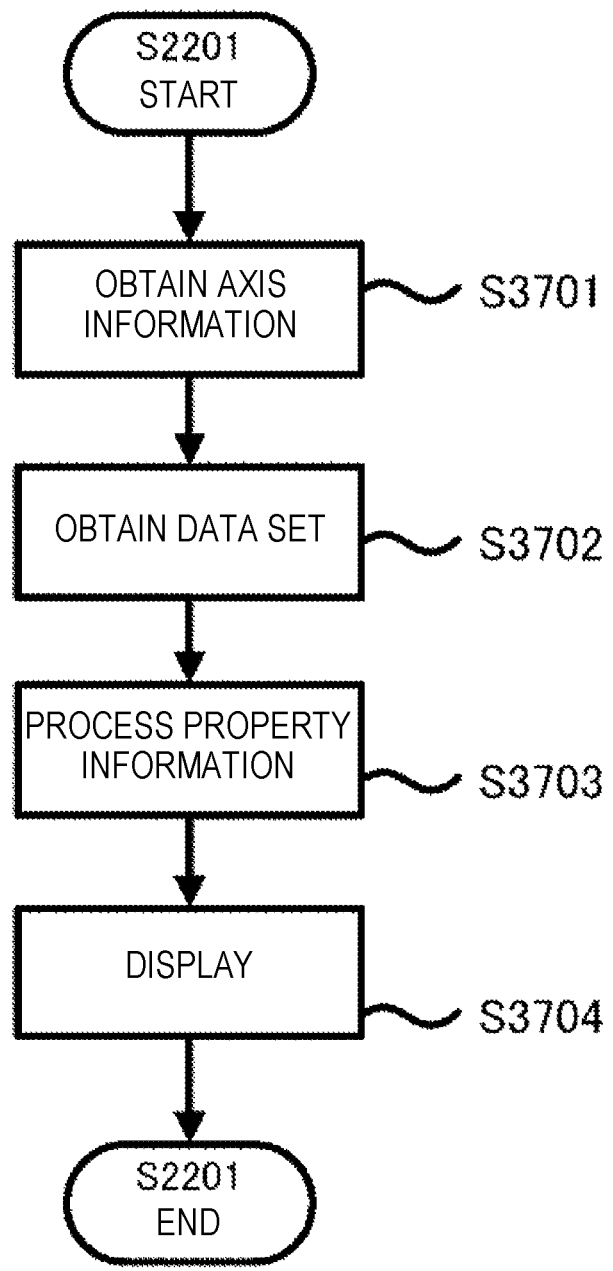
FIG. 37 is a flow diagram showing an example of a process of displaying a setting screen according to a fifth embodiment.

FIG. 37 is a flow diagram showing a process of providing an initial display of a setting screen according to the fifth embodiment. First, in Step S3701, the processing part 1401 obtains axis information from the server 1201. The "axis information" refers to information concerning a setting item of a property used when obtaining beverage information. For example, the axis information is information concerning the setting items in the column of property information 4140 in the property information DB 4130 shown in FIG. 41. The processing part 1401 then proceeds to Step S3702, where the processing part 1401 obtains a data set stored in the property information DB 4130 of the server 1201. The processing part 1401 then proceeds to Step S3702, where the processing part 1401 performs a data processing on the property information included in the obtained data set, and then proceeds to Step S3704, where the processing part 1401 provides an initial display corresponding to the obtained property information.

Figure 38:
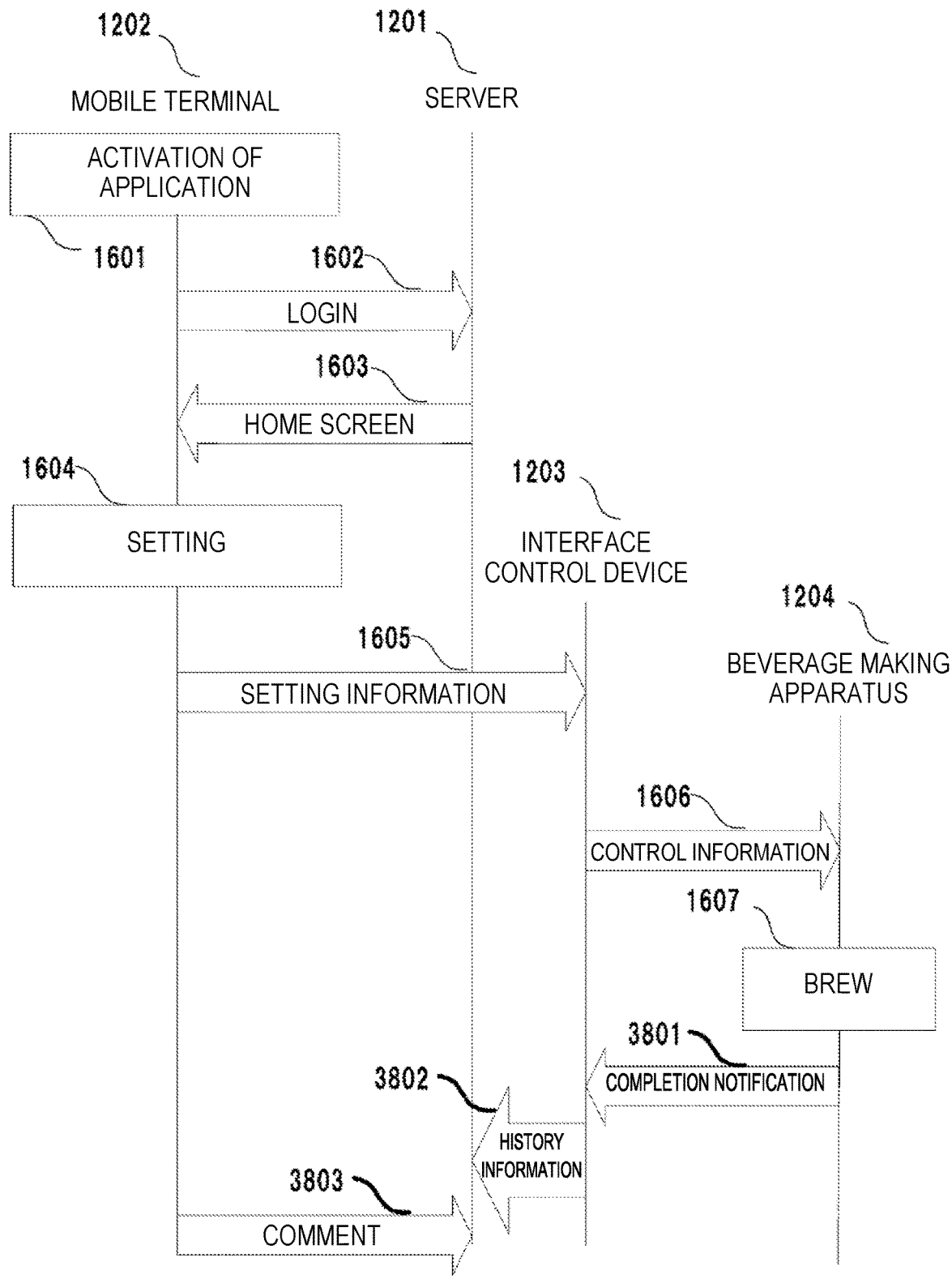
FIG. 38 is a diagram for illustrating a flow of a process up to brewing of coffee and obtaining of history information.

Next, with reference to FIGS. 38 and 39, an example of a process of changing a setting item of the property information 4140 stored in the property information DB 4130 of the server 1201 will be described. FIG. 38 is a diagram for illustrating a flow of a process up to brewing of coffee and obtaining of history information. The process up to Step 1607 of brewing coffee is the same as the process shown in FIG. 16 and therefore will not be further described.

Once brewing of coffee is completed, the beverage making apparatus 1204 transmits a completion notification to the information display device 1203 (Step 3801). The information display device 1203 having received the completion notification generates history information based on the setting information received in Step 1605, and transmits the history information to the server 1201 (step 3802). In an example, the history information includes at least any of a preparation profile, a preparation profile ID, information concerning an identifier of the beverage making apparatus 1204, ingredient information, a user identifier, and data-and-time information on the date and time when an order is accepted. The server 1201 having received the history information adds a record to the user information DB 4110 based on the history information. In an example, the record includes user information 4111, data-and-time information 4112, bean information 4113, producing area information 4114, roasting degree information 4115, a preparation profile ID 4116 and machine information 4117 in the user information DB.

In addition, the user who has have the brewed coffee may transmit a comment or rating on the beverage from the mobile terminal 1202 (Step 3803). The comment may be entered on a comment entry screen shown in FIG. 19. For example, rating information in the display area 1902 shown in FIG. 19 may correspond to a rating 4118 in the user information DB 4110, and comment information in the display area 1903 may correspond to a comment 4119 in the user information DB 4110.

Next, with reference to FIG. 39, an operation will be described in which the server 1201 having the user information DB 4110 storing the history information on the user extracts a beverage property used when the user selects a beverage. The process shown in FIG. 39 is performed by the processing part 1301 of the server 1201 when a predetermined number of pieces of history information are stored in the server 1201, at regular time intervals, or at a timing indicated by a server administrator.

First, in Step S3901, the processing part 1301 obtains a data set in the user information DB 4110 from the database 1309. The processing part 1301 then proceeds to Step S3902, where the processing part 1301 analyzes the comment included in the data set and extracts a word that frequently occurs in the comment. The processing part 1301 then proceeds to Step S3903, where the processing part 1301 determines a property of the beverage to be used when the user searches for a preparation profile for the beverage based on the word that frequently occurs in the comment information. In an example, words such as "bitter" or "sour" that are similar to the terms already registered as properties with the database 1309 may be excluded even if those words frequently occur in the comment information. In an example, a color noun such as "redness" or "whiteness" that can come to mind when having coffee may be extracted to determine a property. In an example, a noun such as "blueberry" or "almond" that can come to mind when having coffee may be extracted to determine a property. That is, the processing part 1301 extracts a word that can make a contribution to a mental image of coffee according to a predetermined rule. The processing part 1301 then proceeds to Step S3904, where the processing part 1301 registers the determined property in the column of the determined property in the property information 4140 in the property information DB 4130.

The processing part 1301 then proceeds to Step S3905, where the processing part 1301 obtains comment information from data sets that are the same in at least any of the bean information 4113, the producing area information 4114, the roasting degree information 4115 and the preparation profile ID 4116. In the description of this embodiment, it is supposed that comment information is obtained from data sets that are the same in all of the bean information 4113, the producing area information 4114, the roasting degree information 4115 and the preparation profile ID 4116. Although comment information is described as being obtained for all the users in this embodiment, comment information may be obtained for only one user or for some users selected by age or address, for example.

The processing part 1301 then proceeds to Step S3906, where the processing part 1301 calculates the level of the determined property for the group of data sets. In an example, the ratio of the comments including the word denoting the determined property to all the comments of the group may be adopted as the level of the property. Alternatively, the level of the property may be determined based on the number of users who have used the word denoting the determined property in the comments of the group. Alternatively, a natural language processing may be used, and the level of the property may be determined based on a distance between the property and the group in a vector space or a distance between the property and a comment in a vector space.

The processing part 1301 then proceeds to Step S3907, where the processing part 1301 registers the calculated level of the property in a data set that matches the ingredient information and preparation profile ID 4134 of the group in the property information DB 4130. The processing part 1301 then proceeds to Step S3908, where the processing part 1301 determines whether or not the levels of all the properties have been calculated for all the groups of data sets.

Figure 39:
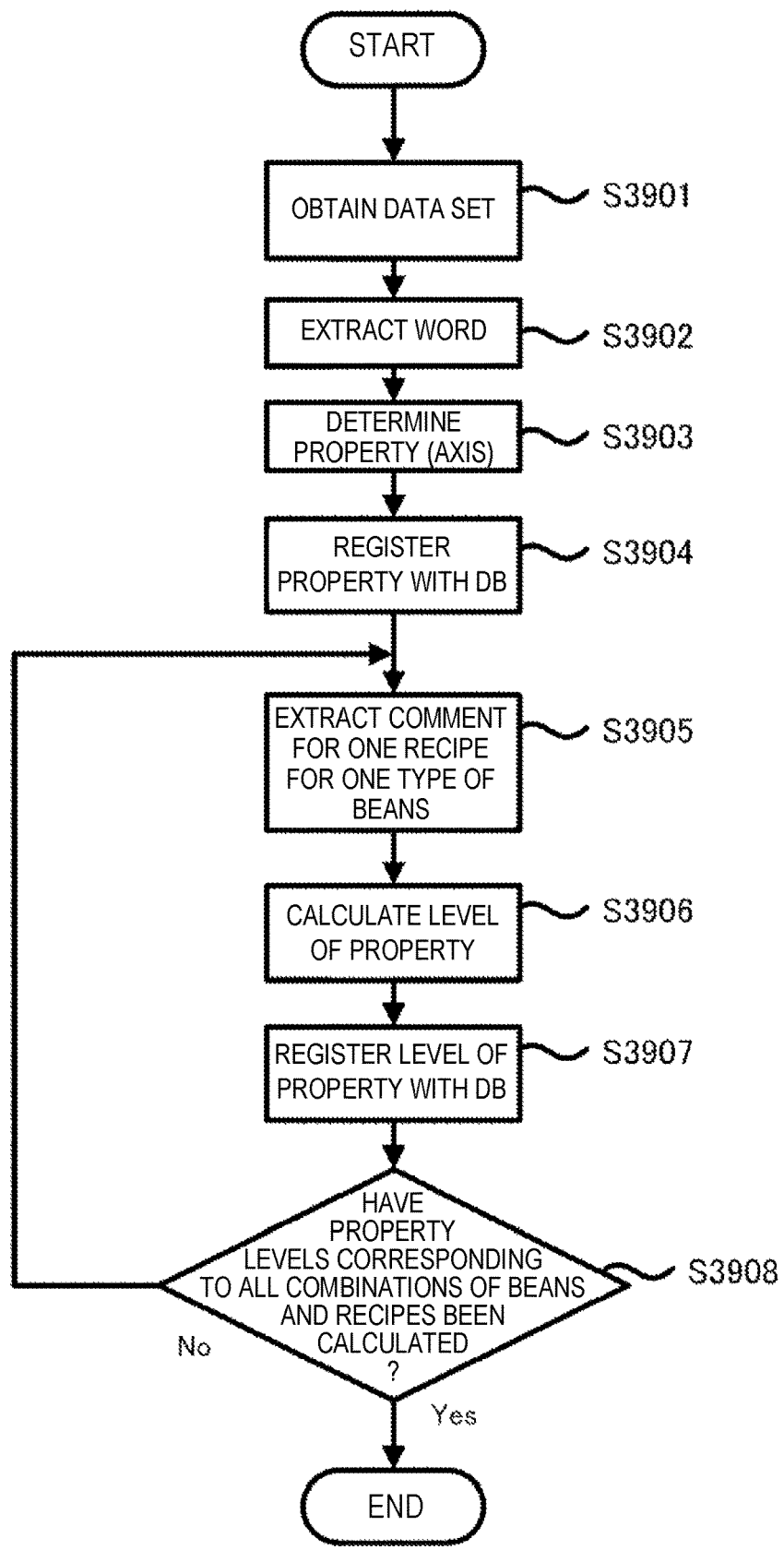
FIG. 39 is a flow diagram showing an example of a process of obtaining a property or a level of a property from a comment on a beverage.

When the processing part 1301 determines that the levels of all the properties have been calculated for all the groups (if Yes in Step S3908), the processing part 1301 ends the process shown in FIG. 39. If there is a group for which the levels of the properties have not been calculated yet (if No in Step S3908), the processing part 1301 proceeds to Step S3905, where the processing part 1301 calculates the levels of the properties of the group.

Figure 40:
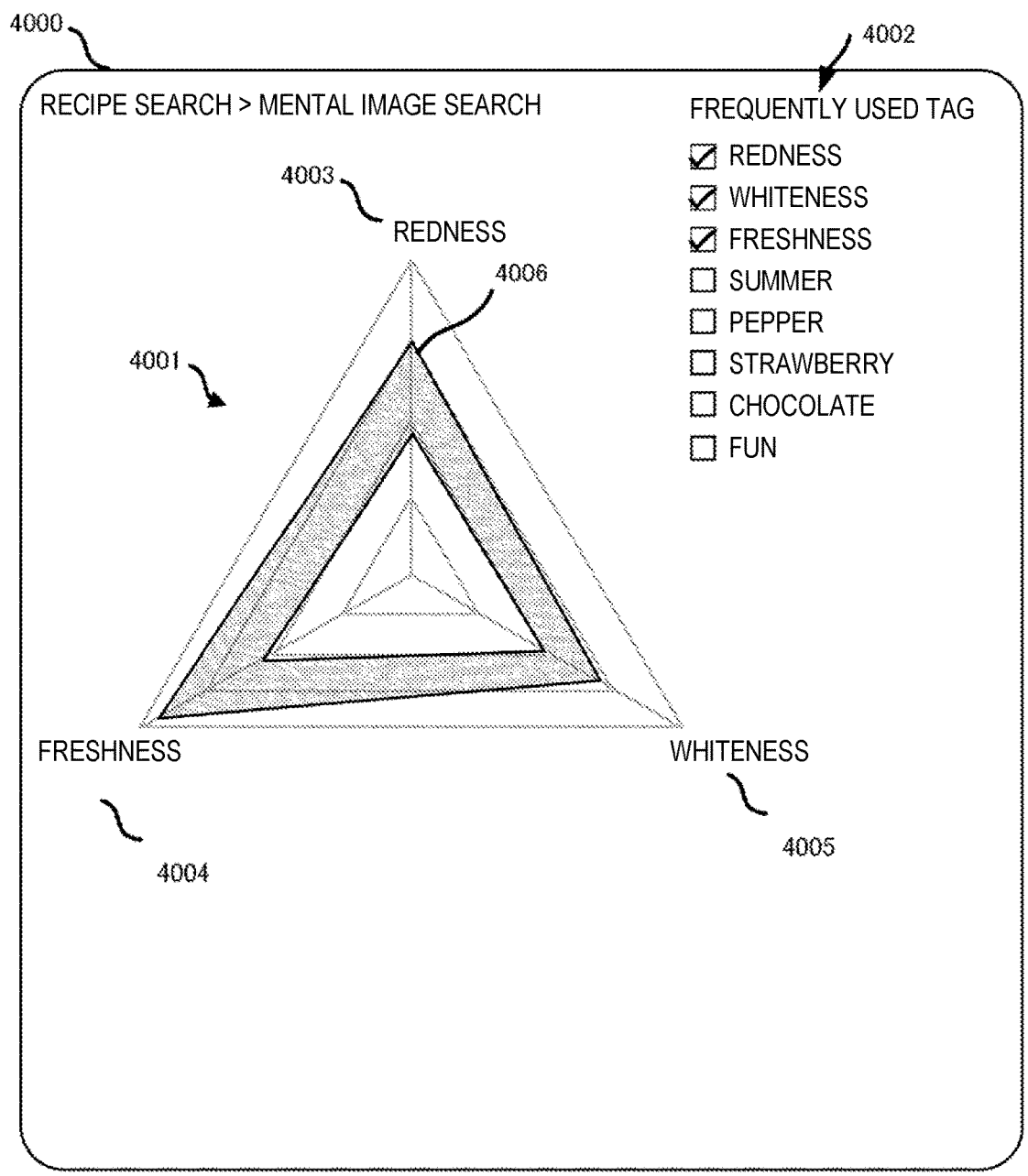
FIG. 40 is a diagram showing an example of the setting screen according to the fifth embodiment.

FIG. 40 shows an example of a setting screen displayed on the display part 1407 of the mobile terminal 1202 having performed the process shown in FIG. 37. In a setting screen 4000 shown in FIG. 40, a graph area 4001 and a legend area 4002 are displayed. In the graph area 4001, an axis 4003 of a property "redness", an axis 4004 of a property "freshness", an axis 4005 of a property "whiteness", and a selectable range 4006 based on the range of the levels of the properties determined in Step S3703 are displayed. In this example, the axis information obtained by the processing part 1401 in Step S3701 is displayed in the legend area 4002, and a predetermined number of axes are displayed in the graph area 4001. As can be seen, in the example shown in FIG. 40, for all the data sets stored in the property information DB 4130, the level of the property "redness" falls within a range from 19 to 30, for example.

The process after the initial display of the setting screen is the same as the process described in the first embodiment and therefore will not be further described.

Although this embodiment has been described on the supposition that the properties and the levels of the properties involved with a mental image of an ideal coffee used when obtaining beverage information are determined from comments from users, the properties and the levels of the properties may be determined by a barista or shop staff or by the user, as with the properties relating to the taste such as "bitterness" and "sweetness".

The levels of the properties stored in the property information DB 4130 are displayed at the beginning can serve as a guidance for the user to select the level of a property. In addition, since the properties and the levels of the properties are determined based on the comment information stored in the user information DB 4110, the user's impression of the coffee can be displayed in the form of a numerical value.

Sixth Embodiment

In the first to fifth embodiments, a flavor to the taste of the user is selected based on characteristics of the coffee, such as the taste of the coffee or a mental image of an ideal coffee. In an example, a guidance for the user to select the level of a property may be displayed based on preference information concerning the coffee ordered by the user. In a fifth embodiment, a process of displaying history information on the orders from the user in association with the properties of coffee will be described.

FIG. 42 shows an example of a process of searching for a preparation profile based on history information and information on properties of a beverage according to the sixth embodiment.

First, in Steps S3101 to S3106, as in the fourth embodiment, the processing part 1401 transmits user information to the server 1201, obtains a data set from the property information DB 4130 of the server 1201, and provides a display based on the data set. The processing part 1401 then proceeds to Step S4201, where the processing part 1401 obtains data from the user information DB 4110 of the server 1201. The processing part 1401 then obtains property information corresponding to history information on the coffees having been ordered by the user from the property information DB 4130, based on the ingredient information (bean information, producing area information and roasting degree information) from the user information DB 4110 and the property information DB 4130 and the preparation profile ID. The processing part 1401 then displays the history information in the display part 1409 in such a manner that the history information overlaps on the property information stored in the property information DB 4130.

The processing part 1401 then proceeds to Step S2202. The following process is the same as the process according to any of the first to fifth embodiments and therefore will not be further described.

Figure 43:
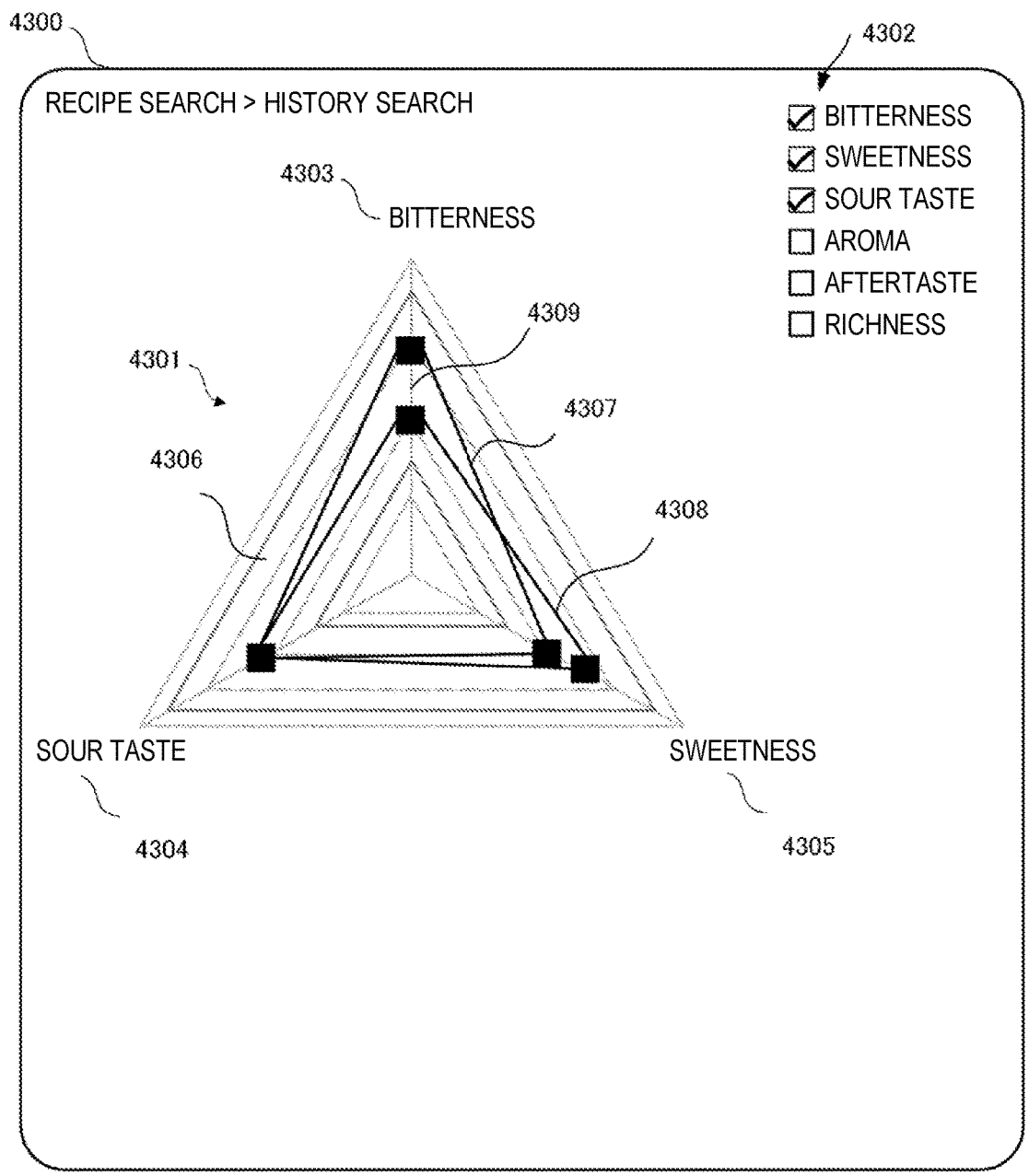
FIG. 43 is a diagram showing an example of the setting screen according to the sixth embodiment.

FIG. 43 shows an example of a setting screen according to the sixth embodiment.

In the setting screen shown in FIG. 43, a graph area 4301 and a legend area 4302 are displayed. In the graph area 4301, axes 4303 to 4305 of properties, a range 4306 of the levels of the properties generated in Step S3104, and property information 4307 and 4308 corresponding to two pieces of history information as preference information generated in Step S4201 are displayed.

Next, with reference to FIG. 44, an operation that occurs when the user taps a point 4309 will be described. In the description of this example, it is supposed that the point 4309 is not included in the property information corresponding to the history information on the user, and the property information DB 4130 stores one piece of property information that includes the level of the property corresponding to the point 4309. When the user taps the point 4309, the processing part 1401 determines the property information corresponding to the level of the property at the point 4309, and displays the property information as property information 4401 on the screen. The processing part 1401 may also display ingredient information 4402 associated with the property information 4401 and a "reflect in recipe" button 4403.

Figure 44:
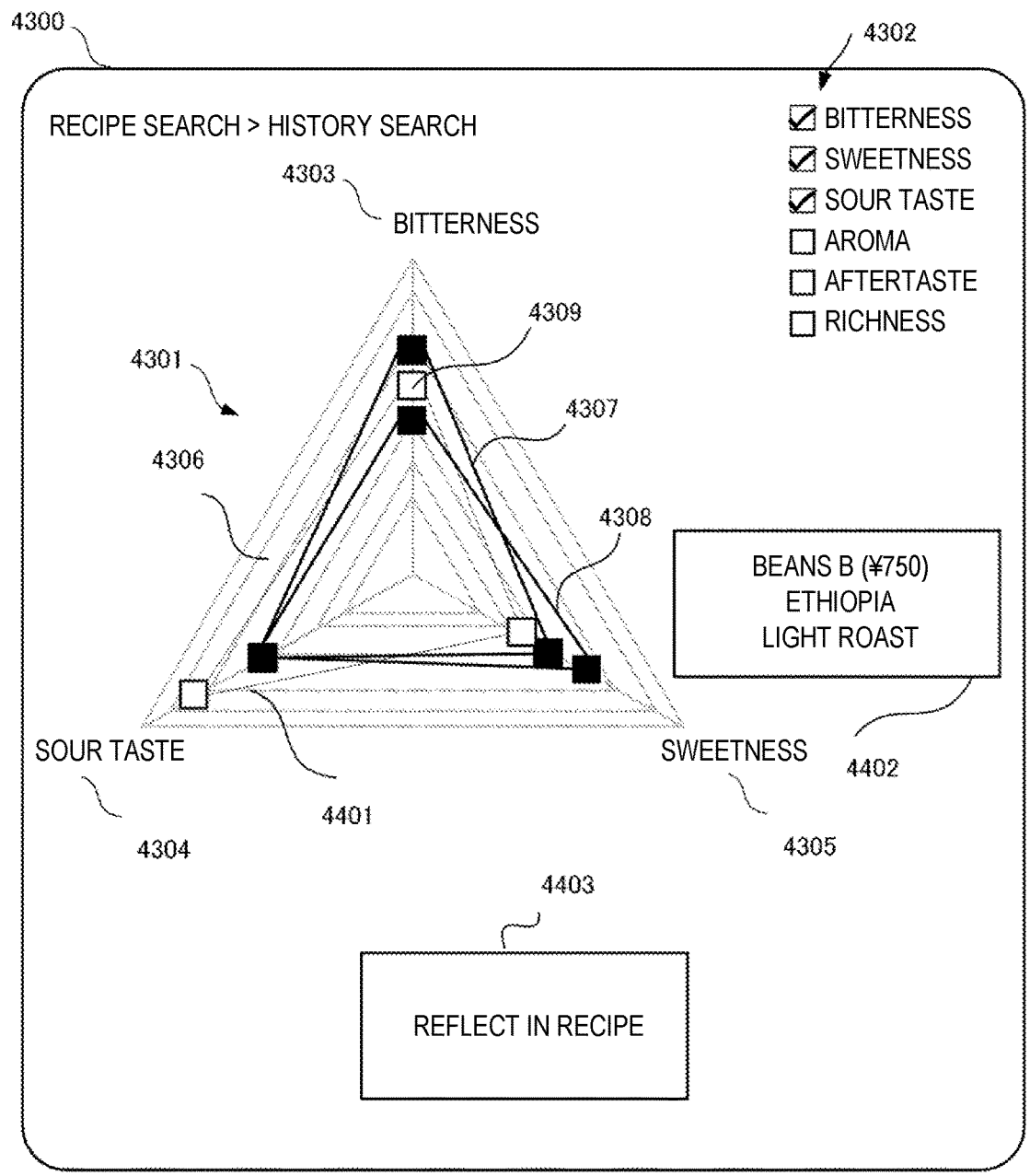
FIG. 44 is a diagram showing an example of the setting screen according to the sixth embodiment.

In the example shown in FIG. 44, the range 4306 of the levels of the properties in the property information DB 4130 and the preference information 4307 and 4308 are still displayed after the point 4309 is tapped. In an example, however, at least any of the range 4306 and the preference information 4307 and 4308 may be hidden.

Figure 45:
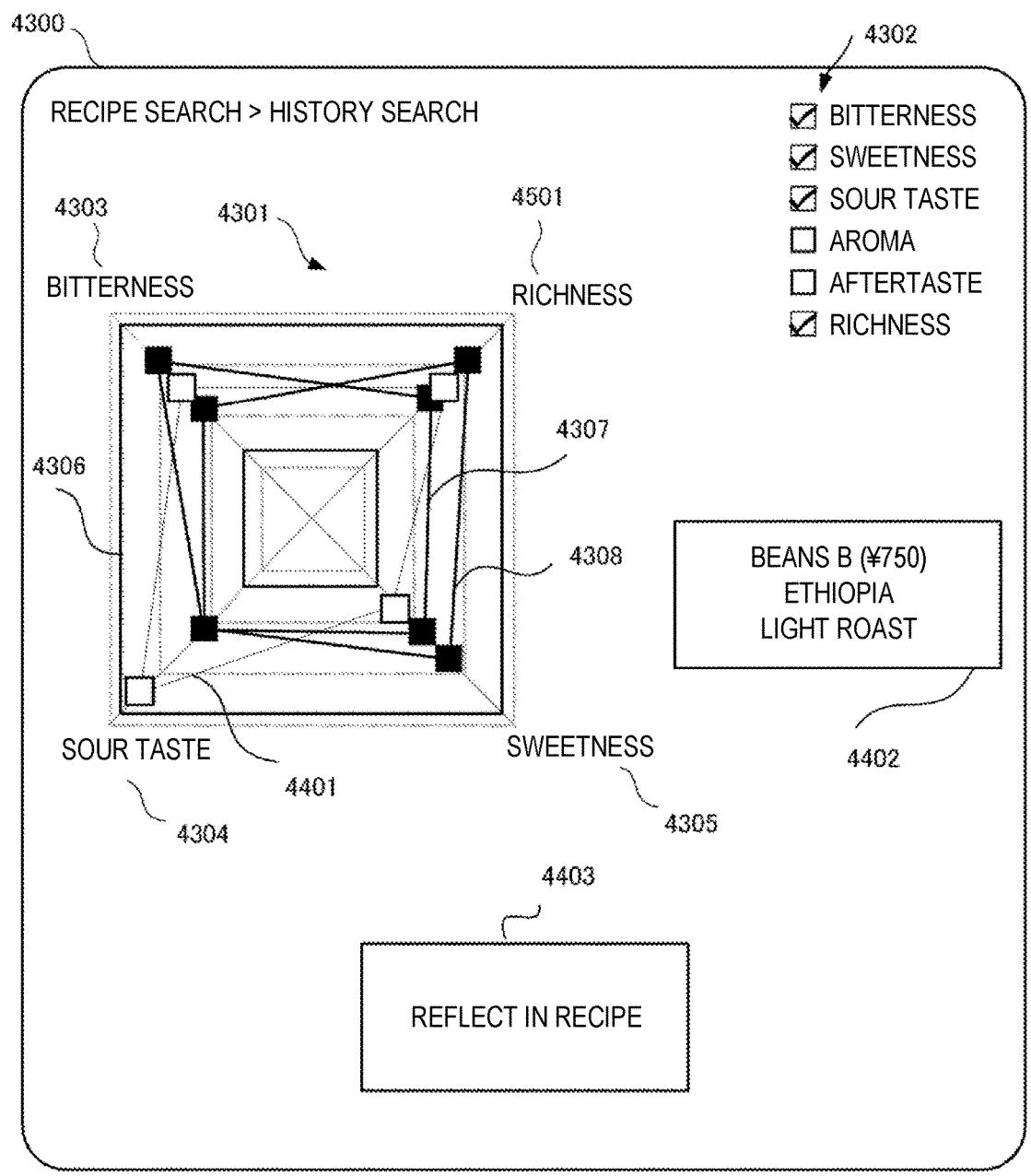
FIG. 45 is a diagram showing an example of the setting screen according to the sixth embodiment.

Next, FIG. 45 shows a setting screen that is displayed when, in the legend area 4302 on the screen shown in FIG. 44, the property "richness" is tapped to change the property displayed. In the graph area 4301 of the setting screen 4300 shown in FIG. 45, an axis 4501 of richness is displayed in addition to the axis 4303 of bitterness, the axis 4304 of sour taste and the axis 4305 of sweetness shown in FIG. 44. The processing part 1401 obtains the level, or a range of the level, of the property "richness" for the property information 4306, the history information 4307 and 4308 and the tapped property information 4401, and plots the level or range on an axis 2601 of "richness". The following process is the same as the process in the first to fifth embodiments and therefore will not be further described.

As described above, in this embodiment, the level of a property of a coffee having been ordered by the user can be displayed as preference information. This allows the user to understand the favorite taste of the user from the history of the coffees ordered by the user.

In the sixth embodiment, the level of a property of a coffee ordered (purchased) by the user is displayed. In an example, however, preference information may be displayed based on the history of the levels of a property selected by the user. In the latter case, the database 1309 may store the levels of properties transmitted from a terminal to the server 1201 and a user identifier in association with each other. In such a case, the preference information displayed on the terminal does not have to include the levels of a plurality of properties such as those in the history information 4307 shown in FIG. 43, but may be displayed as a point indicating the level of only one property. Furthermore, both a history of the levels of properties selected by the user and a history of the levels of the properties of beverages purchased by the user may be displayed with different markers or the like. Alternatively, the preference information may be generated based on the history of the levels of the properties selected by the user and the purchase history. For example, if the level of any property selected by the user matches the level of the property of the beverage purchased by the user, the level of the property may be hidden.

Although a range of the levels of the properties in the property information DB 4130 is displayed along with the preference information on the user in this embodiment, the preference information on the user may be displayed alone.

Seventh Embodiment

In the sixth embodiment, the history information on the user is obtained and displayed. In an example, the mobile terminal 1202 may process and display the history information on the user.

Figure 46:
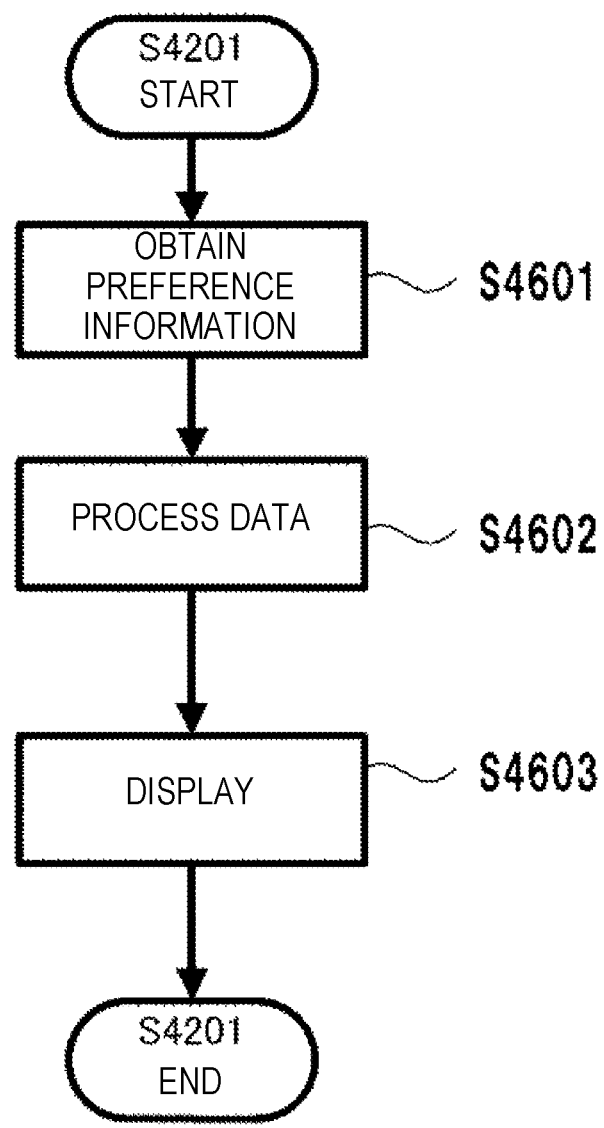
FIG. 46 is a flow diagram showing an example of a process of obtaining and displaying preference information according to a seventh embodiment.

FIG. 46 shows an example of a process of obtaining and displaying preference information on a user according to a seventh embodiment. In Step S4601, the processing part 1401 obtains user information stored in the user information DB 4110 of the server 1201. In the seventh embodiment, as in the sixth embodiment, the preference information is the levels of properties of a coffee having been ordered by the user. The processing part 1401 then proceeds to Step S4602, where the processing part 1401 performs a data processing described later on the history information included in the obtained data set. The processing part 1401 then proceeds to Step S4603, where the processing part 1401 provides an initial display of a setting screen. The processing part 1401 then proceeds to Step S2202. The following process is the same as the process according to any of the first to sixth embodiments and therefore will not be further described.

The data processing in Step S4602 is a processing of determining the range of the level of a property of a coffee ordered by the user in the past based on a plurality of pieces of property information corresponding to the preference information. In an example, the range of the level of a property may be determined based on the minimum value and the maximum value of the level of the property of a plurality of coffees corresponding to a plurality of pieces of preference information (history information). That is, for each of properties corresponding to all the history information, the minimum value and the maximum value of the level of the property may be obtained, and the range from the minimum value to the maximum value may be designated as the "range of levels of the property corresponding to the history information".

In another example, the range of selectable levels of a property may be generated based on a statistical numerical value, such as an average value, a median or a variance of the levels of the property corresponding to all the history information.

Figure 47:
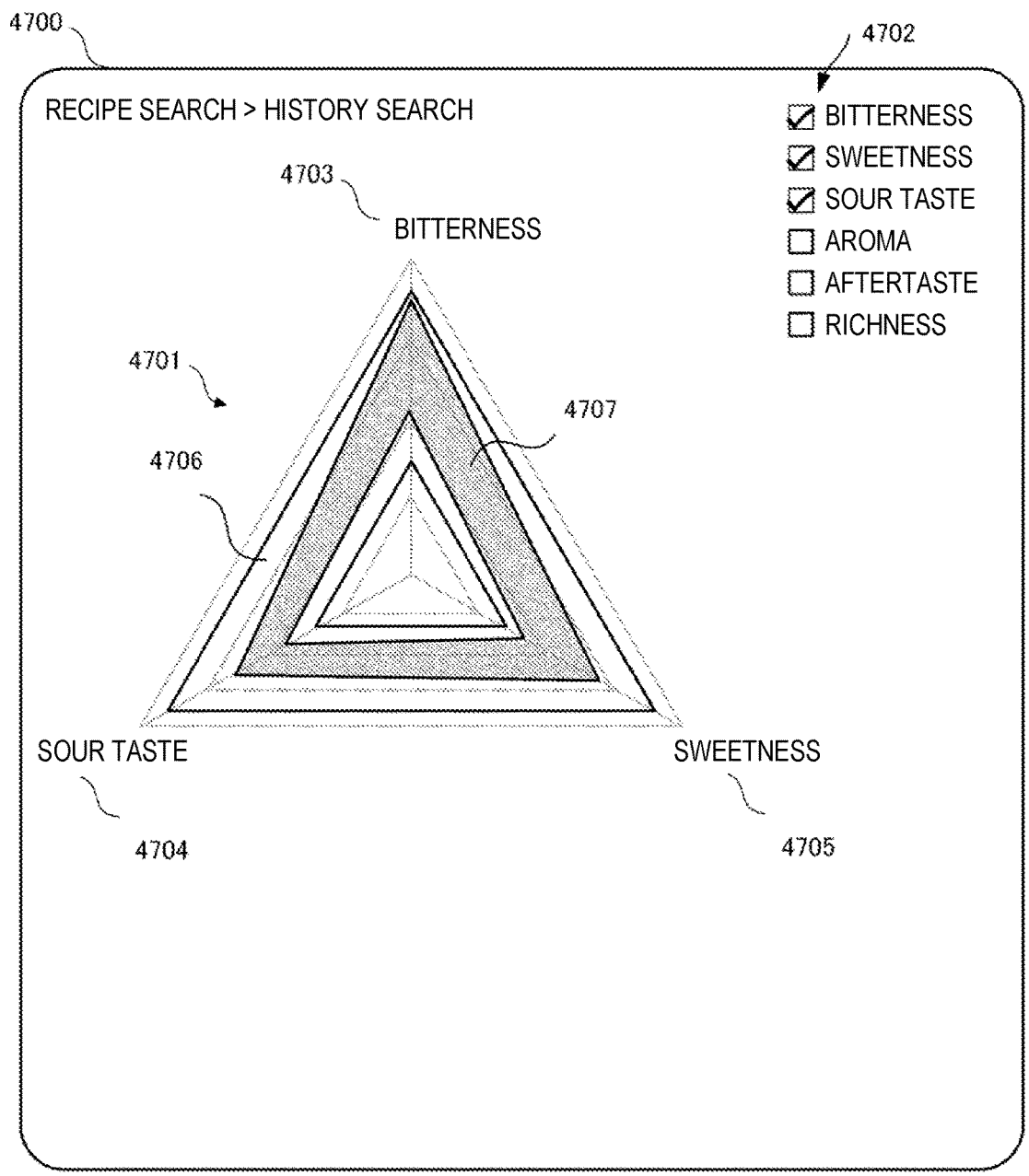
FIG. 47 is a diagram showing an example of a setting screen according to the seventh embodiment.

FIG. 47 shows an example of an initial display of a setting screen according to the seventh embodiment. In a setting screen 4700 shown in FIG. 47, a graph area 4701 and a legend area 4702 are displayed. In the graph area 4701, an axis 4703 of the property "bitterness", an axis 4704 of the property "sour taste", an axis 4705 of the property "sweetness", a range 4706 of selectable levels of properties stored in the property information DB 4130 generated in Step S3104, and a range 4707 of the levels of the properties based on the history information are displayed. As can be seen, concerning the range of the levels of the properties based on the history information in the example shown in FIG. 47, for example, the level of the property "bitterness" falls within a range from 20 to 35. Similarly, the level of the property of "sour taste" falls within a range from 19 to 28.

The range of the levels of properties based on the user information DB 4110 displayed at the beginning can serve as a guidance for the user to understand the favorite taste of the user. In addition, even if the number of the data sets in the user information DB 4110 increases, a good visibility of the graph area can be maintained while the user selects the level of a property.

Eighth Embodiment

In the seventh embodiment, a range of the level of a property of a beverage included in the purchase history of a user is displayed. In an example, additional preference information may be used to display the favorite taste of the user to the user in a more understandable manner. In a seventh embodiment, a process of displaying preference information based on a rating for a coffee given by the user will be described.

Figure 48:
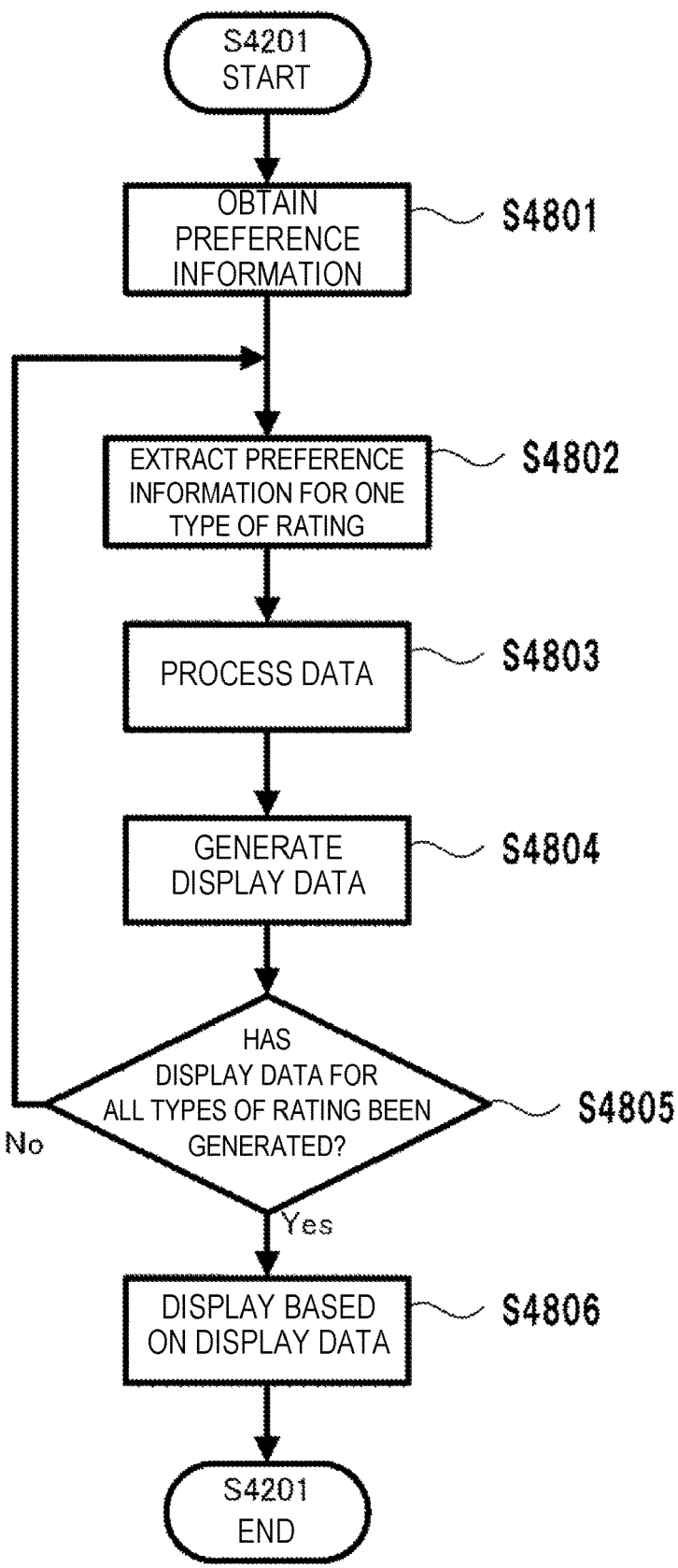
FIG. 48 is a flow diagram showing an example of a process of obtaining and displaying preference information according to an eighth embodiment.

FIG. 48 shows an example of a process of obtaining and displaying property information corresponding to preference information according to this embodiment. In Step S4801, the processing part 1401 obtains preference information (user information) stored in the user information DB 4110 of the server 1201. The processing part 1401 then proceeds to Step S4802, where the processing part 1401 extracts preference information having the same rating information 4118 from the obtained preference information. The processing part 1401 then proceeds to Step S4803, where the processing part 1401 performs a data processing on the property information corresponding to the preference information having the same rating information 4118. In an example, property information corresponding to the preparation profile ID 4116 for the preference information having the same rating information 4118 may be determined, and the range of the level of a property corresponding to the history information having the same rating may be determined based on the minimum value and the maximum value of the level of the property. Alternatively, the range of selectable levels of a property may be generated based on a statistical numerical value, such as an average value, a median or a variance of the levels of the property corresponding to the history information.

In an example where the rating is indicated by a numerical value ranging from 1 to 5, in Step S4803, user information having a rating equal to or higher than 0 and lower than 2, user information having a rating equal to or higher than 2 and lower than 4, and user information having a rating equal to or higher than 4 may be extracted. That is, user information having different rating information 4118 may be classified into the same group. The history information can be grouped according to a predetermined condition. In this way, the user can give a detailed rating, and the rating can be displayed in a more recognizable manner.

In an example, preference information used for generation of display data may be further selected from the grouped preference information. For example, up to 100 pieces of preference information may be selected in descending order of the data-and-time information 4112. This allows the range of the levels of the properties of the user's favorite coffee to be displayed by taking the change of the user's favorite taste over time into account.

The processing part 1401 then proceeds to Step S4804, where the processing part 1401 generates display data for the range of the levels of the properties corresponding to the preference information. The processing part 1401 then proceeds to Step S4805, where the processing part 1401 determines whether display data has been generated based on the property information corresponding to the preference information for all the types of ratings. If the processing part 1401 determines that display data has not been generated for all the types of ratings (if No in Step S4805), the processing part 1401 returns to Step S4802, where the processing part 1401 extracts property information corresponding to another type of rating. If the processing part 1401 determines that display data has been generated for all the types of ratings (if Yes in Step S4805), the processing part 1401 proceeds to Step S4806, where the processing part 1401 provides an initial display of the setting screen based on all the generated display data. The processing part 1401 then proceeds to Step S4202. The following process is the same as that in the seventh embodiment and therefore will not be further described.

Figure 49:
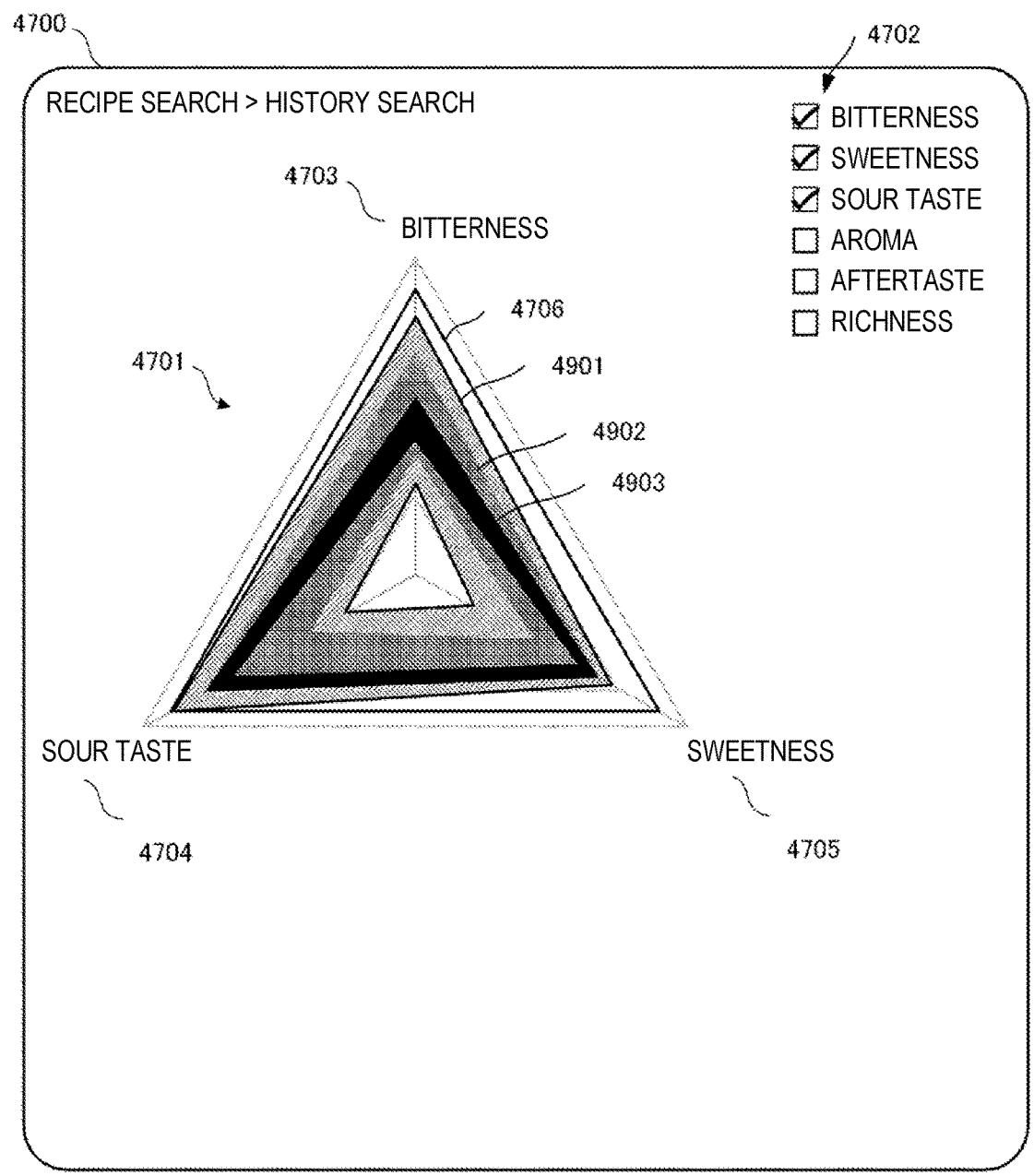
FIG. 49 is a diagram showing an example of a setting screen according to the eighth embodiment.

Next, FIG. 49 shows an example of an initial display of the setting screen according to the eighth embodiment. In the setting screen 4700 shown in FIG. 49, the graph area 4701 and the legend area 4702 are displayed. In the graph area 4701, the axis 4703 of the property "bitterness", the axis 4704 of the property "sour taste", the axis 4705 of the property "sweetness", and the range 4706 of selectable levels of properties stored in the property information DB 4130 generated in Step S3104 are displayed. In the graph area 4701, a range 4901 of the levels of the properties based on history information having a rating equal to or higher than 0, a range 4902 of the levels of the properties based on history information having a rating equal to or higher than 2, and a range 4903 of the levels of the properties based on history information having a rating equal to or higher than 4 are also displayed.

The range of the levels of properties corresponding to the preference information on the user displayed at the beginning can serve as a guidance for the user to understand the favorite taste of the user.

Ninth Embodiment

In the sixth to eighth embodiments, preference information on the user is displayed in the setting screen initially displayed. In an example, the displayed preference information on the user may be changed in the course of selection of the levels of properties by the user. In a ninth embodiment, a process of changing the displayed information based on the data-and-time information on the date and time when the user ordered coffee will be described.

FIG. 50 shows an example of a process of displaying a setting screen according to the ninth embodiment.

Figure 50A:
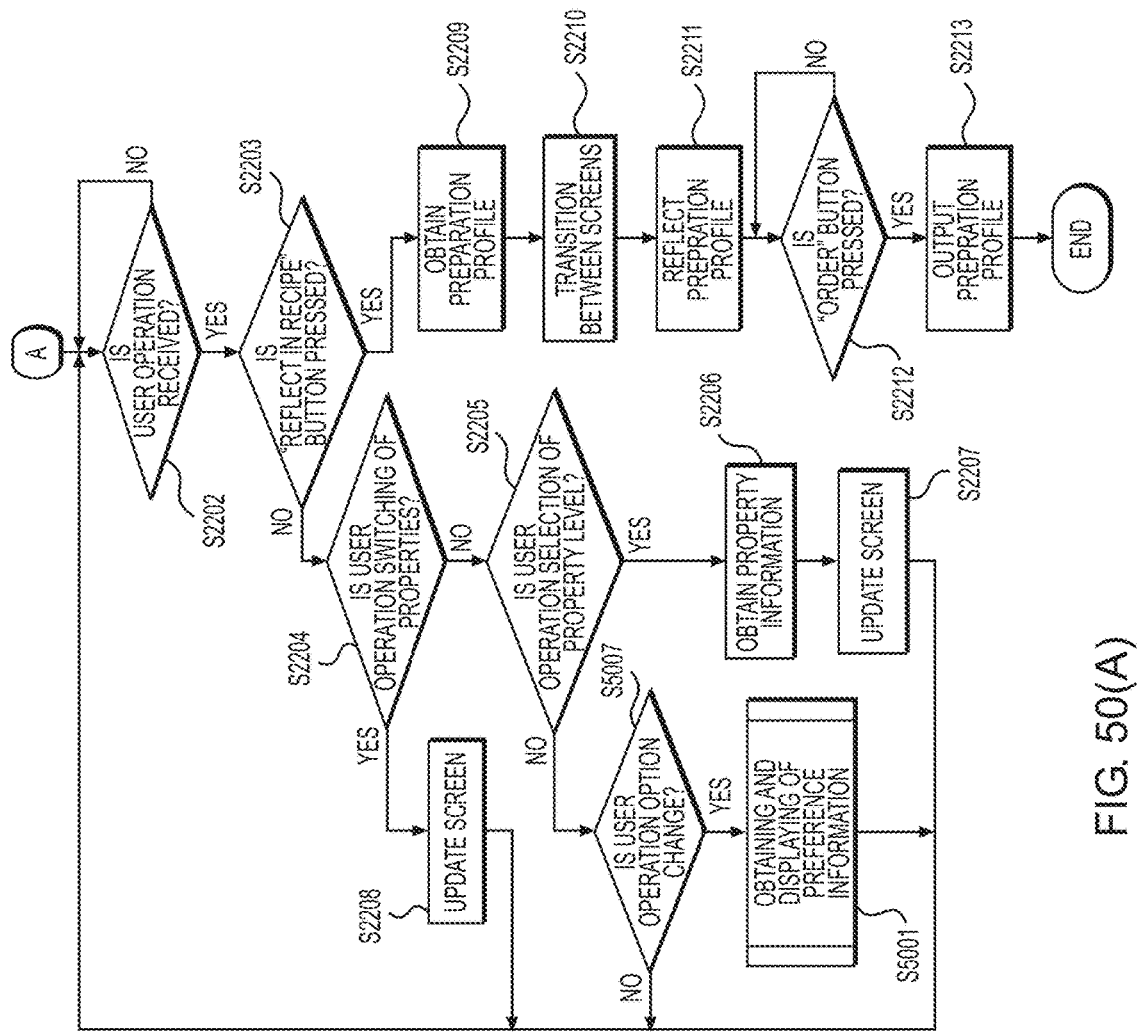
FIG. 50 is a flow diagram showing an example of a process of displaying a setting screen according to a ninth embodiment.
Figure 50B:
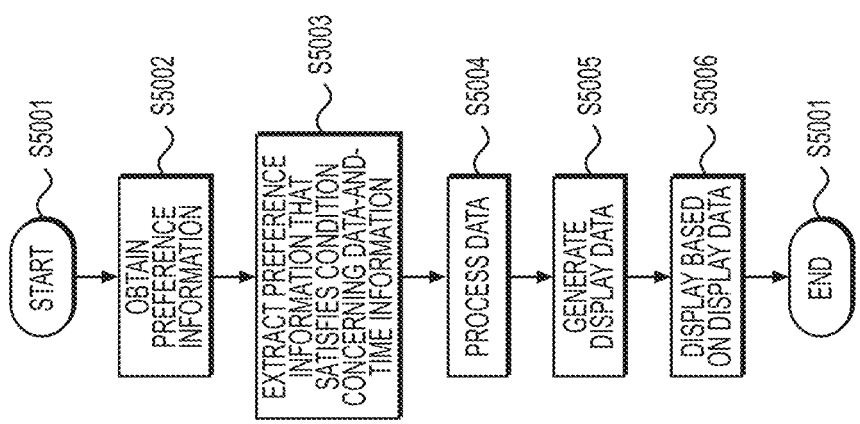

First, in Steps S3101 to S3106 in FIG. 50(A), as in the fourth embodiment, the processing part 1401 transmits user information to the server 1201, obtains a data set from the property information DB 4130 of the server 1201, and provides a display based on the data set. The processing part 1401 then proceeds to Step S5001, where the processing part 1401 performs a process shown in FIG. 50(B).

First, in Step S5002, the processing part 1401 obtains data from the user information DB 4110 of the server 1201. The processing part 1401 then proceeds to Step S5003, where the processing part 1401 extracts preference information that includes data-and-time information 4112 of the user information that satisfies a predetermined condition, that is, a date and time of purchase of coffee by the user that satisfies a predetermined condition. The processing part 1401 then proceeds to Step S5004, where the processing part 1401 performs a data processing on the history information. In an example, the data processing in Step S5004 may be the same as the data processing described in the seventh embodiment. The processing part 1401 then proceeds to Step S5005, where the processing part 1401 generates display data and provides a display based on the display data in Step S5006.

The processing part 1401 then proceeds to Step S2202. The process from Step S2202 is the same except for the option change operation described below and therefore will not be further described.

When a period option change operation is received in Step S2202, the processing part 1401 proceeds to Step S5007, since the operation is not any of a pressing of the "reflect in recipe" button, a switching of axes, and a selection of the level of a property (No in Steps S2203, S2204 and S2205). The processing part 1401 determines that the period option change operation is one of option changes (Yes in Step S5007), and proceeds to Step S5001, where the processing part 1401 displays the preference information again.

Figure 51:
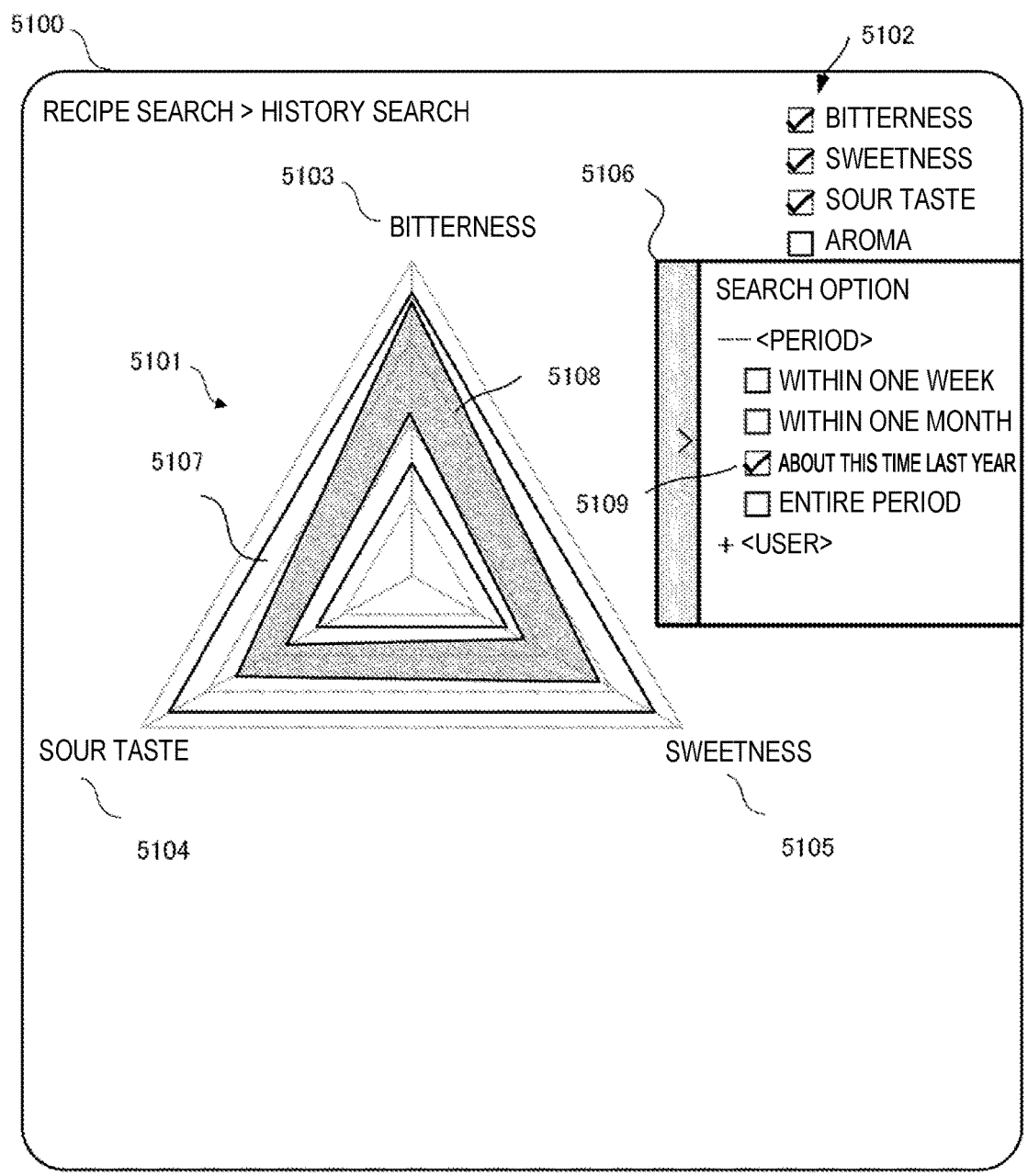
FIG. 51 is a diagram showing an example of the setting screen according to the ninth embodiment.

FIG. 51 shows an example of an initial display of a setting screen according to the ninth embodiment. In a setting screen 5100 shown in FIG. 51, a graph area 5101, a legend area 5102 and an option area 5103 are displayed. In the graph area 5101, an axis 5103 of the property "bitterness", an axis 5104 of the property "sour taste", an axis 5105 of the property "sweetness", a range 5107 of the level of the property information stored in the property information DB 4130 generated in Step S3104, and a range 5108 of the levels of the properties corresponding to the preference information are displayed. In the option area 5106, as a condition of the data-and-time information for narrowing down the preference information displayed in the graph area 5101, "within one week", "within one month", "about this time last year" or "entire period" can be selected. When any of the selectable conditions of the data-and-time information is selected in the option area 5106, the processing part 1401 determines that the processing part 1401 has received a period option change operation.

In the example shown in FIG. 51, "about this time last year" 5109 is selected, and property information on coffees ordered in the period from thirteen months before the data and time when the user is operating the mobile terminal to eleven months before the date and time is displayed in the range 5108, for example. This allows the user to grasp the coffees the user liked to drink last year. This allows the user to grasp the change of the user's favorite coffee taste over time.

The user can obtain property information by selecting a level of a property in the graph area 5101, for example. The operation that occurs when the user has selected a level of a property has been described in the first to eighth embodiments and therefore will not be further described.

Tenth Embodiment

In the ninth embodiment, a process of changing the preference information displayed based on the data-and-time information has been described. In an example, preference information on one or more users may be displayed. In a tenth embodiment, a process of changing the preference information displayed based on the user identifier will be described. Note that descriptions of the same components or processings as those in any of the first to ninth embodiment will be omitted.

Figure 52:
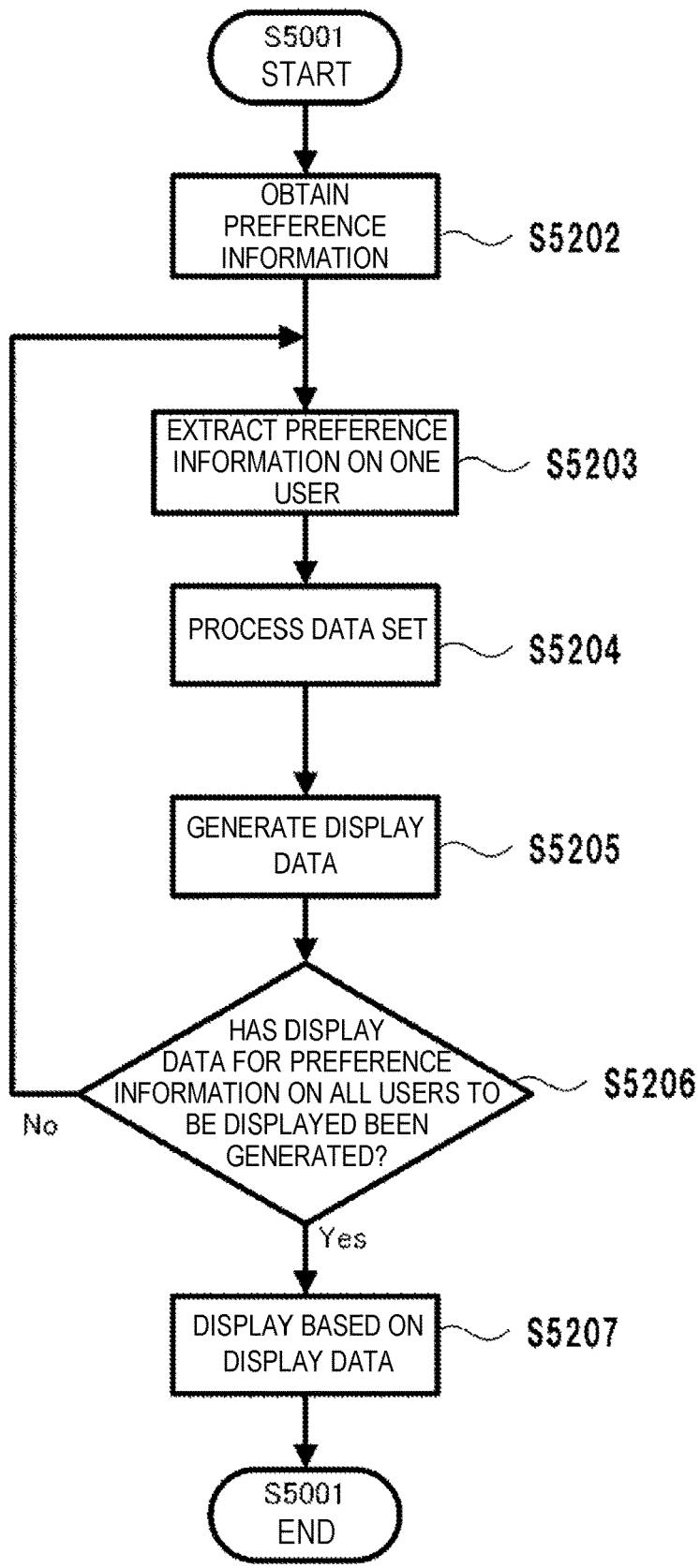
FIG. 52 an example of a process of obtaining and displaying preference information according to a tenth embodiment.

FIG. 52 shows an example of a process of displaying preference information according to the tenth embodiment. FIG. 52 shows the process in Step S5001 in FIG. 50(A) in detail.

First, in Step S5202, the processing part 1401 obtains preference information from the user information DB 4110 of the server 1201. The processing part 1401 then proceeds to Step S5203, where the processing part 1401 extracts preference information whose user identifier 4111 satisfies a predetermined condition. The processing part 1401 then process to Step S5204, where the processing part 1401 performs a data processing on the property information corresponding to the preference information. In an example, the data processing in Step S5204 may be the same as the data processing described in the ninth embodiment. The processing part 1401 then proceeds to Step S5205, where the processing part 1401 generates display data. The processing part 1401 then proceeds to Step S5206, where the processing part 1401 determines whether or not display data has been generated for the preference information on all the users to be displayed. If the processing part 1401 determines that display data has not been generated for the preference information on all the users to be displayed (if No in Step S5206), the processing part 1401 returns to Step S5203, where the processing part 1401 extracts preference information on another user. If the processing part 1401 determines that display data has been generated for the preference information on all the users to be displayed (if Yes in Step S5206), the processing part 1401 proceeds to Step S5207, where the processing part 1401 provides a display based on the display data.

Although the preference information is displayed for each user in this embodiment, the preference information may be displayed for each group of users.

As described above in the first embodiment, a barista inputs property information to the property information DB 4130. Therefore, the property information DB 4130 may be treated as preference information on the barista as a user. In the latter case, only the data sets including the priority information 4138 that satisfies a predetermined condition, rather than all the data sets, may be treated as the preference information on the barista. In other words, the data sets recommended by the barista may be treated as the preference information on the barista.

Figure 53:
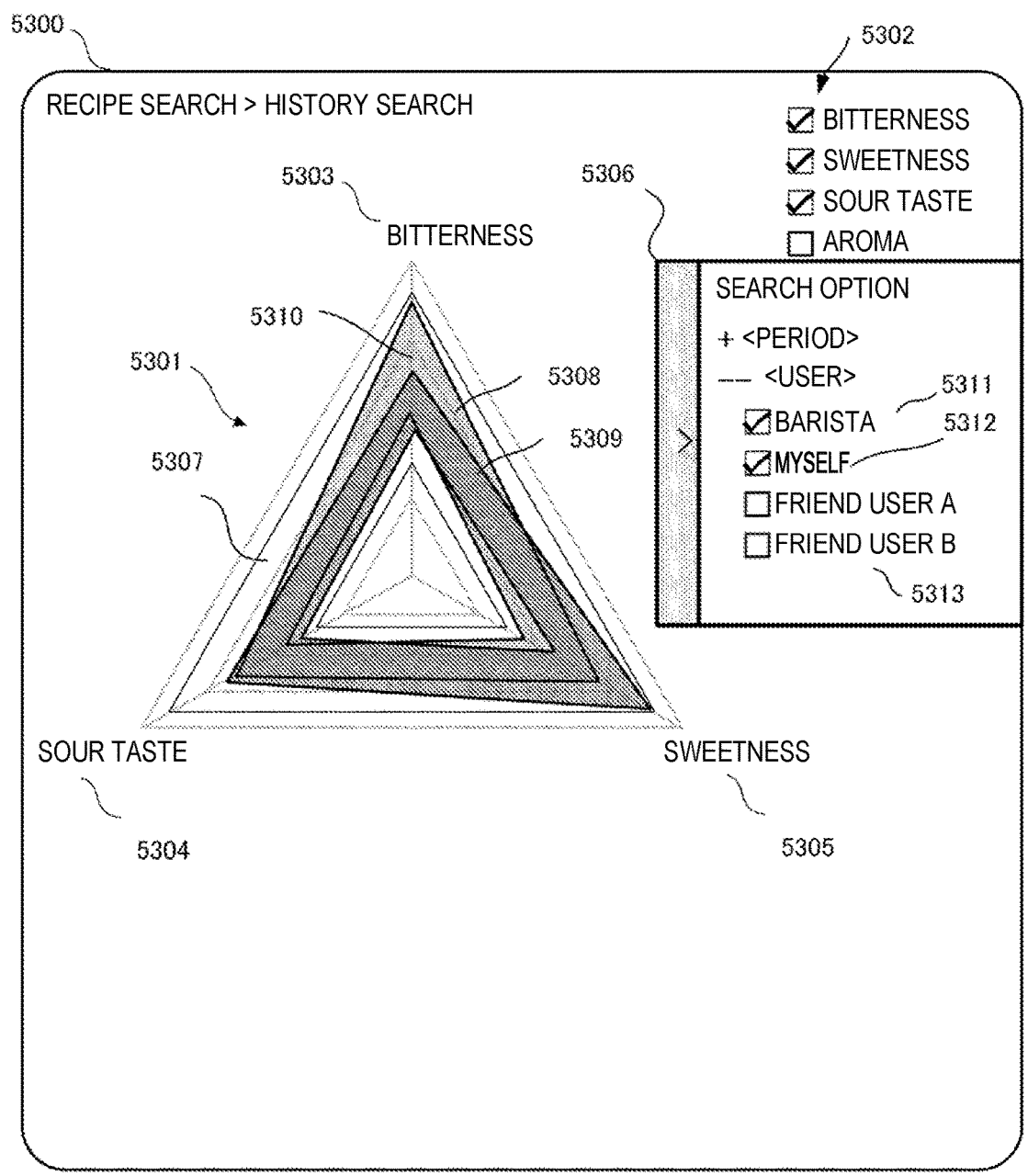
FIG. 53 is a diagram showing an example of a setting screen according to the tenth embodiment.

FIG. 53 shows an example of an initial display of a setting screen according to the tenth embodiment. In a setting screen 5300 shown in FIG. 53, a graph area 5301, a legend area 5302 and an option area 5303 are displayed. In the graph area 5301, an axis 5303 of the property "bitterness", an axis 5304 of the property "sour taste", an axis 5305 of the property "sweetness", and a range 5307 of the level of the property information stored in the property information DB 4130 generated in Step S3104 are displayed. In the graph area 5301, a range 5308 of the levels of the properties based on the preference information on the barista and a range 5309 of the levels of the properties based on the preference information on the user are also displayed. In the option area 5306, as a condition of the user identifier for narrowing down the preference information displayed in the graph area 5301, any of barista 5311, myself 5312, friend user A and friend user B can be selected. When the user selected in the option area 5306 is changed, the processing part 1401 determines that the processing part 1401 has received a user option change operation, and performs the process shown in FIG. 52 again. A point 5310 is a point that falls within the range 5308 of the levels of the properties corresponding to the preference information on the barista and falls outside the range 5309 of the levels of the properties corresponding to the preference information on the user.

Next, with reference to FIG. 54, a screen that is displayed again when the user taps the point 5310 shown in FIG. 53 will be described. The same components as those in FIG. 53 are denoted by the same reference numerals. In this example, it is supposed that there are two pieces of property information 5404 and 5405 that correspond to the level of the property indicated by the tapped point 5310.

Figure 54:
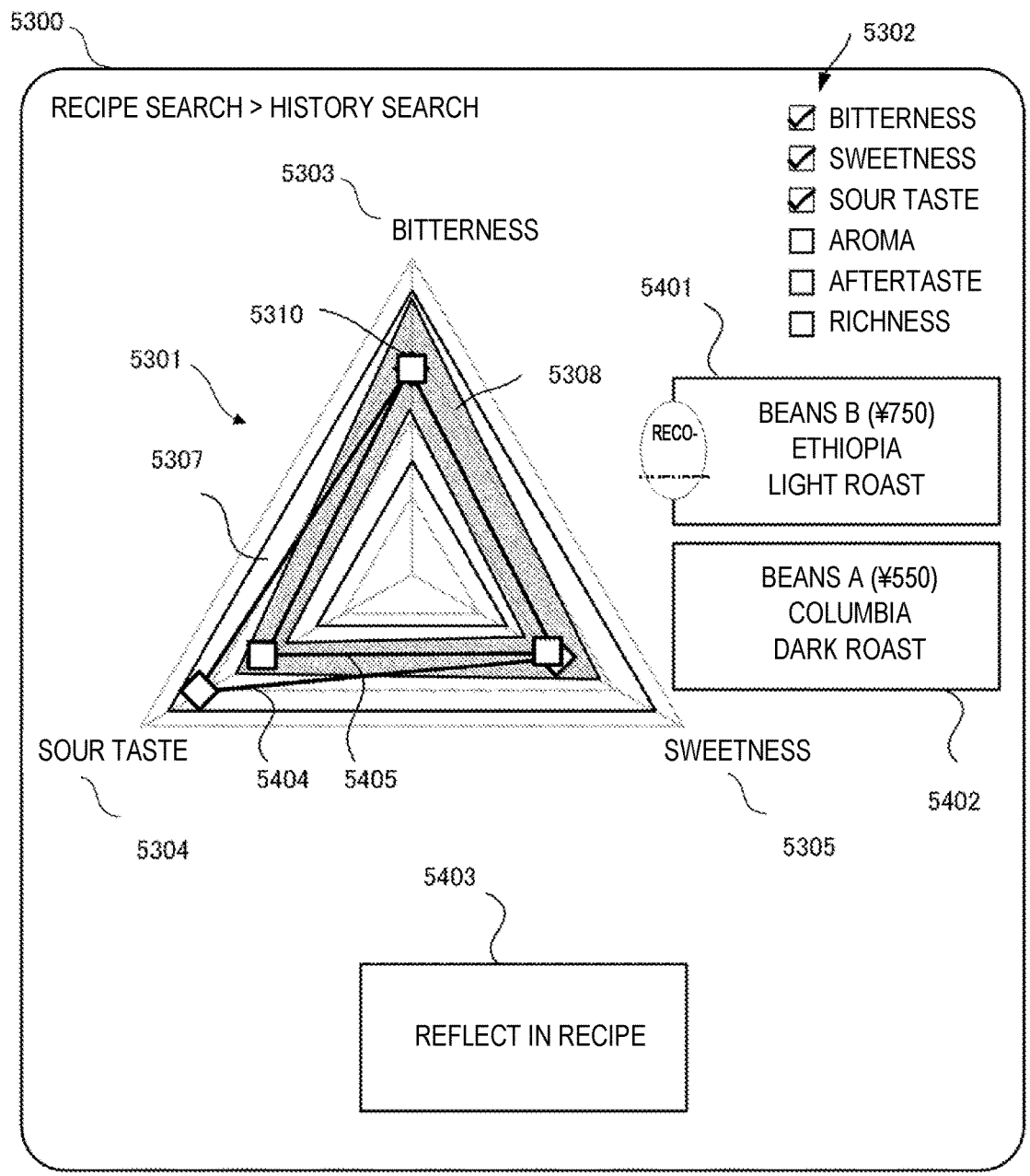
FIG. 54 is a diagram showing an example of the setting screen according to the tenth embodiment.

As shown in FIG. 54, the property information 5404 and 5405 corresponding to the level of the property at the point 5310 may be displayed in the graph area 5301, and ingredient information 5401 and 5402 corresponding to the property information 5404 and 5405 and a "reflect in recipe" button 5403 may also be displayed.

In this example, the level of the property at the tapped point 5301 falls outside the range 5309 of the levels of the properties corresponding to the preference information on the user, and therefore, the range 5309 may be hidden.

Concerning the property information 5404, the property "sour taste", which is one of the properties 5303 to 5305 displayed in the graph area 5301, falls outside the range 5308 of the levels of the properties corresponding to the preference information on the barista. On the other hand, concerning the property information 5405, all the properties 5303 to 5305 displayed in the graph area 5301 are included in the range 5308 of the levels of the properties corresponding to the preference information on the barista. Therefore, the processing part 1401 may recommend the ingredient information 5401 corresponding to the property information 5405 over the ingredient information 5402 corresponding to the property information 5404. The processing part 1401 may recommend a preparation profile based on not only the preference information on the user but also additional information such as price information.

Other Embodiments

The above embodiments have been described in the context that a preparation profile to be output to the information display device 1203 is selected. However, the present invention can also be used for other applications. For example, the function of "reflecting in a recipe" may be replaced with a function of purchasing coffee beans online.

The first to tenth embodiments can be combined in any combination. For example, the third embodiment and the fifth embodiment may be combined, and in the setting screen initially displayed, a range of the levels of properties of a mental image of coffee such as "redness" may be displayed in addition to the properties of the taste such as "bitterness" of the data sets stored in the property information DB 4130.

Although the operations have been described as being performed by the user via the mobile terminal, the levels of properties may be selected on the information display device 1203.

In this specification, examples have been shown in which at least any of the selectable ranges of properties and the history information (preference information) is represented by a radar chart. However, the present invention is not necessarily limited thereto. For example, when the level of the property "bitterness" falls within a range from 19 to 30, and the level of the property "bitterness" of a coffee ordered by the user in the past falls within a range from 15 to 20, a bar chart may be used to indicate the ranges of the level of bitterness with bars extending in the row direction labeled "bitterness" and "order history: bitterness", respectively. Alternatively, on a bar labeled "bitterness", a selectable range of the property and order history may be indicated by two different types of lines. Alternatively, any type of graph can be used, such as a bubble chart or a line graph.

The embodiments described above can be combined with each other. Although only a coffee beverage has been described in the embodiments described above, the present invention can be applied to other various beverages, including teas such as green tea and black tea and soups. Furthermore, the extract has been described as being extracted from coffee beans, raw coffee beans, ground coffee beans, roasted coffee beans, ground roasted coffee beans, unroasted coffee beans, ground unroasted coffee beans, coffee bean powder, instant coffee, or coffee beans in a pod, for example, a coffee beverage has been described as an example of the beverage, and coffee liquid has been described as an example of the extract. However, the present invention is not limited to these. The extract may be extracted from any food, including tea leaves of green tea, black tea, oolong tea or the like, ground tea leaves, vegetables, ground vegetables, fruits, ground fruits, grains, ground grains, mushrooms such as Shiitake mushroom, ground mushrooms such as Shiitake mushroom, dried heated mushrooms such as Shiitake mushroom, ground dried heated mushrooms such as Shiitake mushroom, fishes such as skipjack tuna, ground fishes such as skipjack tuna, dried heated fishes such as skipjack tuna, ground dried heated fishes such as skipjack tuna, seaweeds such as Kombu seaweed, ground seaweeds such as Kombu seaweed, dried heated seaweeds such as Kombu seaweed, ground dried heated seaweeds such as Kombu seaweed, dried heated meat such as beef, pork or chicken, ground dried heated meat, dried heated bones such as beef bones, pork bones or chicken bones, and ground dried heated bones. The beverage may be any beverage, including green tea, black tea, oolong tea, vegetable juice, fruit juice, broth and soup. The extract may be any extract, including green tea extract, black tea extract, oolong tea extract, vegetable extract, fruit extract, mushroom extract, fish extract, meat extract, and bone extract. In the description of the embodiments, water, tap water, purified water, hot water and cleaned water have been mentioned, and any of these words may be replaced with another word. For example, the word "water" may be replaced with the word "hot water", or the word "hot water" may be replaced with the word "water". Furthermore, all of these words may be replaced with a word "liquid", "steam", "high temperature water", "cooled water" or "cold water". For example, a description that a material from which extract is to be extracted (such as ground roasted coffee beans) and hot water are put in the extraction vessel 9 may be rewritten as "a material from which extract is to be extracted (such as ground roasted coffee beans) and cold water (or, simply, water) are put in the extraction vessel 9". In the latter case, the extraction method and the beverage making apparatus according to the present invention can be considered as an extraction method and a beverage making apparatus for cold brew coffee.

Summary of Embodiments

The embodiments described above provide at least the apparatuses described below.

1. An apparatus (such as 1202 or 1203) according to the present invention includes:
   display means for displaying a range (such as 2303 or 3006) of selectable levels of a property relating to a taste of a beverage;
   receiving means for receiving a selection of a level of the property from the range made by a user; and
   obtaining means for obtaining beverage information (such as 2404, 2406 or a preparation profile) corresponding to the received level of the property.

According to this embodiment, the beverage information can be presented based on a selection of a level of a property by a user.

2. In the apparatus described above,
   the display means displays ranges of levels of a plurality of properties relating to the taste of the beverage,
   the receiving means receives selections of levels of the plurality of properties from the ranges made by the user, and
   the obtaining means obtains beverage information corresponding to the received levels of the plurality of properties.

According to this embodiment, the beverage information can be presented based on selections of levels of a plurality of properties by a user.

3. The apparatus described above further includes:
   second receiving means for receiving a selection of a property relating to the taste of the beverage used for obtaining the beverage information; and
   switching means for switching a display by the display means according to the selection of the property received by the second receiving means.

According to this embodiment, the user can select a property used for obtaining the beverage information.

4. In the apparatus described above,
   the second receiving means receives selections of a plurality of properties relating to the taste of the beverage, and
   the switching means switches the display by the display means according to the selections of the plurality of properties received by the second receiving means.

According to this embodiment, the user can select a plurality of properties used for obtaining the beverage information.

5. In the apparatus described above,
   the beverage information includes at least any of information on an ingredient used to prepare the beverage and information on a preparation profile.

According to this embodiment, at least any of information on an ingredient used to prepare the beverage and information on a preparation profile can be presented based on a selection of a level of a property by a user.

6. In the apparatus described above,
   the display means displays a range of selectable levels of a property relating to the taste of the beverage associated with the ingredient, and
   the apparatus further comprises determination means for determining with which of a plurality of ingredients the beverage information to be obtained by the obtaining means is associated
   when the selected level of the property received by the receiving means is included in ranges of levels of the property associated with the plurality of ingredients.

According to this embodiment, even if there are a plurality of pieces of candidate beverage information to be obtained, which beverage information is to be obtained can be determined.

7. In the apparatus described above,
   the determination means determines, based on a user operation, with which of the plurality of ingredients the beverage information to be obtained by the obtaining means is associated.

According to this embodiment, even if there are a plurality of pieces of candidate beverage information to be obtained, which beverage information is to be obtained can be determined based on a user operation.

8. In the apparatus described above,
   the determination means determines, without being based on a user operation, with which of the plurality of ingredients the beverage information to be obtained by the obtaining means is associated.

According to this embodiment, even if there are a plurality of pieces of candidate beverage information to be obtained, which beverage information is to be obtained can be determined without being based on a user operation.

9. In the apparatus described above,
   the beverage is a coffee beverage, and the information on an ingredient is a type of a coffee bean.

According to this embodiment, beverage information on a coffee beverage can be obtained based on a selection of a level of a property.

10. In the apparatus described above,
    the preparation profile includes at least any of amount of roasted coffee beans, grind size, amount of hot water for steaming, steaming time, amount of hot water for extraction, extraction pressure and extraction time.

According to this embodiment, beverage information including at least any of amount of roasted coffee beans, grind size, amount of hot water for steaming, steaming time, amount of hot water for extraction, extraction pressure and extraction time can be obtained based on a selection of a level of a property.

11. In the apparatus described above,
    properties relating to the taste of the beverage include at least any of bitterness, sour taste and sweetness.

According to this embodiment, beverage information can be obtained based on a selection of levels of properties including at least any of bitterness, sour taste and sweetness.

12. The apparatus described above further includes:
output means for outputting at least a part of the beverage information obtained by the obtaining means to a beverage making apparatus that prepares the beverage.

According to this embodiment, at least a part of the beverage information obtained based on a selection of a level of a property can be output to control a beverage making apparatus to prepare a desired beverage.

13. In the apparatus described above,
the output means outputs the at least a part of the beverage information by any of short-range radio communication and a two-dimensional barcode.

According to this embodiment, at least a part of the beverage information can be output to the beverage making apparatus by any of short-range radio communication and a two-dimensional barcode, without a direct operation of the beverage making apparatus.

14. In the apparatus described above,
the display means displays a lowest level, a highest level, a lowest selectable level and a highest selectable level as levels of each property, and
the range of levels of a property is a range from the lowest selectable level to the highest selectable level.

According to this embodiment, a level of a property for which there is corresponding beverage information can be selected.

15. In the apparatus described above,
the display means displays a lowest recommendable level and a highest recommendable level as levels of each property.

According to this embodiment, a range of recommendable levels can be displayed.

16. The apparatus described above
second switching means for switching the selectable levels of the property relating to the taste of the beverage or the range of selectable levels of the property relating to the taste of the beverage displayed by the display means when the receiving means receives a selection of a level of the property from the range made by the user.

According to this embodiment, if a level of a property can still be selected even after a level of a property is selected by the user, a further selection can be made by switching the display.

17. A method according to the present invention includes:
a display step (such as S2201) of displaying a range of levels of a property relating to a taste of a beverage;
a receiving step (such as S2205) of receiving a selection of a level of the property from the range made by a user; and
an obtaining step (such as S2206) of obtaining beverage information corresponding to the received level of the property.

According to this embodiment, beverage information can be presented based on a selection of a level of a property by a user.

18. A program according to the present invention makes a computer function as each means of the apparatus according to any of the items 1 to 16 described above.

According to this embodiment, beverage information can be presented based on a selection of a level of a property by a user.

REFERENCE SIGNS LIST 1 beverage making apparatus

The invention claimed is:

1. A method performed by a coffee making device, comprising:
controlling a processor to:
control a display to display levels of properties relating to a taste of a coffee, including bitterness, sour taste, and sweetness, as a radar chart,
receive a selection of a level of at least one property of the properties from the radar chart,
search a database for a predetermined coffee recipe or a plurality of predetermined coffee recipes, corresponding to the selected level of the at least one property,
control the display to display the plurality of predetermined coffee recipes after the search of the database for the plurality of predetermined coffee recipes,
receive a selection of one of the displayed plurality of predetermined coffee recipes, and
control the coffee making device to execute a process for production of the coffee according to the selected one of the displayed plurality of predetermined coffee recipes.

2. A non-transitory computer readable storage medium that stores a program that causes the method of claim 1 to be executed for production of the coffee.

3. The method according to claim 1, further comprising
receiving selections of the levels for all of the properties on the radar chart, and
searching the database for the predetermined coffee recipe or the plurality of predetermined coffee recipes, corresponding to the selected levels for all of the properties.

* * * * *